United States Patent [19]

Noyes

[11] Patent Number: 5,594,837
[45] Date of Patent: Jan. 14, 1997

[54] METHOD FOR REPRESENTATION OF KNOWLEDGE IN A COMPUTER AS A NETWORK DATABASE SYSTEM

[76] Inventor: Dallas B. Noyes, 2500 George Washington Way, #124, Richland, Wash. 99352

[21] Appl. No.: 323,881

[22] Filed: Oct. 17, 1994

Related U.S. Application Data

[63] Continuation-in-part of Ser. No. 11,355, Nov. 29, 1993, Pat. No. 5,379,366.

[51] Int. Cl.$^6$ ............................................. G06F 15/18
[52] U.S. Cl. .............................. 395/63; 395/600; 395/54; 395/12
[58] Field of Search ............................... 395/60, 62, 54, 395/12, 600, 63; 364/419.08

[56] References Cited

U.S. PATENT DOCUMENTS

| | | | |
|---|---|---|---|
| 4,868,733 | 9/1989 | Fujisawa et al. | 395/62 |
| 4,964,063 | 10/1990 | Esch | 395/62 |
| 5,404,506 | 4/1995 | Fujisawa et al. | 395/600 |

OTHER PUBLICATIONS

B. Bowen and P. Kocura, "Implementing Conceptual Graphs in a RDBMS," Conceptual Graphs for Knowledge Representation, G. Mineau et al. (eds.), pp. 106–125 Aug. 1993.
J. F. Sowa, *Conceptual Structures: Information Processing in Mind and Machine*, Addison-Wesley Pub. Co. (1984), pp. 84–90, 115–123, 277–318.
G. Berg–Cross and M. E. Price, "Acquiring and Managing Knowledge Using a Conceptual Structures Approach: Introduction and Framework," *IEEE Tran. Systems, Man, and Cybernetics*, vol. 19, No. 3 (May/Jun. 1989), pp. 513–527.
D. Krishnan and T. L. Kunii, "Parametric model: A Conceptual Framework for Geometric Modelling Databases," 1989 *Conf. Data and Knowledge Systems for Manufacturing and Engineering* (Oct. 1989), pp. 161–171.
J. R. Slagle and D. A. Gardiner, "Knowledge Specification of an Expert System," *IEEE Expert* (Aug. 1990), pp. 29–38.
J. Boardman, "A methodology for Strategic Plan Modelling," *IEE Colloq. No. 131: Goal–Driven Planning in Complex Environments* (Oct. 1990), pp. 1/1–1/14.
M. Kamel and Y. Quintana, "A Graph Based Knowledge Retrieval System," 1990 *Int'l. Conf. Systems, Man, and Cybernetics* (Nov. 1990), pp. 269–275.
W. Cyre, "Mapping Design Knowledge from Multiple Representations," 1991 *Int'l. Conf. Computer Design* (Oct. 1991), pp. 406–409.
H. Ito and T. Fukumura, "TKD: A Knowledge–based Tool for Integrating a Knowledgebase and a Database," *Proc. 1992 IEEE Int'l. Conf. on Tools with AI* (Nov. 1992), pp. 460–461.
K. Ryan and B. Mathews, "Matching Conceptual Graphs as an Aid to Requirements Re–use," 1993 *Int'l. Symp. Requirements Engineering* (Jan. 1993), pp. 112–120.

*Primary Examiner*—Robert W. Downs
*Attorney, Agent, or Firm*—Rothwell, Figg, Ernst & Kurz

[57] ABSTRACT

A system for knowledge representation in a computer has the ability to automatically transform information in the knowledge representation into a multitude of documents or other human interpretable displays in a plurality of different formats or views. User interaction with the knowledge representation through the view documents is achievable through a multitude of various possible formats. The Knowledge Representation system defines a novel database engine constituting a method for modeling knowledge as a network of concepts and a plurality of relationships between the concepts comprising the network. Each concept is represented as a record in the database which is identified by a unique record reference number. The unique record reference numbers are stored within the records comprising the database to record the plurality of relationships between concepts. System concept records are created which define system concepts as particular relational characteristics between two records in the database. A system concept index is provided so as to designate the records which define system concepts and which can be used as relationship data structures within other records.

18 Claims, 79 Drawing Sheets

(a) UNIQUE REFERENCE NUMBER AVAILABLE FOR EACH RECORD
(b) REFERENCE NUMBER PERMANENTLY ASSOCIATED WITH EACH RECORD
(c) ABLE TO STORE REFERENCE NUMBER IN DATABASE RECORDS AND ASSOCIATED INDEX(es).
(d) ABLE TO CREATE AN INDEX TO THE RECORDS IN THE DATABASE
(e) ENVIRONMENT SHOULD ENABLE COMPLEX RECORD DATA TYPE
(f) ENVIRONMENT SHOULD NOT RESTRICT RECORD LENGTH

FIG.2

LEGEND
- (A) PROPERTIES
- (B) STRATA
- (C) ATTRIBUTE CLASSES
- (D) CODE
- (E) USER CONCEPTS
- (F) RELATIONSHIP CHARACTERIZATION
- (G) INTRASTRATUM (TAXONOMY)
- (H) INTRASTRATUM (COMPOSITION)
- (I) INTERSTRATA
- (J) INTERNAL VALUE

| (a) STRATA | (b) BRIEF DESCRIPTION OF STRATA | (c) INTRASTRATUM CONNECTIVITY | (d) RELATIONSHIP CHARACTERIZATION | (e) INTERSTRATA RELATIONSHIPS |
|---|---|---|---|---|
| PROPERTIES | • SYSTEM CONCEPTS<br>• DEFINE PROPERTIES OF ATTRIBUTES, ATTRIBUTE CLASSES, AND STRATA ROOTS | • TAXONOMY CONVENIENT, BUT NOT REQUIRED | • NONE: DEFINED IN PROGRAMMED CODE | NONE |
| ATTRIBUTES | • CHARACTERIZE RELATIONSHIP OF ALL LOWER STRATA | • TAXONOMY | • PROPERTIES | NONE |
| COMPONENTS | • IDEALIZED CONCEPTS WITH RELATIONSHIP CHARACTERIZED BY ATTRIBUTES | • TAXONOMY | • ATTRIBUTES | • TYPE OF PROPAGATIONS |
| PROPAGATIONS | • DISSEMINATION OF COMPONENTS IN INSTANTIATED NETWORKS OF KNOWLEDGE | • COMPOSITION<br>• VARIOUS | • ATTRIBUTES | • INSTANCE OF COMPONENT |

FIG.8

| ATTRIBUTE PROPERTIES | DESCRIPTION |
|---|---|
| NAME | PUBLIC NAME OF ATTRIBUTE CONCEPT |
| PROMPT | PROMPT FOR ATTRIBUTE TO BE USED IN VIEWS |
| DATA_TYPE | DATA_TYPE ALLOWED FOR VALUE |
| FIELD_LENGTH | FIELD_LENGTH ALLOWED FOR VALUE |
| LOCATION | RELATIVE LOCATION OF ATTRIBUTE IN A FORM VIEW OF ATTRIBUTES OF THE SAME CLASS. |
| COLOR | STANDARD COLOR FOR DISPLAY IN VIEWS: MAY BE IMPLEMENTED AS VIEW PROPERTY. |
| LINETYPE | STANDARD LINETYPE FOR ICON IN VIEWS: MAY BE IMPLEMENTED AS VIEW PROPERTY. |
| LINE WEIGHT | STANDARD LINE WEIGHT FOR ICON IN VIEWS: MAY BE IMPLEMENTED AS VIEW PROPERTY. |

FIG.10

| ATTRIBUTE CLASS | ATTRIBUTE EXAMPLES | FUNDAMENTAL | DOMAIN | DATA TYPE | RECIPROCAL | REMARKS |
|---|---|---|---|---|---|---|
| TAXONOMY | CLASS SUBCLASS | YES | PARENTS CHILDREN | ref* | ALWAYS | REQUIRED FOR ALL SYSTEM CONCEPTS AND ALL USER CONCEPTS EXCEPT PROJECT CONCEPTS. |
| TYPE | CLASSIFICATION INSTANCE | YES | TYPE | ref* | ALWAYS | INSTANCE REQUIRED FOR ALL COMPONENT LIBRARY USER CONCEPTS. CLASSIFICATION REQUIRED FOR ALL PROJECT CONCEPTS. |
| COMPOSITION | STRUCTURE SUBSTRUCTURE | YES | PARENTS CHILDREN | ref* | ALWAYS | REQUIRED ONLY FOR PROJECT LIBRARY USER CONCEPTS. |
| ASSIGNMENT | OFFICE OCCUPANT | NO | INTERNAL | f(ref) c(ref,ref) | ALWAYS | MULTIPLE BINDINGS OF VALUE. INSTANTIATED ONLY IN PROJECT RECORDS. |
| EXTERNAL | NAME ADDRESS TELEPHONE HEIGHT | NO | EXTERNAL | VARIOUS | NEVER | SINGLE BINDINGS OF VALUE. |
| CONNECTION | + − 1 2 | NO | INTERNAL | f(ref) c(ref,ref) | ALWAYS | HAS SYSTEM CONCEPTS AS SUBCLASSES REPRESENTING SUPPORTED CONNECTION TYPES (E.G., WIRES, PIPES, ETC.) |
| PRECEDENCE | PRECEDES | NO | INTERNAL | f(ref) c(ref,ref) | ALWAYS | HAS SYSTEM CONCEPTS AS SUBCLASSES REPRESENTING SUPPORTED PRECEDENCE TYPES (E.G., TEMPORAL, LOGICAL, ETC.) |
| LOCATION | X Y Z | NO | INTERNAL | f(ref) | | HAS SYSTEM CONCEPTS AS SUBCLASSES REPRESENTING SUPPORTED COORDINATE SYSTEMS (E.G., GPS, CARTESIAN, POLAR, ETC.) |

FIG.11A

| ATTRIBUTE CLASS | ATTRIBUTE EXAMPLES | FUNDAMENTAL | DOMAIN | DATA TYPE | RECIPROCAL | REMARKS |
|---|---|---|---|---|---|---|
| RULES | CHILDREN PARENTS LINEAR TERMINAL STRIP USE ISA NAME | NO | MIXED | VARIOUS | RARELY | ALL RULES ARE SYSTEM CONCEPTS. SEE DISCUSSION OF PATTERN RECOGNITION AND STORAGE. |
| GRAPHICS | FE FCV TANK 1 | NO | SPECIAL | SPECIAL | YES | MAY BE REQUIRED FOR SOME VIEWS. ALLOWS FOR ARBITRARY USER DEFINITION OR GRAPHICAL ICONS. |

FIG.11B

GLOBAL DATABASE (a) NAME = STRING
(b) CHARACTERIZATION = ref
(c) INTERNAL = c(ref,ref)
(d) EXTERNAL = s(string); i(integer); r(real); d(data); ...
(e) val = INTERNAL; EXTERNAL
(f) MIXED = val*
(g) VALUE = INTERNAL; EXTERNAL; MIXED (h) PROMPT = STRING
(i) DATA_TYPE = STRING
(j) FIELD_LENGTH = INTEGER
(k) LOCATION = INTEGER
(l) PROPERTIES = a(PROMPT, DATA_TYPE, FIELD_LENGTH, LOCATION)

(m) RELATIONSIP = v(CHARACTERIZATION, VALUE); PROPERTIES
(n) RELATIONSHIP_LIST = RELATIONSHIP*

(o) PARENTS = ref*
(p) CHILDREN = ref*
(q) INTERSTRATA = ref*

(r) CONCEPT = r(NAME, PARENTS, CHILDREN, INTERSTRATA, RELATIONSHIP_LIST)

CALL TO
INPUT OPERATION (b)

IS TARGET RECORD
A SYSTEM CONCEPT

YES → (c) CAN'T DO IT MESSAGE

NO (d) TO CALLED OPERATION (e) TO EXIT CALLED OPERATION

FIG. 14

| (a) INHERITANCE | INHERITS | | APPLIES TO LIBRARIES | | | (g) PATH LENGTH |
| --- | --- | --- | --- | --- | --- | --- |
| | (b) CHARACTERIZATION | (c) VALUE | (d) ATTRIBUTE | (e) COMPONENT | (f) PROJECT | |
| TAXONOMY (CLASS) | YES | YES | YES | YES | YES[1] | TO ROOT |
| TYPE (CLASSIFICATION) | YES | YES | NO | NO | YES | 1 |
| COMPOSITION (STRUCTURE) | NO | YES | NO | NO | YES | TO ROOT |
| USER (RELATIONSHIP) | NO | YES | YES | YES | YES | DESIGN SPECIFIC OFTEN 2 |

[1] INCLUDES TYPE NODE TAXONOMY INHERITANCE

FIG. 17

GLOBAL DATABASE-DESCRIPTIVE (a) DATABASE = env;prj
(b) ACTIVE = (DATABASE, ref)
(c) SOURCE = (DATABASE, ref)
(d) nr(ACTIVE, SOURCE, RELATIONSHIP)

FIG.23

| SPECIFIC RULE | DESCRIPTION |
|---|---|
| CHILDREN | A LIST OF COMPONENTS THAT CAN BECOME INSTANTIATED CHILDREN OF THE INSTANTIATION OF THE CURRENT COMPONENT. |
| NODE NAME ATTR | THE ATTRIBUTE THAT IS THE CHARACTERIZATION OF THE NAME OF THE INSTANTIATED COMPONENT. |
| PARENT | A LIST OF COMPONENTS THAT ARE THE POSSIBLE INSTANTIATED PARENTS OF THE INSTANTIATED COMPONENT. |
| USE ISA NAME | USE THE COMPONENT NAME AS THE NAME FOR ITS INSTANTIATION. |
| CONCAT ATTRS | A MIXED LIST OF ATTRIBUTES AND EXTERNAL VALUES FOR CONCATENATION OF ATTRIBUTE VALUES WITH EXTERNAL VALUES. |
| OS PATH NAME | A RULE TO IDENTIFY AN ATTRIBUTE WHOSE VALUE IS THE FULL PATH NAME OF A FILE. |
| SIBLING INC | THE ATTRIBUTE VALUE IS AN INCREMENT OF THE MAXIMUM VALUE OF THE SIBLING PROJECT NODES. |
| USE TEXT | THE DEFAULT INSTANTIATION RULE FOR ENTERING ATTRIBUTE RULES. |
| CONNECT TO | A LIST OF COMPONENTS WHOSE INSTANTIATIONS CAN POSSIBLY BE CONNECTED TO THE CURRENT PROJECT NODE. |
| LINEAR | A RULE THAT IDENTIFIES A COMPONENT AS A LINEAR CONNECTION DEVICE (I.E., A WIRE, PIPE, ETC.) |
| MULTIPLE | IDENTIFYING AN ATTRIBUTE AS POSSIBLY HAVING MORE THAN ONE CONNECTION. |
| SINGLE | IDENTIFYING AN ATTRIBUTE AS HAVING A MAXIMUM OF ONE CONNECTION. |

FIG.29

| SPECIFIC RULE | DESCRIPTION |
|---|---|
| ATTR FIRST | THE FIRST VALUE IN THE LIST IS AN ATTRIBUTE |
| ATTRS ONLY | THE VALUE LIST CAN CONTAIN ONLY ATTRIBUTES. |
| COMPONENTS ONLY | THE VALUE LIST CAN CONTAIN ONLY COMPONENTS. |
| MIXED | THE VALUE LIST CONTAINS BOTH ATTRIBUTES AND COMPONENTS. |
| MULTIPLE OCCURRENCES | THE RULE MAY OCCUR MORE THAN ONCE, TO INHERIT ALL OCCURRENCES. |
| NO INHERITANCE | THE RULE IS NOT TO BE INHERITED. |
| NONE | NO VALUES FOR THE RULE. |
| ORDER IMPORTANT | ORDER OF THE VALUES IN THE LIST IS RELEVANT AND MUST BE MAINTAINED. |
| SINGLE ATTR | THE VALUES LIST MAY CONTAIN ONLY ONE ATTRIBUTE. |

FIG.30

DATABASE-NLI FUNCTIONS

TYPE_FUN (STRING)
ATTRIBUTE_FUN (STRING, REF)
VALUE_FUN (STRING, REF)
COMPONENT_FUN (STRING, REF)
PROJECT_FUN (STRING, REF)
REL_FUN (STRING, REF)
LOGIC_FUN (STRING, REF)
COMPARISON_FUN (STRING, REF)
IGNORE_FUN (STRING)
EXTERNAL_FUN (STRING)
COMMAND_FUN (STRING, REF)
COMPARE_FUN (STRING, REF)

FIG.34

| (a) LIBRARY | (b) EXAMPLES OF CONCEPTS | (c) NOTES ON PREFERRED EMBODIMENT |
| --- | --- | --- |
| LOGICAL OPERATORS | AND, OR, NAND, NOR, NOT | IMPLEMENTED IN CODE ONLY |
| COMMAND OPERATORS | PRINT, DRAW, SHOW, ADD, DELETE | IMPLEMENTED AS SYSTEM CONCEPTS IN KNOWLEDGE REPRESENTATION DATABASE |
| WORDS TO IGNORE | THE, A, ALL, IS | IMPLEMENTED AS SUPPLEMENTARY FILE |
| QUERY DESIGNATORS | WHICH, WHAT, WHEN, WHY, WHERE | IMPLEMENTED AS SYSTEM CONCEPTS |
| RELATIONAL OPERATORS | CIRCUIT CONTAINING, CONNECTED TO | IMPLEMENTED IN KNOWLEDGE REPRESENTATION DATABASE |
| COMPARE OPERATORS | GREATER THAN, LESS THAN, BIGGEST, SMALLEST, LONGEST | IMPLEMENTED AS SUPPLEMENTARY FILE |

FIG. 35

| (a) EXAMPLES OF VIEW | (b) EXAMPLES OF VIEW CLASSES | (c) EXAMPLES OF DOCUMENT TYPE |
|---|---|---|
| SCHEMATIC | ORGANIZATION | TAXONOMY<br>COMPOSITION<br>ORGANIZATION |
| | FLOW | ILD<br>LOGIC |
| | TABULAR | TERMINAL<br>PIN-OUT |
| | CLUSTER | P&ID<br>PFD<br>WIRING<br>CIRCUIT |
| | LADDER | POWER<br>LOGIC |
| FORM | DATABASE | SINGLE<br>MULTIPLE |
| | FINANCIAL | FORM<br>BALANCE<br>INCOME<br>ACCOUNT<br>ESTIMATE |
| DIMENSIONAL | 2-D | PLANS<br>ELEVATIONS<br>SECTIONS<br>ORTHOGRAPHIC<br>DETAILS<br>PROFILES<br>ISOMETRIC |
| | 3-D | BLOCK<br>DETAIL |
| DOCUMENT | LETTER<br>CONTRACT | STANDARD<br>SPECIFICATION |

FIG.37A

| (a) EXAMPLES OF VIEW | (b) EXAMPLES OF VIEW CLASSES | (c) EXAMPLES OF DOCUMENT TYPE |
|---|---|---|
| ANALYSIS | FEA | STRUCTURAL THERMAL |
| | TREE | FAULT HYDRAULIC ELECTRICAL |
| | SCHEDULE | PERT GANT PROBABILITY |
| | PROCESS | SIMULATION |

FIG. 37B

DATABASE–VIEWS

ACTIVE(VIEW, ACTIVE, DATABASE, CHARACHTERIZATION)

| (a) VIEW DERIVATION STEP | (b) LEVEL OF VIEW ABSTRACTION |
|---|---|
| READ DESCRIPTIVE SET | TYPE |
| ASSIGN ICONS TO DESCRIPTIVE SET | TYPE |
| LOCATE ICONS ACCORDING TO CLASS GRAMMER | CLASS |
| DEVELOP RELATIONSHIP ICONS | VIEW |

FIG.41

| (a) TYPE | (b) DEFINING RELATIONSHIPS | (c) DEPTH | (d) AUXILIARY RELATIONSHIP | (e) DEPTH |
|---|---|---|---|---|
| TAXONOMY TREE | SUBCLASS | 4 | NONE | N/A |
| COMPOSITION TREE | SUBSTRUCTURE | 4 | NONE | N/A |
| SINGLE FORM | NONE | N/A | ALL | 2 |
| ORGANIZATION | SUBSTRUCTURE | ALL | ALL USER | 2 |
| ILD | WIRES, PNEUMATIC | ALL | ALL OTHER USER | 2 |
| P&ID | SUBSTRUCTURE | ALL | WIRES, PNEUMATIC, PIPES, ALL OTHER | 0 |
| TERMINATION | SUBSTRUCTURE | ALL | WIRES, PNEUMATIC | 2 |
| ESTIMATE | SUBSTRUCTURE | ALL | ALL OTHER | 0 |
| LETTER | SUBSTRUCTURE | ALL | ALL OTHER | 0 |

FIG.46

| (a) ASSOCIATED WITH ICON | (b) ICON SYMBOLIZES |
|---|---|
| ICON ENTITIES | ENTITIES COMPRISING ICON |
| ICON LOCATION | REGION IN DISPLAY SPACE |
| ICON SOURCE | CONCEPT RECORD REFERENCE NUMBER |
| ACTIVE | CONCEPT RECORD REFERENCE NUMBER |
| RELATIONSHIP SOURCE | CONCEPT RECORD REFERENCE NUMBER |
| RELATIONSHIP CHARACTERIZATION | CONCEPT RECORD REFERENCE NUMBER |
| RELATIONSHIP INTERNAL VALUE CHARACTERIZATION | CONCEPT RECORD REFERENCE NUMBER |
| RELATIONSHIP INTERNAL VALUE CONCEPT | CONCEPT RECORD REFERENCE NUMBER |
| RELATIONSHIP EXTERNAL VALUE | ENTITIES COMPRISING VALUE |

FIG. 51

| (a) ICON SYMBOLIZERS | (b) SYMBOL CAN BE INTERPRETED AS | (c) INTERPRETIVE PROCEDURE |
|---|---|---|
| LOCATION | • ICON ASSOCIATIONS | 57 |
| ENTITIES | • per se<br>    – HIGHLIGHT | 58 |
| | • PROCEDURE<br>    – SYSTEM CONCEPT<br>    – ABSTRACTION<br>    – EDITOR | 59<br>60<br>61 |
| CONCEPT RECORD REFERENCE NUMBER | • per se<br>    – SET ACTIVE<br>    – HIGHLIGHT<br>    – TRANSFER<br>    – NEW VIEW | 57<br>58<br>62<br>63 |
| | • PROCEDURE<br>    – SYSTEM CONCEPTS<br>    – ABSTRATION<br>    – CONCEPT AND RELATIONSHIP EDITOR<br>    – EXTERNAL PROCEDURE | 64,72<br>65<br>66<br>67 |
| | • CONTEXT<br>    – ANCESTRY<br>    – DESCENDANTS<br>    – TYPE<br>    – ATTRIBUTE CLASSES<br>    – USER CONNECTIONS | 68<br>69<br>70<br>71<br>72 |

METHOD FOR REPRESENTATION OF KNOWLEDGE IN A COMPUTER AS A NETWORK DATABASE SYSTEM

CROSS REFERENCE TO RELATED APPLICATION

This is a continuation-in-part of application Ser. No. 08/011,355 filed Jan. 29, 1993, now U.S. Pat. No. 5,379,366.

BACKGROUND OF THE INVENTION

This invention relates to a system for knowledge representation in a computer system together with Natural Language Interface, together with the ability to recognize, store and use patterns in the knowledge representation, together with computerized means for automatically transforming information in the knowledge representation into a multitude of documents or other human interpretable displays in a plurality of different formats or views, together with means for user interaction with the knowledge representation through the documents or displays.

The Knowledge Representation system defines a novel database engine constituting a method for modeling knowledge as a network of concepts and the relationships of each concept to other concepts. Each concept is represented as a record in the database which is identified by a unique record reference number. Relationships are represented by storing the unique record reference numbers of relevant records within the records comprising the knowledge representation database.

The records are organized into strata or levels of abstraction by means of storing relationships to other records within a given stratum. These relationships organize each level into hierarchies and a plurality of other relational networks which represent generally accepted ways of thinking about various fields of knowledge.

The concepts in lower levels of abstraction are related to those in higher levels by storing the unique record reference numbers of records of simple (more abstract) concepts within the structure of records representing more complex (more specific) concepts. Thus, more complex concepts are defined by the records whose reference numbers are stored within their record structure.

This invention further relates to a novel system for a Natural Language Interface (NLI) including a new method of parsing and evaluating input expressions in conjunction with the information in the Knowledge Representation Database.

The system includes a method for dynamically updating the Knowledge Representation database to "learn" through interaction with system users. This is accomplished by programmed means which automatically recognize, store, and utilize patterns in the knowledge representation database.

The system further includes a novel method for automatically transforming knowledge embodied in the Database into a plurality of human-perceivable documents expressing the knowledge.

User interaction with the Knowledge Representation through the Documents enables user interactions typical of Graphical User Interfaces (GUI), Hypertext, Object Linking Embedding (OLE), and context sensitive operation in a single unified user interface.

The present invention can be evaluated by referring to five major constituents which are illustrated in FIG. 1.

A) The data-base engine referred to herein as a "knowledge representation" system is most closely related to hierarchical and network databases. It differs from previously disclosed databases in that this invention employs a record system which embeds the database record numbers of a plurality of other records within a list stored in a particular record in a network of interrelated records. Each record is allowed to maintain an unbounded list of relationships to other records within the Knowledge Representation database.

System concepts are defined which allow the creation of levels of abstraction within the knowledge representation.

Fundamental relationships are the minimum set of relationships which each record is required to have in order to assure that the concept is related to the other concepts of the knowledge representation database. Each record is required to store the reference number of at least one record in a higher level of abstraction than that record, and every record on each level of abstraction is required to store at least one record reference number of another record on the same level in a relationship which is characterized by an attribute typical of the level.

The Knowledge Representation system further requires a separate, non-permanent database in which to assemble descriptions of particular records from the network of records in the primary Knowledge Representation database.

The retrieval system of an individual record and the records whose reference numbers are embedded in its substructure provides means for relationship inheritance and is without precedent.

B) The means for pattern recognition, storage and utilization employed in the invention are unique and provide novel means for machine "learning" by recognizing patterns in the relationships comprising the records, storing the patterns as relationships and utilizing the patterns in creating additional concepts and relationships in the Knowledge Representation Database.

C) The Natural Language Interface (NLI) is a novel system for enabling human interaction with the Knowledge Representation Database by using human language. The NLI system employs novel means for parsing input expressions in that it employs a sequential combination of a transitional network parser (related to an Augmented Transition Network) and a pattern matching parser (related to Parsing by differences lists methods). Both parsers are further unique in that they are based on the level of abstraction and fundamental relationships of a concept in the knowledge representation database instead of the human language grammatical function of the concept.

D) The method for automatically deriving a multitude of documents is based on abstracting standard documents or displays of knowledge into Views, Classes, and Types, wherein the Types define the vocabulary, the Class defines the grammar, and the View defines the connectivity and interaction, and is without precedent.

E) The user interface integrates the principal characteristics of GUI, Hypertext, OLE, and context sensitive programming in a single integrated user environment. This integration is without precedent, and is implemented in the invention by novel means which are significant improvements over the means currently known to the art for these technologies.

In this invention, the hypertext-like behavior is a consequence of the relationships stored at each record so that the view document has the feel of having hypertext implemented on a massive scale; every icon is a portal to all other view documents containing the concept and is also a portal to all related concepts. This contrasts with the Hypertext idiom which typically employs user defined locational links between documents which operate as an adjunct to static document representation.

The Knowledge Representation system further utilizes external relationships which enable the linking of records in the database to file or programs external to the Knowledge Representation Database.

NOTES ON IMPLEMENTATION

A suitable computer platform and programming environment for the implementation of the invention must be selected by the system developer. The programming environment should easily accommodate the kinds of structures that are required for the knowledge representation.

The Knowledge Representation Database can be implemented on a wide variety of computer systems and hardware. Generally the Knowledge Representation Database will be stored on nonvolatile memory media such as a hard disk, tape, optical disk, etc.

The minimum requirements of a programming environment with database capabilities suitable for implementation of the knowledge representation are summarized in FIG. 2. The database capabilities can either be native to the programming environment or developed by the system developer. Unique reference numbers (2a) must be available in the system for each record. A reference number is any unique tag or label (of any data type) for the record. The reference numbers must be permanently associated with the records (2b). The database must be able to store reference numbers in the database records and associated index(es) (2c). The reference number is typically a standard data type in the development environment.

The reference numbers must be uniquely and permanently associated with each record because the reference numbers are used to cross reference the records by recording reference numbers within the records themselves. The system must store these reference numbers in the database records, as the references to other records contained in a record define the relationship of record to the network of records in the knowledge representation database. The environment should include a database indexing scheme or enable the designer to be able to implement an index to the records in the database (2d). The provision for indexing the records in the database enables rapid identification and retrieval of desired records. The indexing scheme should accommodate indexing key word(s) associated with a record and also indexing selected reference numbers indicating relationships to other records.

Various standard schemes for indexing (B-Trees, hashing, etc.) are currently available. An appropriate scheme will be apparent to the developer once the principles of the invention are understood. Therefore no specific disclosure of an indexing scheme or details of implementation of the indexing scheme are provided in this disclosure. The embodiment in the appendix used a B-tree indexing scheme.

The environment should not restrict the record data type which may be declared for the database since the record data types of the invention include complex data types as disclosed subsequently (2e). The relationships maintained by a record are represented in substructures of complex data types accommodating a wide variety of standard data types. The environment should not restrict the record length (2f). Variable length records are desirable to enable the dynamic addition of relationships to the records. Each record may maintain an unbounded number of relationships: the number and type of relationships differ with each record.

The lack of restriction on the record data typing and record length will provide the widest possible latitude to the system designer in selecting and implementing data types appropriate to the knowledge domain. If restrictions on data type and record length do exist, it may be possible to implement "work arounds". Such work arounds may include record chaining and data type conversion algorithms. Such algorithms, if required, will be known to a skilled practitioner and are not discussed further herein. It is best to avoid systems which will restrict the data typing and record length of the records.

The structures of the records for the Knowledge Representation Database are typically established as data typing (domain) declarations in the programming language in which the structures are implemented. Suitable mechanisms for declaring such structures are provided by the various programming languages or tools which are suitable for implementation of the invention. Since such mechanisms are a property of the specific system in which the invention is implemented, they are considered to be standard and are not discussed in detail in this disclosure.

The invention can be implemented in a wide variety of standard computer systems. The preferred embodiment of the invention included in the appendix was on DOS® PCs using the programming language PDC Prolog® with Pharlap® Extenders. The preferred embodiment illustrates the adaptability of this invention to standard programming environments.

Prolog® is a declarative language. Declarative languages are distinct from procedural languages in that Declarative languages are not easily represented as procedural flow diagrams. In the following discussions, flow diagrams are used to illustrate the essential procedures and processes embodied in the invention. However, these flow diagrams, while illustrating the essential procedures, must be understood as embodying a procedural equivalent of the declarative code found in the Prolog program.

BRIEF DESCRIPTION OF THE DRAWINGS

FIG. 2 is a chart of Minimum Requirements for a Development Environment Suitable for Implementation of the Knowledge Representation Database;

FIG. 8 is a chart of Summary of Strata Characteristics;

FIG. 10 is a chart of Summary of Typical Useful Attribute Properties;

FIG. 11, shows as FIG. 11A and FIG. 11B, is a chart of Summary of Typical Useful Attribute Classes;

FIG. 12 is a chart example of Domain Declaration for Knowledge Representation Database;

FIG. 14 is a Flow Diagram of Programmed Means for Assuring that System Concepts are Inviolate;

FIG. 17 is a chart Summary of the types of Relationship Inheritance Based on the Descriptive Networks;

FIG. 23 is a chart of Domain Declaration for Descriptive Database;

FIG. 29 is a chart Summary and Description of Specific Rules Implemented as System Concepts in the Preferred Embodiment;

FIG. 30 is a chart Summary and Description of Specific Rule Properties Implemented as System Concepts in the Preferred Embodiment;

FIG. 34 is a Database Declaration for NLI Functional Identification Used in Augmented Transition Network Parse;

FIG. 35 is a chart Summary of Suggestions for System Concepts and Associated User Concepts to add to the Knowledge Representation Database for NLI;

FIG. 37, shown as FIG. 37A and 37B, is a chart showing Examples of Views, Classes, and Types Comprising a Plurality of Views of the Knowledge Representation;

FIG. 39 is a chart Domain Declaration for Tracking Active;

FIG. 41 is a chart Summary of Correlation Between View Derivation Step and Level of View Document Abstraction;

FIG. 46 is a chart showing Examples of Defining and Auxiliary Relationships for Various Types of Documents;

FIG. 51 is a chart Summary of Icon Symbology;

FIG. 52 is a chart Summary of Symbol Interpretation;

FIG. 73 is a diagram illustrating a data structure for storing potential value relationships according to the embodiment of FIG. 71;

DESCRIPTION OF THE PREFERRED EMBODIMENT

Figure 1:
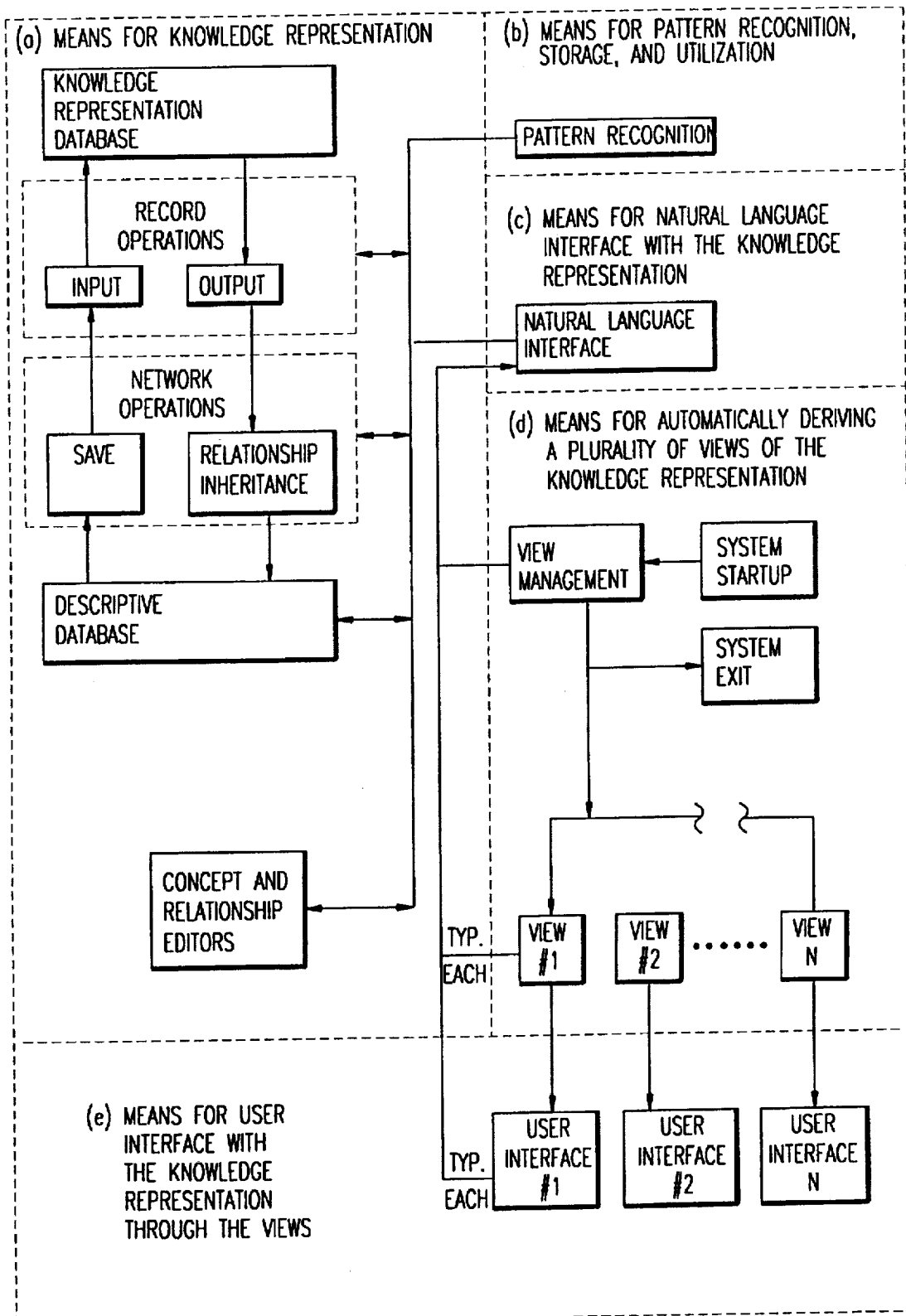
FIG. 1 is a schematic diagram of a system for representing knowledge in a computer database according to the present invention.

FIG. 1 is a schematic diagram which highlights the primary constituents of the invention. A detailed discussion of each of the constituents is provided in subsequent sections following this introductory overview.

The Knowledge Representation Database (1a) is a new type of database system which represents knowledge as a network of a plurality of cross-referenced records comprising a computer database. The representation of knowledge is based on the insight that knowledge is a network of concepts and relationships between concepts (i.e. the meaning of a concept is defined by its relationship to other concepts). Concepts are embodied as individual database records. Relationships between concepts are embodied as substructures within the records which store database reference numbers of other records. "Knowledge" is thus embodied in the resulting network of records and cross references between records.

An effect of this system for Knowledge Representation is the creation of a massively cross-referenced database wherein the cross-referencing is the essence of the database instead of an adjunct or supplement thereto. All of the cross referencing is transparent to the user. An advantage of this system is thus that it achieves the implementation of "knowledge" representation in a computer instead of just data storage, and thus may be contemplated as a "thought" processing system as opposed to a conventional "data" processing system.

The pattern recognition, storage, and use module (1b) enables the representation of abstractions of the patterns of relationships in the knowledge representation. These abstractions of the patterns of relationships are stored as relationships within the Knowledge Representation. When these stored patterns are used in conjunction with means for editing the network of the knowledge representation, the result is intelligent behavior reminiscent of some types of expert systems. The results are, however, achieved by means novel to this invention.

If, for example, in the creation of a chemical processing plant five different kinds of instruments have been used in subassemblies of a tank, upon creation of another tank, the system will suggest the five instruments as likely subassemblies to the system user. Because this is a "learn by use" system instead of an a priori declaration-of-rules type system, the system "gets smarter" the more it is used.

The Knowledge Representation system enables the implementation of a Natural Language Interface (1c) with the Knowledge Representation Database. The Natural Language Interface enables human language interaction with the Knowledge Representation. This is accomplished by recognizing possible patterns (or schemas) of relationship between the concepts in the database. Human language queries or statements are then evaluated by matching patterns in the expression to the patterns of relationship in the knowledge representation database by means of serial parsing a primary characteristic of which is the use of the location of a recognized expression in the Knowledge Representation Database instead of the grammatical function.

This means, for example, that a system user can ask for 'all devices connected to FCV100 and not in cabinet M4F' directly, without resorting to any special commands for structured query languages.

A major consequence of the Knowledge Representation system of this invention is enabling the Knowledge Representation to be "viewed" or perceived through a multitude of documents, through the (1d) means for automatically deriving a plurality of documents of the Knowledge Representation. The Knowledge Representation is not oriented to representation of data in any one particular document or view format: rather, it is enabling of all possible documents. Given the view, the computer can automatically derive any specific document embodying portions of the information in the Knowledge Representation Database.

Both traditional and non-traditional documents which illustrate or describe portions of the concepts and relationships in the knowledge representation can be implemented in the system. Examples of traditional documents include schematic diagrams, dimensioned drawings, standard database forms, text based documents, spreadsheet and financial summaries, etc.

For example, a valve may appear in as many as sixteen different documents in the documentation for a process plant, represented by four or five different icons.

The knowledge representation supporting the needed relationships can be accessed by the program defining the view to create the appropriate descriptive database of concepts pertaining to the document. The program defining the view will then select the appropriate icons and morphology sequentially and can develop all sixteen documents with the valve appearing in its different icon forms and in the different document formats.

Each view is comprised of a plurality of classes. Each class is comprised of a plurality of document types. All specific documents are instances of a view, class, and type. Views, classes and types are implemented as programmed means.

Views embody procedures for defining relationship icons and coordination with the means for user interaction.

Classes embody the definition format and icon placement (i.e. grammar).

Types embody procedures for identifying the concepts relevant to the document by means of reading concepts in networks of defining and auxiliary relationships and embody procedures for icon assignment (i.e. vocabulary).

The view documents are comprised of icons representing the concepts and relationships pertinent to the document. These icons are created by the view program. The icon definitions contain the reference numbers of the concepts or relationships in the knowledge representation which the icon represents. Each icon is thus associated with a plurality of distinct items in the Knowledge and Descriptive (discussed below) databases, each of which is potentially symbolized by the icon.

The (1e) means for user interface with the Knowledge Representation through the documents enables a plurality of behaviors for each icon based on interpretation implied by the context. A document is comprised of icons representing a small subset of the concepts and relationships present in the Knowledge Representation Database. An icon can be interpreted as representing the plurality of implied relationships in the network. Utilizing these implied meanings allows the invention to develop extraordinarily context sensitive interaction with the Knowledge Representation. This is achieved by means of decision trees of system responses designed for each view where the substance of the decision tree is the evaluation of the interpretation implied by the context of the interaction. This evaluation of context is without precedent in the art and enables the novel features of the means for user interaction of the invention.

The user interface modules integrate the principle characteristics of GUI, Hypertext, OLE, and context sensitive programming in a single integrated user environment. The icons may behave like Graphical User Interface (GUI) icons in that they can trigger the procedures appropriate to the manipulation of the icon. The icons may also behave like Hypertext links in that they are linked to procedures that can automatically derive all view documents of the concept and all concepts and relationships associated with the concept. The icons may also behave like Object Linking Embedding (OLE) systems in that the icon can be the launch point for an external program or file represented by the icon.

(1ab) MEANS FOR KNOWLEDGE REPRESENTATION

Figure 3:
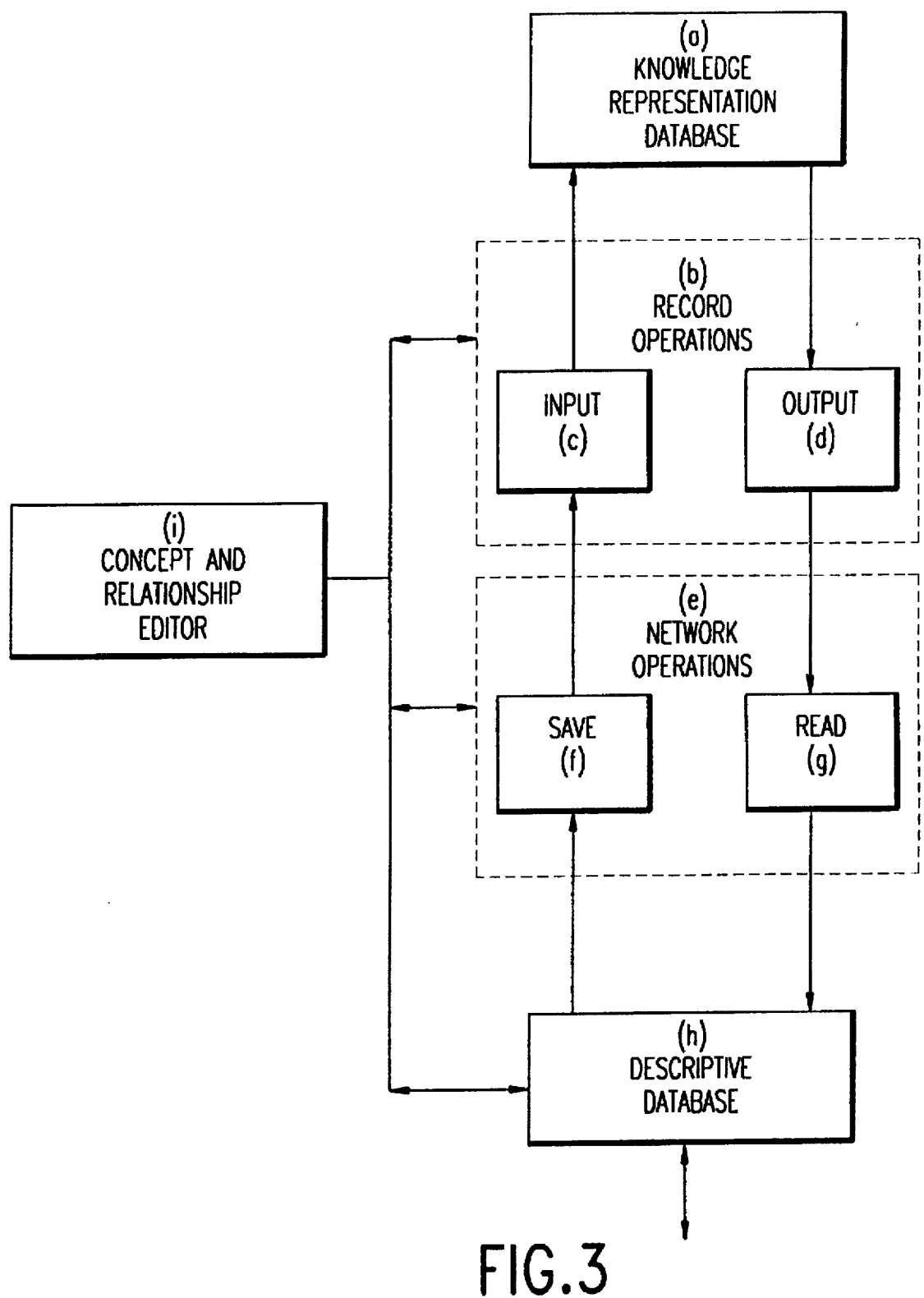
FIG. 3 is a Schematic Summary of the Means for Knowledge Representation.

FIG. 3 provides a schematic summary of the means for knowledge representation which is an expansion and annotation of the FIG. 1 (1a) Means for Knowledge Representation. Knowledge representation embodies knowledge as information stored in a plurality of records in a computer database. Each record is comprised of substructures (herein called relationships) which contain reference numbers to other records. Relationships are comprised of two constituents: a characterization of the relationship; and a value for the relationship. These relationships define the network of knowledge among the plurality of records. On a micro level, the network is comprised of the records and relationships stored in the computer database. On a macro level, the essence of the invention is the totality of the network comprised of the plurality of records and relationships. The Knowledge Representation Database stores information in a plurality of records in a computer, and represents relationships between the records by storing record reference numbers within the records.

Record Operations (3b) are programmed basic operations for editing and interacting with the records comprising the Knowledge Representation Database. Both Input operations (3c) which store information in the records, and Output operations (3d) which retrieve stored information from the records are provided.

Network Operations (3e) are programmed basic operations for interacting with the network of concepts and relationships in the Knowledge Representation Database. The Network Operations transfer information between the Knowledge Representation Database and the Descriptive Database (3h). The Network Operations thus interpret and translate the structure of both databases. The "Save" operation (3f) saves information from the (3h) Descriptive Database in the Knowledge Representation Database, using the Input Record operation (3c). The Save operations are useful in situations where modification to the Knowledge Representation Database is to be buffered by allowing user modification first to the Descriptive Database. If the Descriptive Database (3h) is used to buffer the changes, then the Save operations are used to transfer the modified data from the Descriptive Database to the Knowledge Representation Database upon user invocation of the save operation.

The "Read" operation (3g) reads information from the Knowledge Representation Database by using the unit operations of the Output Record operation (3d). The Read operation is able to retrieve information in the Knowledge Representation Database network through rules of Relationship inheritance (further discussed below) by which records are retrieved according to reference numbers found within other records. The Read operation further provides the means for limiting the network traversal and deriving descriptions for "Active" concepts (further discussed below) in the Knowledge Representation Database, and for storing the descriptions in the Descriptive Database. The Read operations are described in further detail subsequently. The Read operations assemble a specific Descriptive Database from the general concepts and attributes in the Knowledge Representation Database.

The Descriptive Database (3h) is a database which stores the information relevant to the description of a specific concept or concepts that is distinct from the general concepts of the Knowledge Representation Database, while maintaining identification of the corresponding reference numbers in the Knowledge Representation Database of all components and relationships constituting the specific concept description.

The data structures of the Descriptive Database associate various record reference numbers of the relevant records in the Knowledge Representation Database with the information contained in the records to provide a plurality of associations for the information in a specific environment or perspective.

The Descriptive Database is a "working" non-permanent database. The transfer of information to the Descriptive Database from the Knowledge Representation Database is made to consolidate the relationships in the concept records of the Knowledge Representation Database which are expressed as references to other concepts into descriptions of the concepts themselves. The description of the concepts facilitate the human-perceivable views, and consequently user interaction with the Knowledge Representation Database.

The Descriptive Database is called "descriptive" because it is an assembly of a set of relationships which describe a particular concept in the Knowledge Representation Database; and it serves as an intermediary between the Knowledge Representation Database and the (1d) Document module and (1e) View User Interface (FIG. 1) where the "views" provide the human understandable depictions of the knowledge in the Knowledge Representation Database in the form of documents such as tree diagrams, schematic diagrams, and text forms.

The Concept and Relationship Editor (3i) performs operations relevant to editing the concepts and relationships comprising the records of the Knowledge Representation Database. The Concept Editor may add and delete concepts to the Knowledge Representation Database, including establishing fundamental relationships required to assure that all added concepts are linked to appropriate system concepts. The Relationship Editor performs operations relevant to editing relationships in the Knowledge Representation Database. The Relationship Editor is used to edit both the fundamental relationships and the relationship list of each concept record, including editing both the characterization of the relationships and the Values of the relationships.

(3ab) KNOWLEDGE REPRESENTATION DATABASE

The Knowledge Representation Database will generally be implemented in a plurality of database files as illustrated in FIG. 10. The Knowledge Representation Database will always consist of at least one Environment Database (4a) and associated index(es) containing both the Attribute Property, Attribute and Component libraries common to all Projects. This database is referred to as the Environment Database, in that it provides the environment for the creation of specific projects. The Environment Database may be comprised of a plurality of databases with associated index(es). In such case, the plurality of databases will be comprised of databases containing the same information as identified above, wherein the information is divided and arranged within the plurality of files.

The Knowledge Representation Database will also generally consist of a plurality of Project libraries (4b). The projects are typically implemented as separate databases with associated index(es). These databases are referred to as "Project Databases", in that each project database contains the project library for a project. If the system is being implemented for a knowledge domain characterized by single project maintenance, then combining the Environment and Project libraries in a single database file may be preferable.

Most real world knowledge domain applications have an environment comprised of a set of Attributes and Components which are used to construct a variety of specific Projects. An organization working in such a knowledge domain will create Projects which are networks of specific instances of the components. The Projects embody the specific knowledge required to achieve an objective of the organization.

Figure 4:
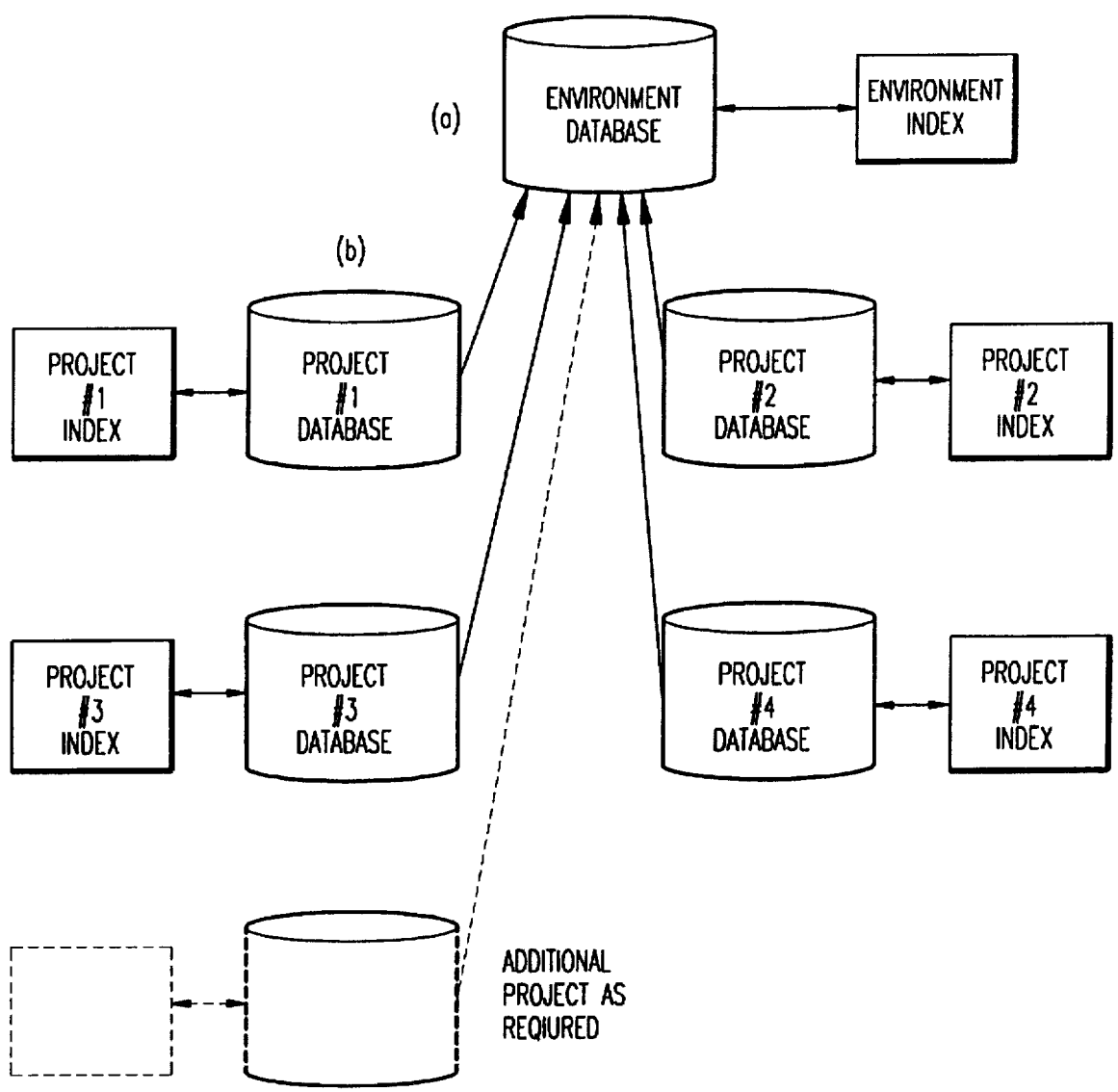
FIG. 4 is a Schematic Diagram of Knowledge Representation Implemented in Multiple Files.

For the purposes of the following disclosure, and the preferred embodiment, a multi-project scheme as illustrated in FIG. 4 will be presented, wherein each project is contained in a separate file with all projects referencing a common Environment Database. The single database case is a simplification and easy adaptation of the multi-project scheme and therefor will not be discussed or presented further. The Values of the relationships are comprised of a plurality of domains which accommodate various data types which may be stored. Each of these domains potentially require distinct modes of editing and initiating values of that domain.

The relationship value editor is typically comprised of a plurality of editors, each of which is designed to facilitate the editing of a particular value domain.

Each of the constituent components mentioned above will now be discussed in detail. Each record in the knowledge representation database corresponds to a concept. Concepts are named points in the network of relationships comprising the Knowledge Representation. Each record stores a plurality of relationships. Concepts can be visualized as points or nodes in a network. A large number of relationships radiate from each concept to other concepts within the knowledge representation.

Each record has a unique record reference number. This reference number is permanently assigned to the record. The reference number is used by the computer system to refer to the concept instead of the name of the concept because the reference number is unique whereas the name is often not unique. The reference numbers are always used in defining relationships.

In the simplest conceptualization, a record representing a concept in a computerized system is comprised of a list of data structures for storing relationships: the record is comprised of a list of relationships to other concepts. In its simplest form, knowledge is represented by a plurality of records, each of which stores a plurality of relationships to the other records.

Relationships provide the means for storing the cross references in the plurality of records comprising the network. A plurality of relationships are stored within each record in the Knowledge Representation. The relationships are the operating system reference numbers defining the connections between concepts in knowledge representation. Relationships are comprised of: 1) a Characterization or Attribute that is a reference number of a concept record that identifies the properties of the relationship; and 2) a value (or values) that is the object of the relationship.

The Characterization is the identification of the nature of the relationship between two concepts. For example, assume 'Lynn' is a concept and 'Wendy' is a concept. If it is true that 'Lynn' and 'Wendy' love each other, then a Characterization of a relationship between 'Lynn' and 'Wendy' is 'love'. The Attribute or Characterization of their relationship is thus 'love'. Values are the object of the relationship. The Values may be either internal or external. For example, if 'Lynn' has the Attribute of 'love' and 'Lynn' loves 'Wendy', then 'Wendy' is the Value of the relationship characterized by the Attribute of 'love'.

This relationship is formed in a record where the concept is 'Lynn'; where the Characterization portion of the relationship contains the reference number of the record representing 'love' and the Value portion of the relationship either contains 'Wendy' or a reference to the record storing 'Wendy' as a concept.

Internal Values will typically be comprised of: 1) a reference number of the concept that is the object of the relationship; and 2) a reciprocal Characterization that is the reference number of the concept that characterizes the relationship from the point of view of the object concept.

External Values will typically be comprised of data types other than reference numbers. In some applications, a mixture of internal and external Values may be desired. These mixed values also may be accommodated under the provisions this invention.

In all real embodiments, some concepts will be external to the knowledge representation. Such concepts will be known by name only. The name of the external concept will be meaningful to a human user, but the relationships maintained by name concept will be unknown to the knowledge representation. External values will be stored as some standard data type. For example if 'color' is the Characterization and the Value is of external concept 'blue' then the ASCII characters 'blue' would be stored as the value.

Internal relationships are, in general, reciprocal, meaning that if A is related to B then B is also related to A. It is typically useful to record this reciprocal Characterization within the reciprocal relationships because in many cases the characterizations are different. The reciprocal relationship is the characterization within the object concept which is the characterization of the relationship whose object is the source concept.

For example, if 'Lynn' and 'Wendy' are both internal concepts and, if 'Lynn's' relationship with 'Wendy' is characterized by 'wife' and 'Wendy's' relationship with 'Lynn' is characterized by 'husband', then 'husband' is the reciprocal characterization for 'Lynn's' relationship with 'Wendy'. Storing 'husband' as the reciprocal characterization within the relationship characterized by 'wife' will provide important information concerning the relationship between 'Lynn' and 'Wendy'. Similarly, 'wife' is a reciprocal characterization for 'Wendy's' relationship with 'Lynn'. Note that the record reference numbers of 'wife' and 'husband' would be stored in the 'Wendy' and 'Lynn' records.

Figure 5:
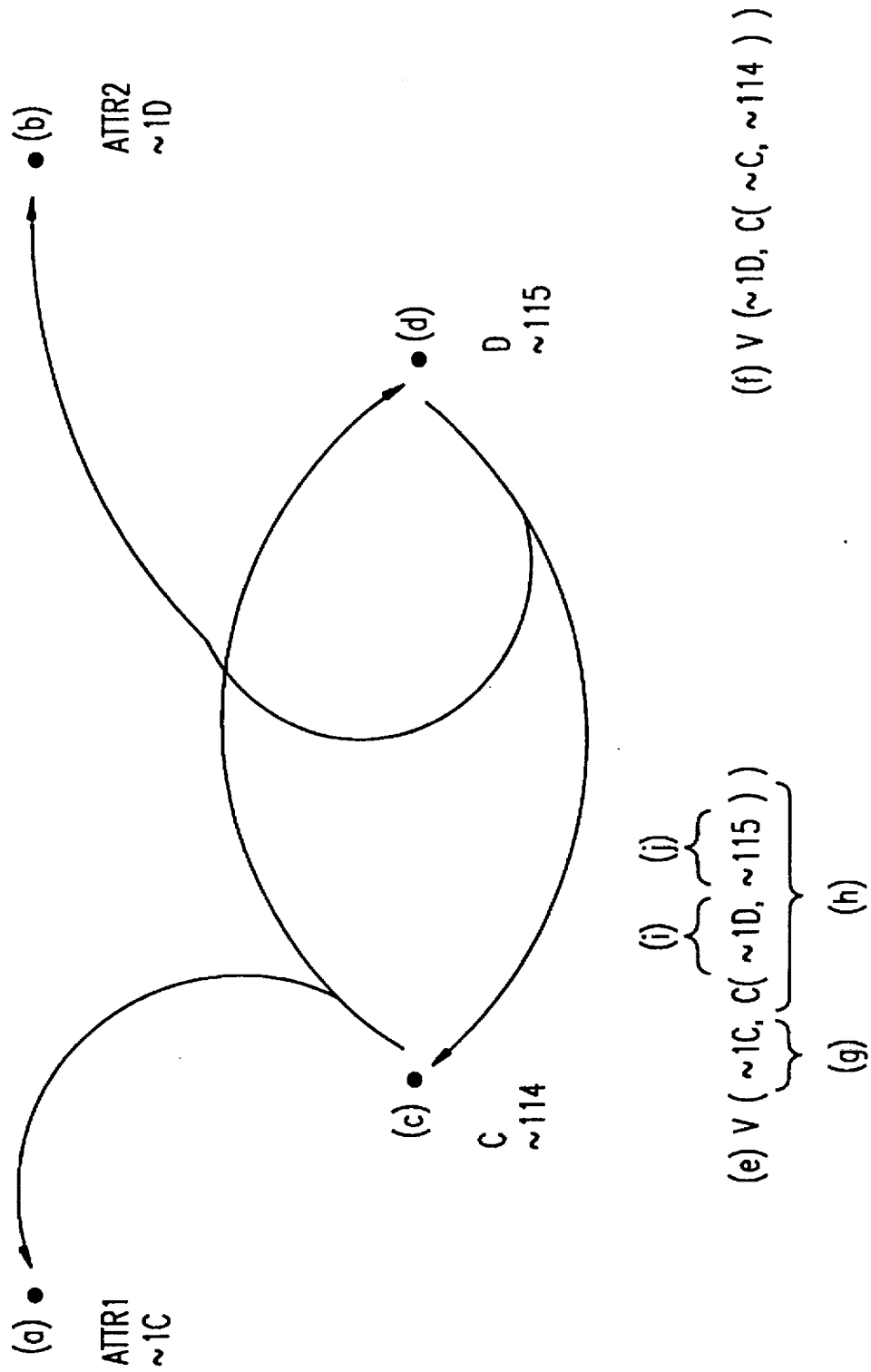
FIG. 5 is a diagram of References in Values of Conjugate Relationships Must Correlate.

FIG. 5 illustrates that references in values of reciprocal relationships must correlate. (5a) and (5b) represent Attribute concepts used in characterizing the relationships between (5c) and (5d) which represent related concepts. The dots illustrate the record. Below each dot a name for the concept and the record reference number (the reference numbers are always preceded by (tilde) in the illustrations) are shown. Arrows between the dots illustrate the references between the records. Items (5e) and (5f) illustrate the relationships which would be stored in the records representing (5c) and (5d) respectively. Item (5e) is comprised of a characterization of the relationship which stores the reference number of (5a), and the internal (5h) value structure which is comprised of the reference number of the attribute of (5b) and the reference number of the concept (5d) which it is connected to. Item (5f) has the reciprocal structure with a val referencing (5a) and (5c).

Figure 6:
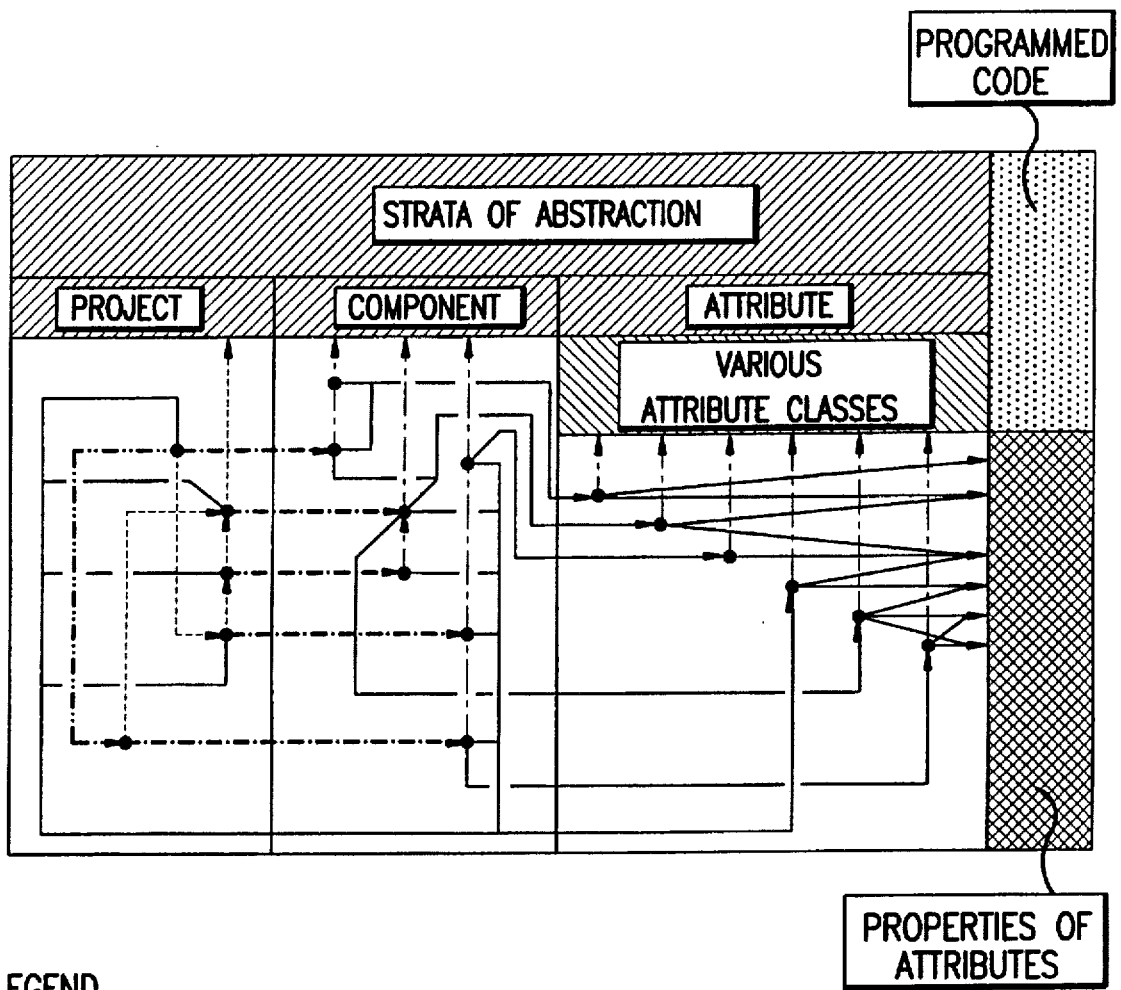
FIG. 6 is an illustration of the Organization of Records in Knowledge Representation.

FIG. 6 illustrates the organization of the Knowledge Representation Database. The system concepts of (6a) Properties, (6b) Strata, and (6c) Attribute Classes, fundamental relationships of Intrastratum, (6g) Taxonomy, (6h) Composition and (6i) Interstrata, and (6f) relationship characterizations provide the essential large scale structures for the knowledge representation. A result of the system concepts and the fundamental relationships is that the knowledge representation has a structure that may be visualized as a tree structured hierarchy.

Figure 7:
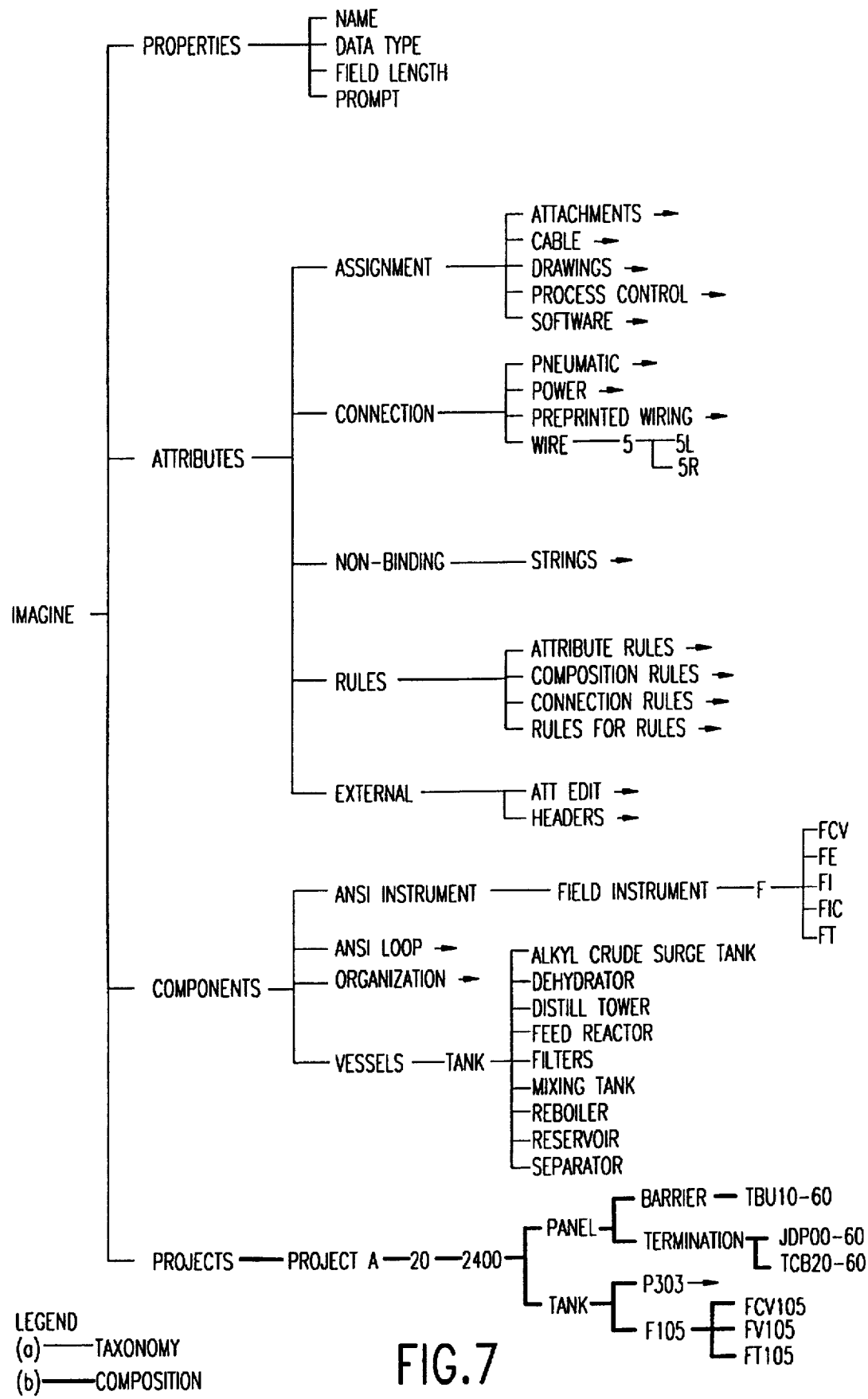
FIG. 7 is an illustration of Library Structure Used in Knowledge Representation.

This is clear if the attribute characterizations and the type relationships are suppressed and examples of (6e) User Concepts are provided in FIG. 7. Note that the interstrata relationships in the tree structured hierarchies of FIG. 7 have specific meanings: the organizing principle of the Attribute and Component strata can be thought of as (7a) taxonomy (i.e. Class and Subclass); while the organizing principle of the Project stratum can be thought of as (7b) composition (i.e. structure and substructure).

FIG. 8 summarizes the occurrence of the fundamental relationships in the records of each of the four typical levels of abstraction. The level of abstraction system concepts characterize which of the relationships are present in the records of each library. There are two types of cross references between levels of abstraction: reciprocal relationships between concepts of different levels of abstraction (interstrata relationships); and the relationship characterization reference numbers always belong to a level of abstraction higher than the level of the concept storing the relationship. This means that the characterizations of Attribute relationships reference only Attribute Properties, and the characterization of relationships of components and propagations reference Attributes.

The use of reciprocal relationships in the fundamental relationships enables traversal through the network in either direction. This enables queries based on an objects Class or Subclass, Structure, or Substructure, Type, or Instances. In some implementations of the invention, the reciprocal relationships will not be expressed (e.g. a concept may have a class but it is not referred to as a subclass). However, this will seriously reduce the effectiveness of the Knowledge Representation Database and eliminate some important properties of the Natural Language Interface and the Plurality of views which may be implemented for the Knowledge Representation.

The intrastratum and interstrata relationships are called fundamental relationships herein. The intrastratum relationship is required for all strata. The interstrata relationship is required for all propagations.

System concepts are those concepts which the programmed (code) portion of the system recognizes and requires in order to interpret the knowledge network. System concepts represent code defined interpretation in the knowledge network. All other concepts are user concepts. References to system concepts in the network are, in effect references to code interpretation. The code embodying the meaning of system concepts is distributed throughout the program portion of the system since these concepts have system wide implications.

Figure 9:
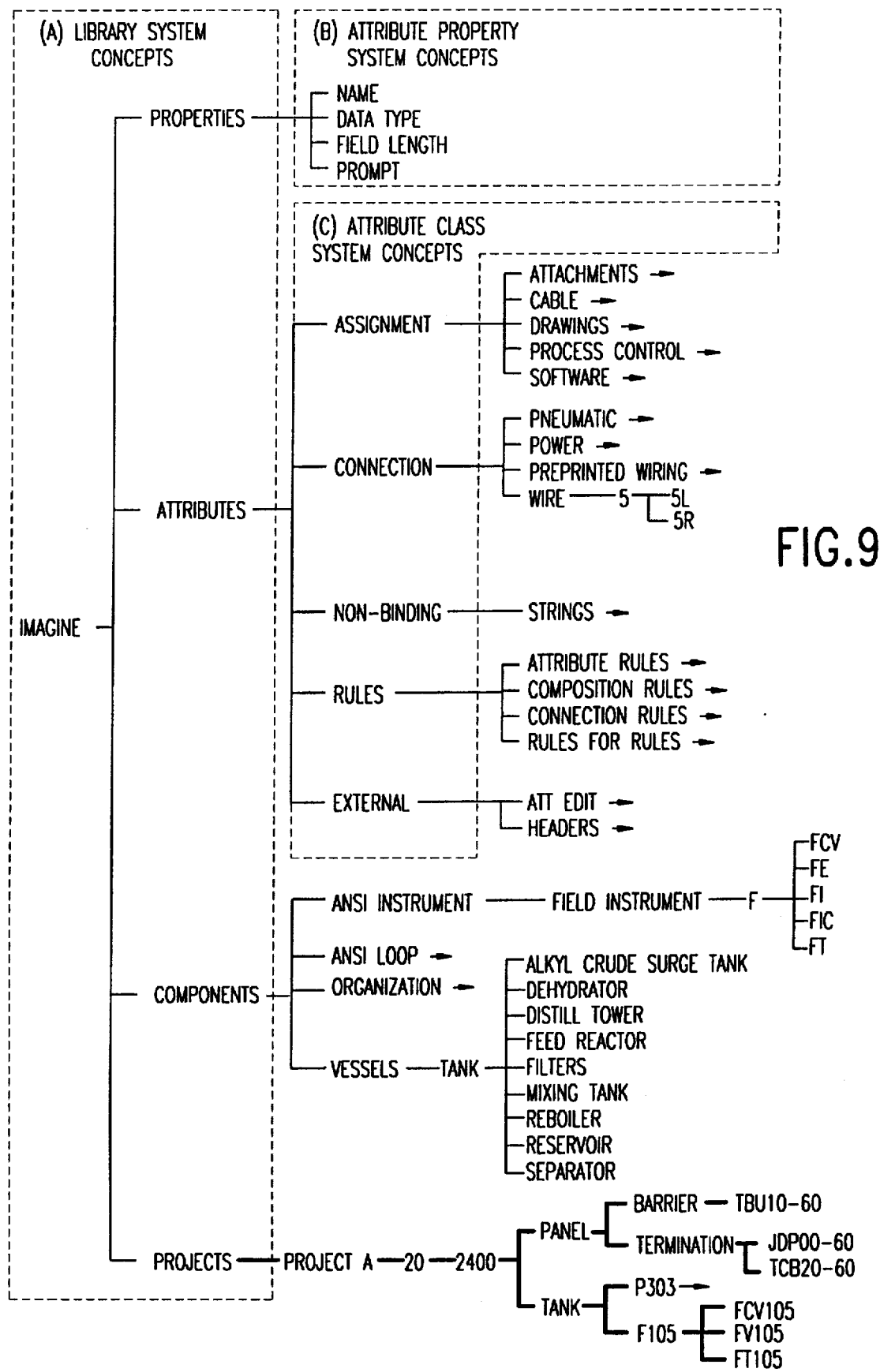
FIG. 9 is an illustration of System Concepts in the Library Structure used in Knowledge Representation.

FIG. 9 is an adaptation of FIG. 7 designed to highlight the system concepts included in FIG. 7. These are examples of system concept included in the referred embodiment. FIG. 9 also indicates the intrastratum organization of these concepts as a tree structured diagram and associates examples of typical user concepts. There are three classes of system concepts which are recommended for any embodiment of the Knowledge Representation (see FIG. 3): Attribute Properties, Strata of Abstraction, and Attribute Classes. Each of these classes of system concepts are comprised of a plurality of individual concepts which are recognized by the programmed code in order to interpret the meaning of the knowledge network. All Attribute property concepts are system concepts in that they comprise the highest level of abstraction and are the basis for the definition of all lower strata. The Attribute Properties must be implemented as system concepts in any embodiment of the invention. The levels of abstraction system concepts define which of characteristic types of fundamental relationships apply to the concepts on each level of abstraction. System concepts embody the notion of the inter and intra strata relationships appropriate to each strata. There are four strata which will always be present: Attribute Properties, Attribute, Component, and Project (or equivalent propagation of components.)

The Attribute Class system concepts define which attribute properties will characterize the relationships of the descendants thereof. The descendants of the Attribute Classes are user defined attributes which characterize user defined relationships. Attribute classes could be defined by means of a plurality of relationships characterized by Attribute Properties. It is simpler and more convenient to explicitly identify the Attribute class concept as system concepts and embody system definition of the class behavior.

There are four characteristic levels of abstraction which are typical of knowledge and which are included as examples in the preferred embodiment and comprise the basis for the subsequent discussion. The concept of the invention comprises extension to additional strata and to pluralities of related strata within each type. Subsequent discussion will focus on the four examples in order to achieve an economy of exposition. The four strata are summarized in FIG. 8 as being comprised of 1) properties; 2) attributes; 3) components; and 4) propagations (or projects). FIG. 8 summarizes the strata characteristics. Column A identifies each of the four strata. Column B provides a brief description of the strata in terms of the function of concepts in each strata within the knowledge representation. Column C identifies the intrastratum connectivity in terms of the significance of relationship used to connect all of concepts on a particular stratum. Column D of FIG. 8 shows the stratum used in the characterization of relationship for each of the stratum. And Column E shows the interstrata relationships maintained at each stratum.

The Attribute Properties are the most abstract level of knowledge represented in a knowledge representation. Properties are the concepts characterizing relationships required to define attributes. They can be thought of as the attributes of attributes in that they are the only class of concepts used as characterizations within the relationships of concepts comprising the attribute strata.

FIG. 10 summarizes some typical useful Attribute The Attribute Properties comprise an unbounded set, which can be augmented as desired. Many useful Attribute Properties can be defined to achieve specific design objectives.

Attributes are the class of concepts most commonly thought of as attributes of characterization of relationships. For example, love, husband, wife, height, date, time, would all be attribute concepts. Attributes are the second highest level of abstraction in that they are comprised of a multiplicity of relationships the characterization of each of the relationships is always an incomplete property.

FIG. 9 illustrates an example set of Attribute Class System concepts in the dashed box. The number of Attribute Classes can be reduced or augmented within the spirit of the invention. The Attribute Class System Concepts are organized under the Attribute Library System Concept. Useful embodiments of the invention can be implemented using only one or two classes.

FIG. 11 summarizes typical Attribute Classes which have been found useful. These Attribute Classes are provided as a suggestion to a system designer implementing the invention. The Attribute Classes comprise an unbounded set which may be augmented as desired. Many useful Attribute Classes can be defined to achieve specific design objectives in modeling knowledge domains.

The Attribute Classes define which characterizations of relationships apply to the user concepts of the class and limit the values that said relationships may assume. The Attribute Classes define or constrain any behaviors, properties, or values which apply to a class of user concepts. The Attribute Classes may be seen as the enabling means for user definition of concepts which can be used in the characterization of relationships maintained by Component and Project concepts.

1) Database Data Type Domains Declaration

FIG. 12 illustrates an example of a data type domain statement that enables the creation of a plurality of records and relationships therebetween for storage of the information comprising the network of information in the Knowledge Representation Database. The record structures and substructures are used by the program to interpret the information stored in the records and substructures. The domain statement is generally common to all records comprising the Knowledge Representation Database. However, derivative embodiments may include different record structures, depending on the library or class. The domain statement of FIG. 12 is based on PROLOG language conventions, and can easily be adapted to the programming environment of choice.

The data domain statement for the records is preferred for storing information in the Knowledge Representation Database. The specific characteristics of the domain statements disclosed herein are unique to the invention and constitute a significant contribution to the state of the art. FIG. 12 illustrates optimizations for representing the fundamental relationships and for representing attribute properties in the database records. Both of these optimizations will be discussed in following subsections.

The discussion of the optimizations provides a convenient forum for discussing the principles of concept representation which are employed in the invention. In database domain declaration, the constituents must be declared prior to declaring the whole. In FIG. 12, the whole is the concept declaration (12r), which is the statement of the record structure.

A "Concept" is represented as a complex record structure comprised of a Name (12a), Parents (12o), Children (12a), Interstrata (12q), and a Relationship List (12n). The Name is the name of the represented concept. The fundamental relationships are embodied in the list of parents, children, and interstrata. The Relationship List stores the relationships maintained by the record. The order of these constituents within the record structure is arbitrary.

The data type declaration (or equivalent implementations) illustrated in the example of FIG. 12 will assure functional implementation of the invention. There are numerous acceptable variants for the declarations which can be implemented to optimize system performance. However, the key features of the domains declaration of FIG. 12 will persist in derivative works.

The Name is the designator for the Concept, and is usually a data string although other data types may be included as appropriate. Note that the segregation of the name is for convenience only. The name is also stored as an external value in the relationship list without appearing as a separate item in the declaration of the Concept.

The Characterization (12b) is a reference number of a related Concept represented in the Knowledge Representation Database. The Characterization always references either a Concept in the Attribute Library or a Concept in the Properties of Attributes Library. Properties of attributes characterize only the relationships of Attribute concepts. Attribute concepts characterize all other relationships.

The Value (12g) is a qualitative indicia related to a relationship. Value is always either a reference number to a concept or concepts in the Knowledge Representation Database, to concepts external to the knowledge representation, or to a combination of both internal and external concepts. Internal Values (20c) are a class of Values containing only reference numbers of records in the Knowledge Representation Database. The form of Internal Values illustrated is comprised of two reference numbers. One of the reference numbers identifies the Concept record related to, while the second reference number identifies the characterization of the reciprocal relationship. The statement of Internal Values shown is the most common and characteristic type of Internal Value used in the Knowledge Representation Database, however, numerous additional structures derivative of the principles disclosed herein may be implemented at the system designer's discretion.

External Values (12d) are a class of values which contain no reference numbers since they reference external concepts not represented as records in the Knowledge Representation Database. External values typically consist of standard data types of information. Since the domain declaration for values is complex in this invention, the standard domains must be embedded in a complex declaration which will provide structural cues to the data type of the external concept.

A Val (12e) is either an Internal or External Value. It is an intermediate structure used to define Mixed Values (12f). Mixed Values are a class of values containing both reference numbers and standard data types. The Mixed Values can most easily be represented as a list of (12e) Vals. The notation "Val*" is a PROLOG notation signifying a list of Vals. The "*" indicates a list. This notation is similar to notation in many other languages and is used subsequently herein.

(12h) through (12k) are declarations of the standard data type for the attribute properties of Prompt, Data_type, Field_Length, and Location. This is an optimization of the implementation of Attribute Properties that will be subsequently discussed. Properties (12l) declares the properties structure to consist of: (12h) Prompt, (12i) Data_type, (12j) Field_length, and (12k) Location. The order of these elements within the structure is arbitrary. Relationship (12m) allows (12l) Properties as an acceptable relationship. (12m) Relationships are a complex data type associating a (12b) characterization, which is a reference number of an attribute or property characterizing the relationship, with a (12g) Value. The reason for this structure is that each relationship has a characterization or attribute and a value or qualitative measure of the relationship. The (12b) characterization in the relationship is the source of the relationship characterization (d) illustrated in FIG. 8.

All concepts may have an unlimited number of relationships; therefore a (12n) Relationship List provides a structure for enumerating the relationships maintained by a record, as a list of relationships. The (12n) Relationship List structure must allow for the dynamic inclusion of relationships. This dynamic inclusion is a property of the development system and one of the reasons that the development environment should not restrict the record length.

The (12o) parents, (12p) children, and (12q) interstrata, are lists of reference numbers used to store the fundamental relationships of the Concept record. The (12o) Parents are used to store the reference numbers indicating the hierarchical progenitor within the abstraction stratum. The (12p) children are used to store the reference numbers indicating the hierarchical descendants within the abstraction stratum. The (12q) Interstrata is used to store either the Type classification or the Type instances of a concept.

FIG. 12 indicates only (12o) Parents, (12p) Children, and (12q) Interstrata, each of which is a reference list, instead of six relationships of the form of (12m). This variation is the optimization of the Representation of Fundamental Relationships the reasons for which are hereafter presented. The reason that the declarations are implemented as a reference list with no characterization is explained in detail in the following discussion.

Optimization of Means for Representing Fundamental Relationships

There are two classes of fundamental relationships which are used to assure network connectivity: intrastratum (intralevel) and interstrata (interlevel), as discussed previously. Each class of fundamental relationships is comprised of reciprocal relationships, so there should be four relationships of the type represented in the form of (12m) relationships, which should be part of the (12n) Relationships List.

The optimization included in FIG. 12 enhances the operating speed of the system by: 1) segregating the fundamental relationships from the (12n) Relationship List; 2) eliminating the direct characterization in the fundamental relationships; and 3) explicitly allowing for a list of record reference numbers by declaring the domain as ref* (i.e. reference number list).

The segregation of these fundamental relationships allows the programming functions requiring these relationships to "grab" a relationship from a record based on the structural cue of the segregation instead of extracting the relationship from the (12n) Relationship List. The reduction from four relationships to three is accomplished by recognizing that the interstrata relationship is not expressed as a reciprocal in any single record because it is a relationship between a project and component record (i.e. the component has an instance relationship with the project record and the project record has a classification (or Type) relationship never has both Type and instance so only one structure for the interstrata relationship need be present in any record.

These segregated relationships could be represented with the structure indicated for (12m) relationships in FIG. 12. However, this would provide redundant information since both the characterization reference to an Attribute Library system concept and the structure imposed by the segregation would provide cues for the meaning of the relationships. Such redundancy takes more space in the database and requires more record reading in that each (12b) characterization would need to be read.

By relying only upon the structural cues provided by the segregation we eliminate the characterization, and the relationships can be simplified to a reference list (ref*) as indicated in FIG. 12 for (12o) Parents, (12p) Children, and (12q) interstrata. The use of the reference list instead of just a reference number enables the possibility of multiple relations of the segregated types. A consequence of this optimization is that the system concepts for the characterization of fundamental relationships do not need to be present in the Knowledge Representation since the structure of the record now cues the characterization of the relationship. The programmed code will use the structure for the characterization instead. In a particular embodiment the designer is free to provide additional segregation to distinguish particularly significant relationships; the presence or absence of such segregation is merely an adaptation of the invention. In a specific embodiment, the designer is free to use structural cues to eliminate representing some system concepts as records in the (3a) Knowledge Representation Database.

Optimization of Means for Representing Attribute Properties

The domains declaration illustrated FIG. 12 includes an optimization that allows structural representation of the basic attribute properties. The optimization has been implemented whereby standard Attribute Property system concepts are consolidated into a unique structure thereby eliminating the need for explicit representation of said Attribute Properties as records in the Knowledge Representation Database. This optimization is similar to that illustrated previously wherein the need for explicit representation of the characterization of the fundamental relationships as attribute records in the Knowledge Representation Database was eliminated by segregating the relationships to uniquely defined structures. This optimization is possible because so few attribute properties are essential (in this illustration only four) to successful systems. This optimization is suitable for many implementations of the system, in that useful knowledge representations can be constructed with very few Attribute Properties present as system concepts. Note that even if additional Attribute Property system concepts are added, this optimization would still be applicable and would merely be supplemented by suitable modification to the (12*l*) properties declaration or representing the additional attribute properties as system concepts for use as (12*b*) characterizations in (12*m*) relationships.

Notes on Additional Optimizations for Domains Declaration

Some of the additional optimizations include implementing: security; history logging (date and time stamping of last modification to record); explicit library identification within the record instead of implicitly through the network; and segregated identification of the characterization of the name of the record. Most of these optimizations are included in the preferred embodiment. They are not considered essential to the invention and therefor no claims are made with respect to these optimizations. They are representative of optimizations and extensions that will be present in any derivative embodiment of the principles of the invention.

Programmed Code Recognition of System Concepts

The programmed code of the invention uses the System Concepts and Fundamental Relationships in order to interpret the significance of the network. The System Concepts and Fundamental Relationships provide the cues for the interpretation of the network as a whole. The programmed code recognition of System Concepts is comprised of two procedures: steps for designating system concepts; and steps for recognizing a system concept. Both of these must be implemented by the system designer. The essence of the code for designating system concepts is to create a distinction for system concepts (as opposed to external or extrinsic concepts) whereby either the name or the reference number of all system concepts can be readily identified. Such code will readily be implementable by a skilled practitioner.

The preferred embodiment uses three procedures for designating system concepts. These three procedures are redundant, and illustrate the range of possible implementations. Any one of the procedures would be sufficient. The three procedures are: 1) to designate system concepts by means of a supplementary index of reference numbers and names of system concepts; 2) to use an internal database to designate system concepts wherein the system concept reference numbers and names are provided to the internal database at system start-up; and 3) to include a supplementary structure in the record statements whereby system concepts are designated.

Figure 13A:
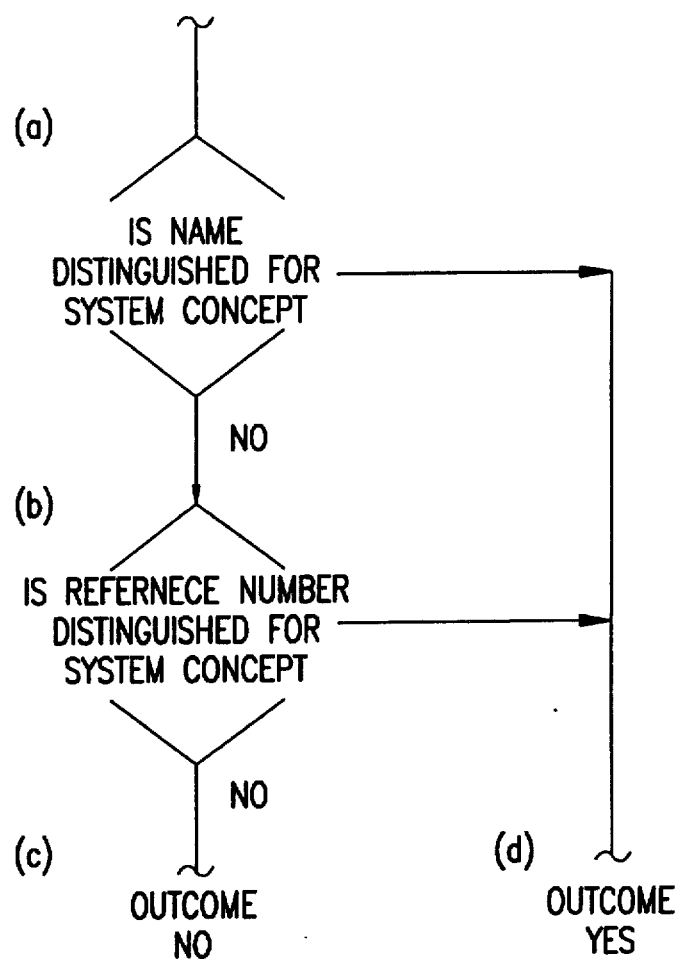
FIG. 13, shown as FIG. 13A and FIG. 13B, is a Flow Diagram of Programmed Means for Recognition of System Concepts.
Figure 13B:
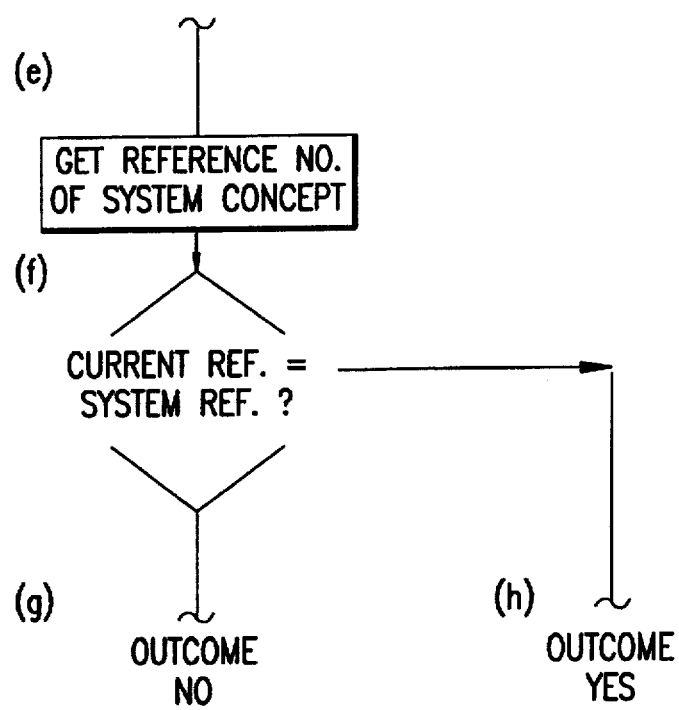

FIG. 13 illustrates a Flow Diagram For Recognition of System Concepts. Two procedures are illustrated: 1) (13*a*) through (13*d*) illustrate steps for recognizing a concept as a system concept; 2) (13*e*) through (13*h*) illustrate steps for recognizing a concept as a specific system concept. Each of these procedures are used within the program to utilize system concepts in interpreting the network. Steps (13*a*) through (13*d*) illustrate programmed procedures for recognizing a concept as a system concept. The result of these steps will either be an outcome of (13*c*) No or (13*d*) Yes. The essence of this procedure is to test whether either the (13*a*) Name is distinguished for a system concept or the (13*b*) Reference Number is distinguished for a system concept. The input to step (13*a*) is either the name, the reference number, or both the name and the reference number of a concept record to be tested. Step (13*a*) then compares the name with all names of predesignated system concepts to determine if the name is that of a system concept. The program determines that the concept record is a system concept if either the name or the reference number has been designated as identifying a system concept. Note that the name of a concept is often ambiguous in that it is possible for several concepts to have the same name. The only unambiguous test is based on the reference number of the record, which is always unique. If the reference number is furnished at step (13*a*) then the test at step (13*a*) should fail (NO) so that the reference number can be tested instead of the name in Step (13*b*). This will eliminate the ambiguity inherent in testing only the name. If the name is recognized as a system concept in step (13*a*), then the (13*d*) outcome is "YES". If the name is not recognized as a system concept in step (13*a*) or a reference number was furnished to step (13*a*), then the (25*a*) outcome is "NO".

Step (13*b*) compares the reference number with all reference numbers of designated system concepts to determine if the reference number is that of a system concept. If the reference number is recognized as a system concept in step (13*b*) then the (13*d*) outcome is "YES". If the reference number is not recognized as a system concept in step (13*b*) then the (13*c*) outcome is "NO".

The second procedure shown in FIG. 13 determines whether a particular concept is a specific system concept. This procedure comprises steps (13*e*) through (13*h*). The input to step (13*e*) must be the reference number of the current concept to be identified. Step (13*e*) gets the reference number of the specific system concept record to be identified. The specific system concept to be identified must be programmed into the section of code either as the name or the reference number of a system concept. The reference number is obtained from the procedure for designating system concepts as explained above. Step (13*f*) then compares the current concept reference number with the system concept reference number. If the reference numbers are the same then the (13*h*) outcome is "YES". If the reference numbers are different then the (13*g*) outcome is "NO".

Assuring that System Concepts are Inviolate

The system concepts must be protected from the effects of inappropriate Record Operations. The Input Operations protect the system concepts by prohibiting any modification to the information in the structure of records designated as representing system concepts.

System concepts can be designated as such through many possible methods. The essential requirement is only that system concepts be distinguished from user concepts in a readily determinable fashion. Suitable methods for distinguishing system concepts from user concepts include: prefacing the name with an extended ASCII sequence; adding a designator within the record structure; adding a designator within the index files; and maintaining a separate file containing an index or list of system concepts. In the preferred embodiment, system concepts are designated within the record structure.

FIG. 14 illustrates program steps for assuring that all system concepts are maintained as inviolate in the system. The steps must be implemented as a preface to each operation which potentially could improperly modify a system concept.

Operations which modify a record that are unacceptable for system concepts records are functions which will either: delete the record; change the name of the record; change the Parents reference; change the Type; and change the Relationship List. Whenever a call to these input operations is made (step 14a) the steps of FIG. 14 must be invoked. Each call to a modifying operation must immediately test to see if the target record of the input operation is a system concept (step 14b). This can be accomplished by steps (13a) through (13d) in FIG. 13. If the target record is not a system concept, then the inputted modifying operation proceeds (step 14d). If the target record is a system concept a message is displayed to the user explaining that the requested operation can not be performed on a system concept (step 14c), followed by an exit of the called operation (step 14e).

A variation of this procedure that may be useful in some situations is to apply the test to a procedure that assembles a list of input operations which are applicable to a particular record so that the unacceptable operations are never presented as options to the user.

In the preferred embodiment both the steps illustrated in FIG. 14 and the above-described variation are used to provide redundancy for protecting the system concepts as inviolate.

USE OF SYSTEM CONCEPTS TO CHARACTERIZE RELATIONSHIPS

According to another embodiment of the invention, relationship-defining system concepts are provided to define relationships between concept records in the various libraries. These system concepts can particularly be used to characterize relationships between concept records in the Attribute and Component libraries or, between concept records within the Component library. The use of such system concepts also enables relationships to be formed between Project concept records and Component library concepts where the Value of the relationship is the Component concept.

More generally, the use of such relationship-defining system concepts allows additional types of relationships to be defined between levels of abstraction in the knowledge representation database. An important consequence of the above is that it eliminates the need to store relationships with values that contain any data other than unique record reference numbers. This increases the language independence of the means for knowledge representation, in that the records comprising the knowledge representation should contain no data other than unique record reference numbers.

By following the principles disclosed herein and extending the disclosed methods to additional knowledge domains, it is possible to eliminate the storage of all data types except unique reference numbers in all records of the knowledge representation, excepting only those records representing knowledge of language.

This principle can readily be extended to accommodate relationships between attributes, other classes of knowledge, and project records as the knowledge representation database is expanded to accommodate these additional classes of knowledge. Other classes of knowledge could include knowledge domains such as Spatial, Temporal, Goals, Procedures, etc. These additional types of knowledge would be used in a manner analogous to the use of component concepts as disclosed herein. These additional types of knowledge are analogous in that each instance of the knowledge will have a class, very similar to the class/subclass relationship typical of the primary relationship of the Component library.

For the illustrative purpose of explaining this embodiment, the relationships between the Attribute, Component, and Project records will be used as specific examples. However, generalization to other classes of knowledge is a straightforward extension of the invention that will readily occur to the skilled practitioner.

Note that all attributes have, in principle, potential values. The potential values can be project concepts, component concepts, or other concepts such as Spatial, Temporal, Goals, etc. The extent to which the principles of this invention are applied to all attributes is a design decision that is up to the skilled practitioner.

Figure 71:
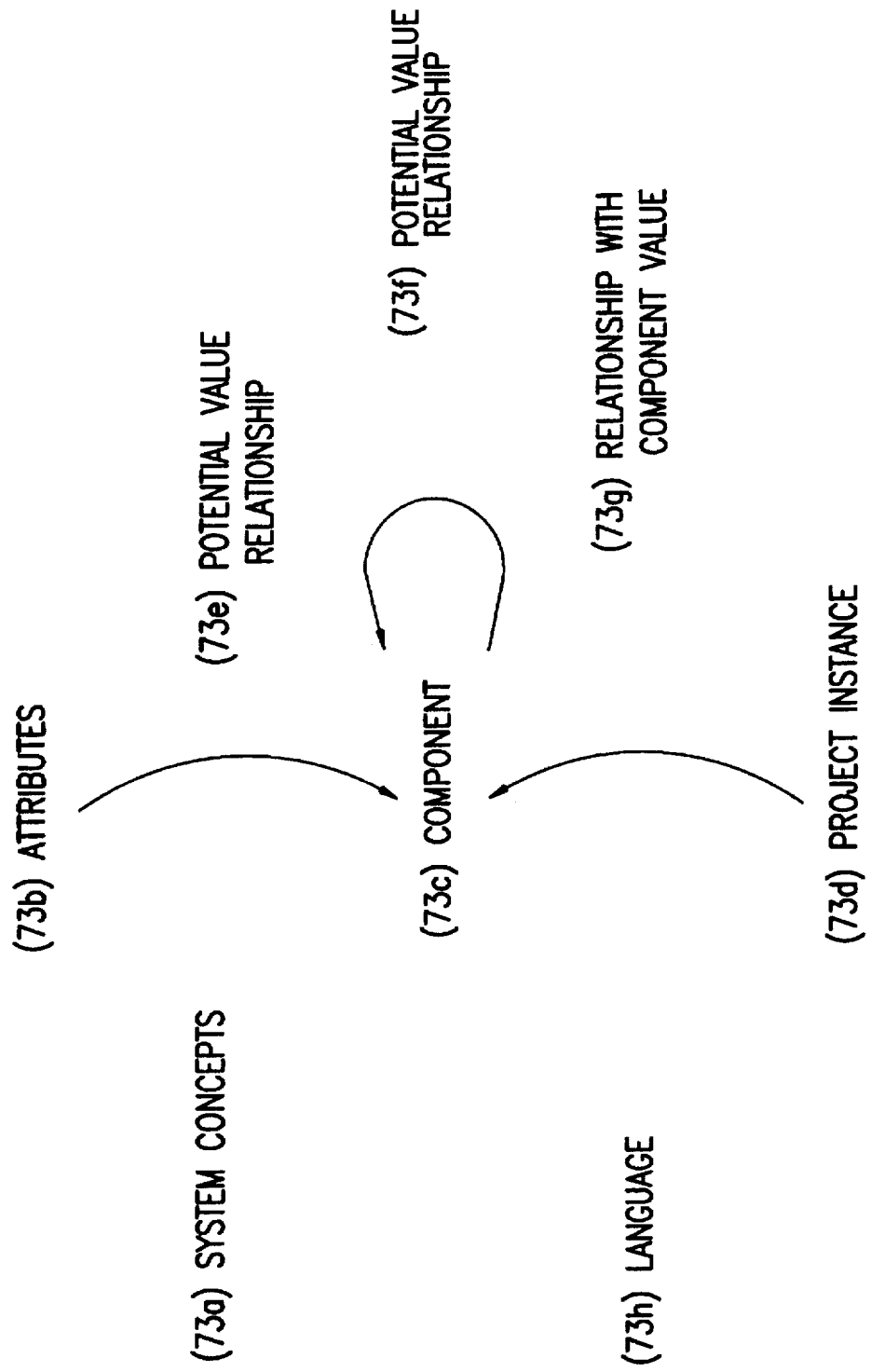
FIG. 71 is a diagram showing the types of knowledge concepts used in the knowledge representation according to the present invention and identifying the relationships therebetween according to another embodiment of the invention.

FIG. 71 illustrates the enhancements to the structure of knowledge representation according to this embodiment and identifies the typical relationships wherein Component concepts are used as Values in the relationship designation. According to the first embodiment discussed above, the knowledge representation was defined by representing (73a) System concepts, (73b) Attributes, (73c) Components, (73d) Project instances, and (73h) Languages, together with the fundamental relationships and the intrastrata relationships comprising the knowledge network, as individual records in the knowledge representation database, each having its own unique reference number.

The present embodiment provides means for representing new types of interstrata relationships between (73b) Attributes and (73c) Components, and between (73c) Components and (73d) Project instances. According to this embodiment, a new system concept known as "potential value" is defined and provided as a record having a unique record reference number in the knowledge representation database. The potential value system concept characterizes a relationship of one concept record as constituting a "potential value" of another concept record in which the unique record reference number of the potential value concept is stored. Referring to FIG. 71, the (73e) potential value relationship between (73b) Attributes and (73c) Components provides a mechanism to store potentially suitable component values for project instantiations characterized by the Attribute for which the (73e) potential value relationship is defined. The (73g) relationship between the (73c) Components and (73d) Project instances is stored in the project instance record.

This invention also provides means for representing a new type of relationship within the (73c) Components that result in significant extensions to the (1b) Means for Pattern Recognition, Storage, and Utilization. The (73f) potential value relationship, when stored in a Component node, enables other potentially suitable Component values to be stored for Project instantiations characterized by the Attribute that is specific to the Component node in which the (73f) potential value relationship is stored.

The distinction between the (73e) and (73f) potential value relationships is that (73e) is stored in the Attribute record and may or may not include the attribute reference number in the stored relationship (since this can be inferred from the storage location), while the (73f) potential value relationship is stored in the Component record and always stores the (73b) Attribute reference number to which it pertains. The significance of the (73e) potential value relationship is that its existence in a particular Attribute record defines the (73c) Components embedded with it in that Attribute record as generally pertaining to that Attribute. In other words, the presence of the potential value unique reference number in an Attribute record indicates that the components identified by their reference numbers in the Attribute record are all "potential values" of that Attribute. The significance of the (73f) potential value relationship in a Component record is that it is defining other (73c) Components that pertain to a specific Attribute of which the specific Component in which the (73f) potential value relationship is stored also pertains. The (73h) Language concepts are not directly affected by this embodiment and will not be referred to further.

Figure 72:
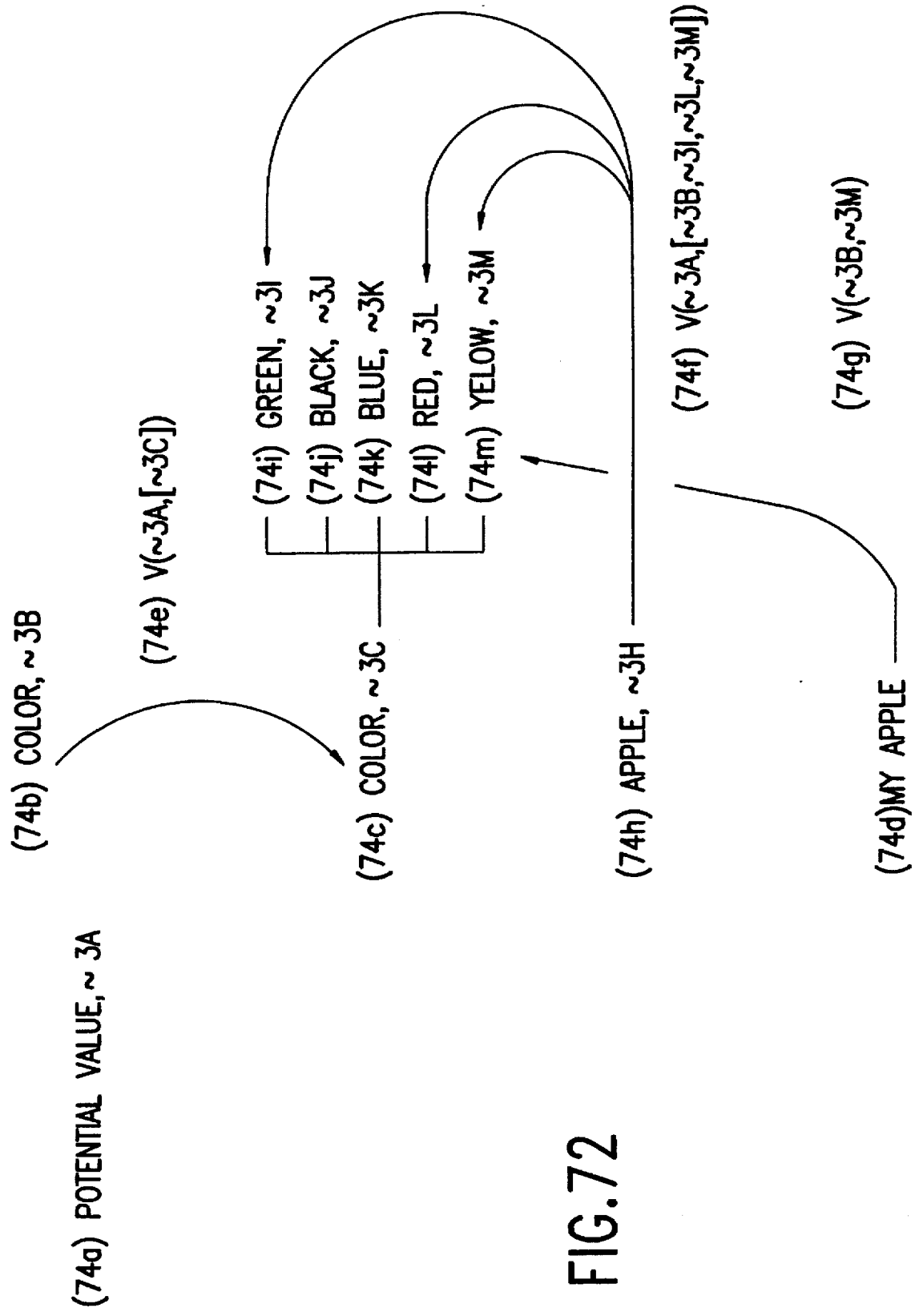
FIG. 72 is a diagram showing specific examples of knowledge types as shown in FIG. 71.

A specific example of an Attribute, various Components, and a Project instance will now be described with reference to FIG. 72 to provide a clear understanding of the functioning of the potential value relationship. In FIG. 72, specific names for each concept are each associated with a unique record reference number. The unique record reference number is preceded by a tilde ().

The (74a) Potential Value, 3A, is defined as the (73a) system concept used in this example. (74b) Color, 3B, is defined as a (73b) Attribute. (74c) Color, 3C, is defined as a (73c) Component with subclasses (74i) Green, 3I, (74j) Black, 3J, (74k) Blue, 3K, (74l) Red, 3L, and (74m) Yellow, 3M. It is very common in human languages for two distinct concepts to have the same name as in (74b) Color, 3B, as an Attribute and (74c) Color, 3C, as a Component. One of the advantages of the means for knowledge representation is that the concepts are identified within the knowledge representation database by the unique record reference numbers, so that each concept is uniquely and distinctly identified. (74h) Apple, 3H, is a Component.

(74d) My Apple, 3D, is a specific instance of a (74h) Apple, 3H, defined as a component in the Component library, and its (74c) color, 3C, is (74m) Yellow, 3M. The reference number 3H would thus be stored in the 3D record. The reference number 3A of the system concept (74a) "Potential Value," is used to characterize the relationship between the attribute (74b) Color, 3B, and the component (74c) Color, 3C as being that the subcomponents of the component Color, 3C, are all "potential values" of the attribute color, 3B. In other words, green, black, blue, red and yellow are all possible values for the attribute of Color. The (73e) potential value relationship is stored in the element list of the attribute record (74b) Color, 3B. Thus, the data structure V(3A,) stored within the attribute record 3B, signifies that the subcomponents of the record 3C are all potential or possible values of the attribute color, by virtue of the presence of the reference number 3A, denoting the system concept of "potential value."

While the system concept (74a) potential value, 3A, is used to characterize the (74e) and (74f) relationships in the preferred embodiment, it should be noted that the attribute (74b) Color, 3B, also could be used as the Characterization in either or both the (74e) and (74f) relationships, with the (74a) potential value reference number 3A then being stored elsewhere in the relationship data structure.

The relationship (74f) between the component (74h) Apple, 3H, and the specific subcomponent colors (74i) Green, 3I, (74l) Red, 3L, and (74m) Yellow, 3M, is also characterized by the (74a) Potential Value, 3A, system concept. This relationship data structure would be stored in the 3H component record. Note that it also includes the attribute (74b) Color reference number, 3B, to indicate that the relationship is colors that pertain to apples.

The (74g) relationship between the specific instance of (74d) My Apple, 3D, and (74m) Yellow, 3M, is also stored in the 3D project record. This stored relationship indicates that the component value of the (74b) attribute Color, 3B, of (74d) My Apple, 3D, is (74m) Yellow, 3M. Note that these relationships have not been indicated as reciprocal relationships in order to simplify the presentation. In general it is preferred to make the relationships reciprocal. Having reciprocal relationships would, for example, enable quick identification of all project instances that are Yellow, 3M, or all components that have color, 3B, as an Attribute. Reciprocal relationships are disclosed elsewhere in this specification and their application to the current discussion will be obvious to a skilled practitioner.

The relationship between the component (74c) Color, 3C, and the specific colors (i.e., (74i) Green, 3I, (74j) Black, 3J, (74k) Blue, 3K, (74l) Red, 3L, and (74m) Yellow, 3M) can be the fundamental relationship of class and subclass that defines the taxonomical hierarchy of the Component library, or it can be a relationship characterized by some other system concept. The specific relationship is not at issue in this disclosure, as long as the relationship can be uniquely identified and used in the manner set forth herein.

As new domains of knowledge are added to the knowledge representation database, additional system concepts can be defined to identify the occurrence of concepts in these domains as values of relationships. Examples of new knowledge domains include Spatial, Temporal, and Procedural knowledge. The new system concepts thus can readily be implemented to extend the methods disclosed herein to the new domains. Note that an unbounded set of system concepts can be defined and used through means similar to those disclosed herein. The meaning and behavior of a system concept can be arbitrarily complex. The system concepts can be defined explicitly as in the current example, or structurally as disclosed in the earlier embodiment.

Relationship Data Structures

The relationship listings wherein component concepts occur as values can be stored in the same relationship data structures as were presented in the previous embodiment. Numerous appropriate refinements and variations will occur to the skilled practitioner. The following discussion identifies those structures employed in the preferred embodiment.

Figure 73:
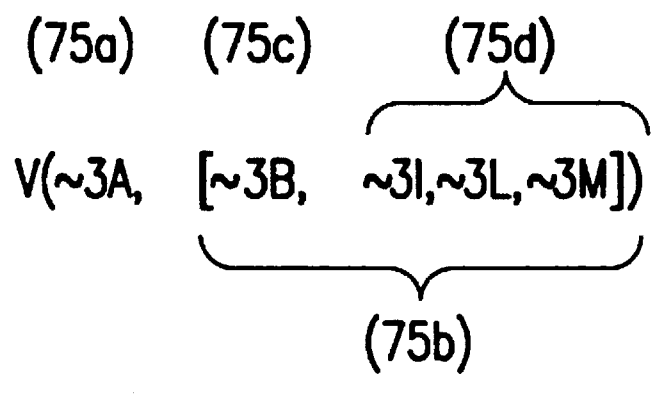

FIG. 73 illustrates a relationship data structure suitable for storing the (73e) and (73f) potential value relationships within the attribute and component records, respectively. The (74f) relationship data structure of FIG. 71 is used as an example. The (75a) Characterization of the relationship may be the reference number of the (73a) system concept (i.e., the "potential value," 3A). The (75b) Value of the relationship will be comprised of the reference numbers of the (73b) Attribute (color, 3B) and the (75d) reference number(s) of the (73c) component concepts (green, 3I, red, 3L, and yellow, 3M).

In this example, the (75c) reference number and the (75d) reference numbers have been combined in a list structure.

The defining feature is the presence of the (75a) system concept characterization, the (75c) attribute reference, and the (75d) component reference(s); specific data structures will be derivative embodiments of these essential features. Note that either the Attribute or the System Concept can be considered to be the characterization of the relationship. The important feature is that both must be present or inferred in the relationship listing. The preferred embodiment, and discussion of this disclosure, consider the system concept to be the characterization.

Remember that the (73e) potential value relationship is stored in an Attribute record and the (73f) potential value relationship is stored in a Component record. This means that the (75c) attribute reference number is identical to the reference number of the attribute record within which it is stored. Note that in (74e) the (75c) attribute is not included. In this case, the programmed means for establishing and using the potential value relationship will need to infer the (75c) attribute from the record in which the relationship is located. Means for accomplishing this will readily occur to a skilled practitioner. All subsequent discussion will be based on the structure as illustrated in FIG. 73 since this provides the most general case and all variations will be derivative and functionally equivalent embodiments.

Means for Editing Relationships with Component Values

There are two essential edit operations for all relationships: add and remove. The relationships that refer to Component concepts in the Value of the relationship, are relationships in all senses previously disclosed and are subject to the same principles in editing. The following discussion provides a quick overview of the edit operations to aid in the understanding of this embodiment of the invention and as a guide to program development.

Figure 74:
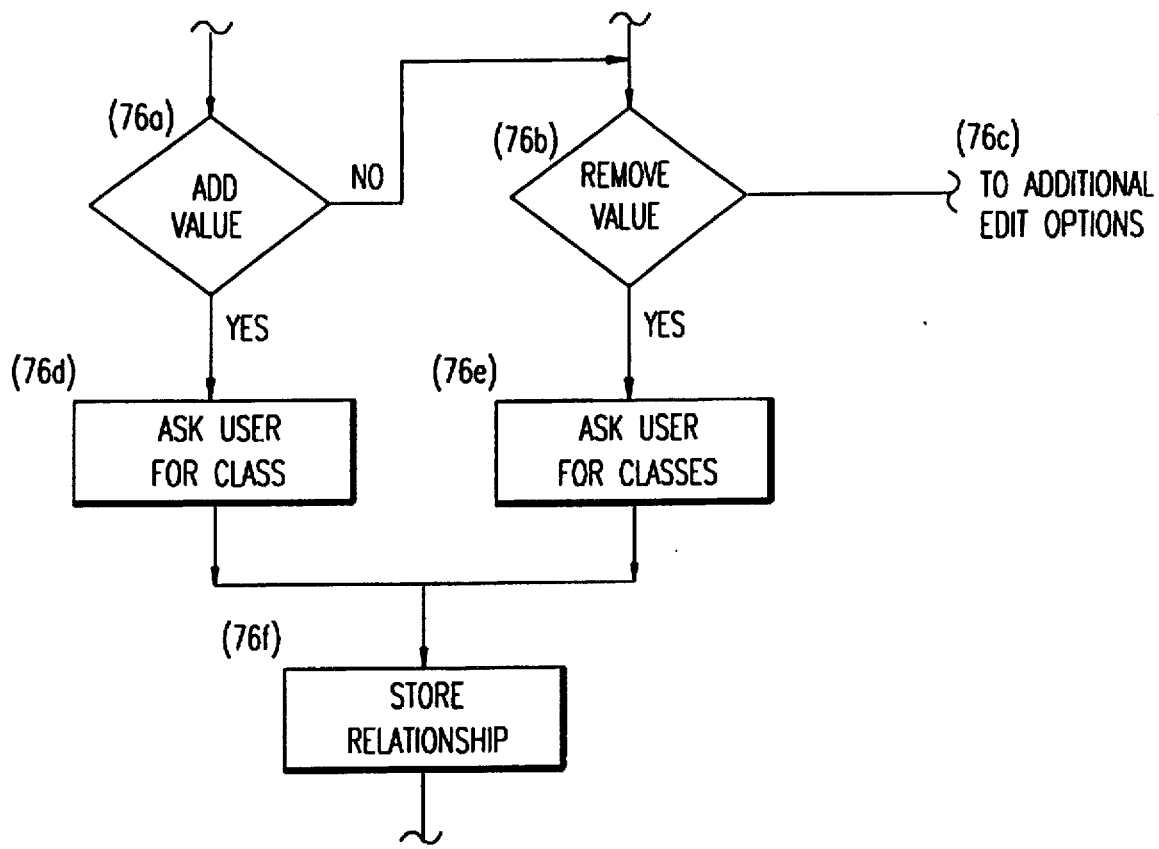
FIG. 74 is a flow diagram of programmed means for editing the relationships in the computer database according to the second embodiment.

FIG. 74 illustrates a suitable flow diagram for editing relationships with Component concept records as values. Adding values is comprised of steps (76a), (76d), and (76f). Removing values is comprised of steps (76b), (76e), and (76f). Step (76c) allows for a plurality of additional editing options that the developer can design and include to meet specific objectives. Steps (76a) and (76b) are tests to determine which edit operation is desired. Similar tests will be included for each of the plurality of (76c) additional edit options. Often, the naming of the operation will comprise the test such that the option will be called by name. Other means of determining the desired edit operation will readily occur to the skilled practitioner.

Step (76d) asks the user to specify which class or classes are to be added to the relationship value. This selection will typically occur from a set of choices displayed in a menu or other appropriate view. The choice set will be comprised of the members of the Component library or some subset thereof. The user interface can be accomplished by displaying the classes in an appropriate user interface, such as a CRT, in a format that facilitates user selection such as a menu, pallet, tree, table, or other suitable display. The user interface is to include means for enabling the user to identify a subset of the choice set as the selection set and return the selection set for further processing.

Step (76e) is similar to step (76d) except that the choice set is the set of values currently comprising the value of the relationship. The choice set would be similar to the (4c) values where the names of the referenced records or other suitable icon for the referenced records would be used for the user interface as the choice set. The selection set that is passed forward for further processing is then the subset of the options not identified for removal by the user.

Figure 75:
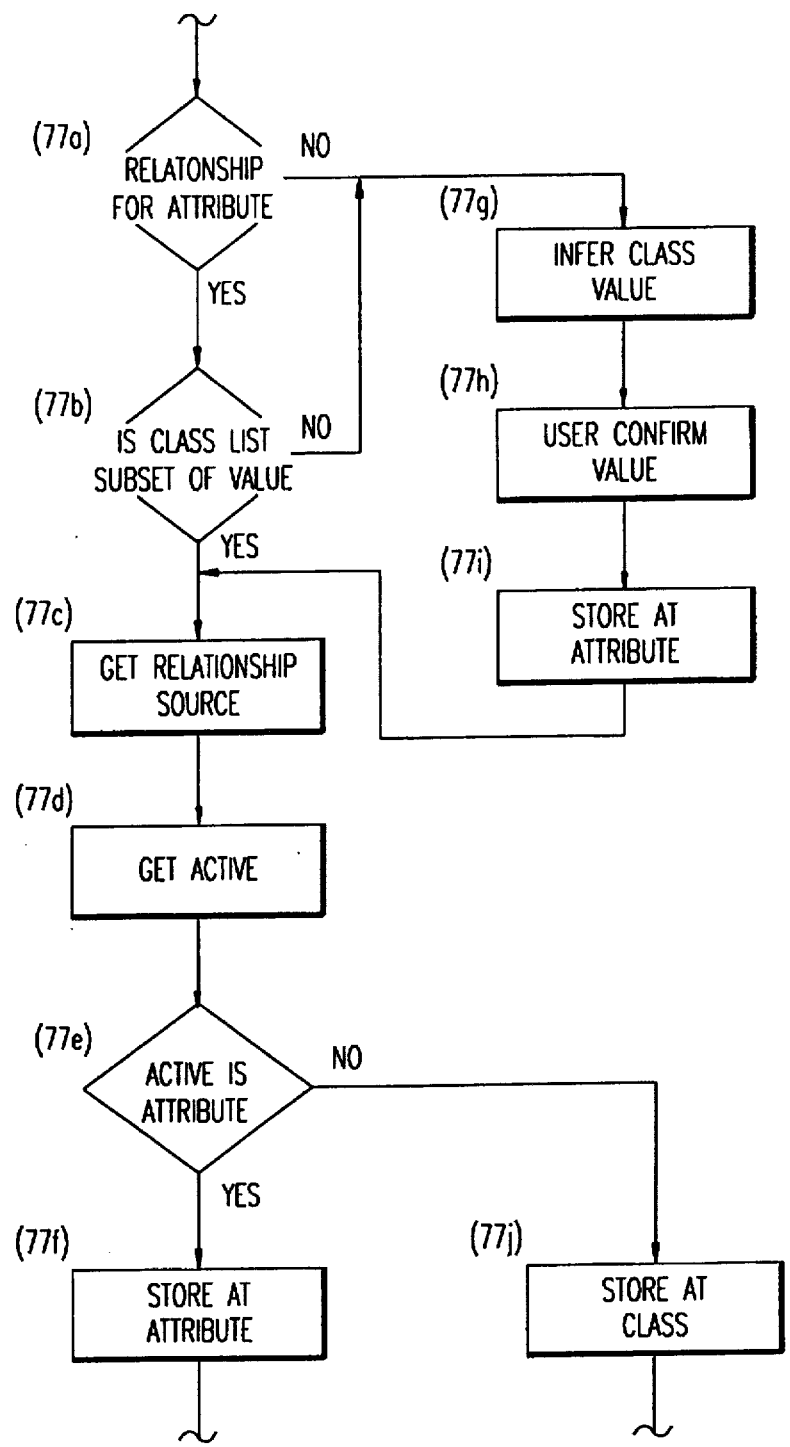
FIG. 75 is a flow diagram of the detailed steps for storing relationships in the computer database according to FIG. 74.

Step (76f) stores the relationship by creating a relationship data structure as discussed in connection with the illustrated means of FIG. 73 and storing that relationship in the appropriate record. FIG. 75 provides an expansion of the means comprising this step.

Means for Storing Relationships

FIG. 75 illustrates a suitable flow diagram for the steps comprising storing the relationships. Variations on this flow diagram will readily occur to a skilled practitioner upon review of the preferred embodiment and the particular requirements of the application.

Step (77a) checks to see if the (75b) attribute already has a relationship defined for it that is stored at the attribute. Step (77b) verifies that the proposed (75c) class list for the value is a subset of the values stored at the Attribute. If either Steps (77a) or (77b) fail, then the implication is that the values in the list to be stored may be more general than the existing set for the Attribute. Since the attribute is to store the most general set of relevant classes, Steps (77g) through (77i) are designed to infer additional class values to describe the most general case and store the inferred set at the attribute after user confirmation.

Step (77c) gets the relationship source record reference number. This will always be the Attribute unless a relationship has been stored at the component record. The source is subsequently used for deciding where to store the new relationship. Step (77d) gets the current active record reference number. The active is subsequently used for deciding where to store the new relationship. Step (77e) tests that the active is the Attribute. If this is the case, the relationship replaces the existing relationship in the element list of the Attribute record. The relationship is thus (77f) stored in the Attribute record.

Step (77j) stores the relationship in the component record. Storing the relationship replaces any existing relationship in the element list of the Component record that has the same characterization as the new relationship, with the new relationship. Step (77g) infers higher level class values from the values in the relationship. This can be accomplished by considering the list to be comprised of subclasses. The inference is simply the process of finding the implied common class. For example, if the relationship of (74f) was being saved, the implied class is (74c) color, 3C, which would be inferred as the class value, that upon user confirmation in step (77h), would be (77i) stored at the attribute record as the (74e) relationship.

Step (77h) allows user confirmation by telling the user the inferred class and asking to verify. If the user does not like the inference, then the original value of the relationship is passed forward to be (77i) stored at the attribute. Note that steps (77g) and (77h) provide for powerful behavior and, though part of the preferred embodiment, are optional. These steps are included for completeness and to illustrate the types of enhancements that can readily be incorporated in the invention. Additional similar enhancements will readily occur to a skilled practitioner based on this example and associated disclosed means.

Step (77i) stores the relationship in the attribute record. Storing replaces any existing relationship in the element list of the attribute record having the same characterization as the new relationship, with the new relationship. Note that steps (77f), (77i), and (77j) all store the relationship list in a record; in fact step (77i) and (77f) are the same process. In the preferred embodiment, these three steps are coded as the same routine where the record reference number of the record to store the relationship in is passed to the routine with the relationship.

Using Relationships with Component concepts as Values

A potential value relationship is established by means of a relationship stored in an Attribute or Component record wherein the value of the relationship is comprised of at least one reference number of a component record. The meaning of the relationship is, typically, that the subcomponents of the component are potential values of the attribute.

Attributes are used to characterize relationships stored in records other than attribute records. The type of concept suitable for the value of the relationship will be characteristic of the attribute (for example, some attributes characterize relationships between project concepts while others characterize relationships between project and component nodes.) The type of concept suitable for the value of a relationship characterized by a specific attribute can be designated as a property of the attribute or of an attribute class, by storing a system concept designating the type in the attribute or attribute class records. Since the attribute class is a system concept, the designation can be implemented as part of the system definition of the attribute class.

If the designation is implemented as a system concept stored in the attribute record, then the system concept can be used as the characterization of the relationship storing the record reference number(s) of the specific relevant values. If the designation is implemented as a property of the attribute class(es), then the means for storing the reference number(s) of the relevant values must be implemented either by structural characterization in the structural declaration of the attribute records, or by means of a separate system concept to provide the characterization for a relationship. Note that any system concept can be embodied by structural cues as well as explicit definition. The preferred embodiment uses a system concept stored at the attribute record as the characterization of the relationship storing the record reference number(s) of the specific relevant values, as shown in FIG. 73.

The use of a system concept stored at the attribute record is preferred because the system concept can serve both as the identification that component values are applicable to the attribute, and as the characterization of the relationship. The same system concept can also be used to in the relationships that may be stored in specific component records.

Figure 76:
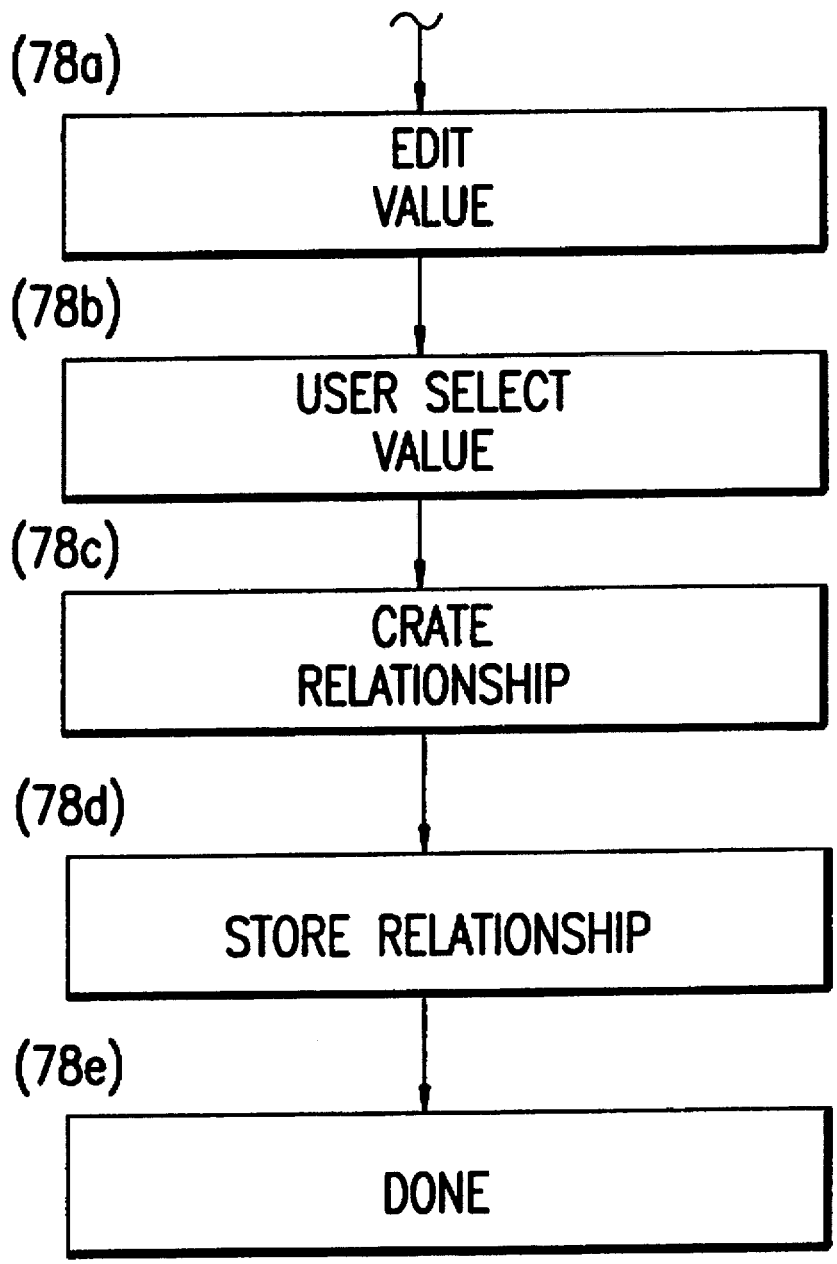
FIG. 76 is a flow diagram of programmed means for creating specific instances of projects as project records which use potential value relationships stored in Attribute or Component records.

FIG. 76 illustrates the use of relationships with component concepts as values in creating instances of a value in a project record. In this case, said relationships are stored in Attribute or Component records. This is one of many uses of this type of relationship that will readily occur to a skilled practitioner, and illustrates the essential functions that will enable numerous derivative embodiments.

Figure 77:
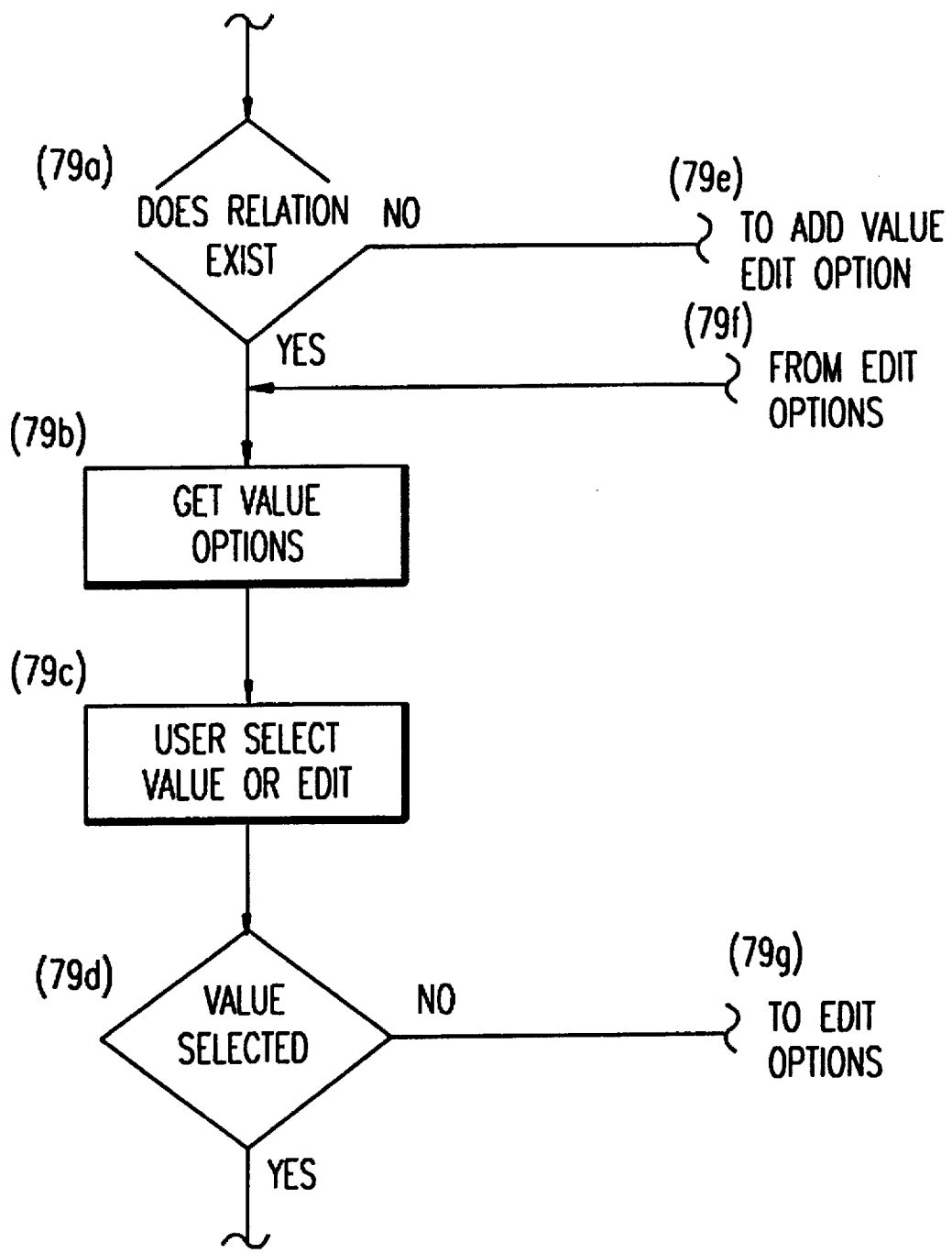
FIG. 77 is a flow diagram of the detailed steps for user selection of specific values in the computer database according to FIG. 76.

Step (78a) provides means for editing the value of a relationship for a project concept. This step includes determining that a relationship identifying component concepts as potential values is stored in the component record that is the type of the project instance, or in the attribute record for the attribute characterizing the relationship to be edited. FIG. 77 illustrates a flow chart that provides additional detail of suitable means for Step (78a).

Step (78b) provides means for user interaction so that the user can select a relevant option. The options are those stored in the potential values relationship applicable to the current attribute of the active project node. In the example of FIG. 3, when creating the project instance of (74h) Apple, 3H, that is (74d) My Apple, 3D, the display would offer options of (74i) Green, 3I, (74l) Red, 3L, and (74m) Yellow, 3M. The user interface can be whatever the designer believes is relevant to the values such as menus, pallets, buttons, and so forth. In the example, appropriately colored buttons might be a good choice. Such solutions will readily occur to a skilled practitioner.

Step (78c) provides means for creating the relationship data structure. The relationship data structure will be similar to that illustrated in FIG. 72 item (74g). There are a wide variety of data structures that can be embodied to incorporate the means of the invention. The essential features are that the reference number of the attribute is associated with the reference number(s) of the component node(s) that are the value of the relationship.

Step (78d) provides means for storing the relationship in the active project record. The new relationship includes the replacement of any existing relationships unless the Attribute has been associated with a system concept that indicates that it is allowed to have multiple values in project instances. These means are familiar from previous disclosure and are amply illustrated in the preferred embodiment. Step (78e) indicates the completion of the editing process for the editing of the value. Upon completion the program returns to the calling function or other control function for continuation.

Note that Step (78c) can be implemented to create the reciprocal relationship to be stored in the component record(s) referred to in the value of the created relationship to be saved at the project node. If this is desired, then Step (78d) will include the step of saving the reciprocal relationships at said component records as well as saving the created relationship at the project node. Note that Step (78b) may include edit options for user selection as part of the menu of value options. This will allow the user to dynamically edit the options. FIG. 77 illustrates an expansion of Step (78b) that allows for this option.

Step (79a) tests for the existence of a potential value relationship for the current Attribute of the active project node. If none has been defined then (79e) the program can call the (76a) Add Value edit option so that the user can select an appropriate value and store the selected value as a future option by means as illustrated in FIG. 75. The combined effect of these steps is that the system automatically learns the potential values for an attribute using the current instance as an example of applicable values. After completing the (76a) Add Value, the program (79f) resumes at Step (79b).

Step (79b) gets the value from the potential value relationship applicable to the current Attribute, and converts the reference numbers to appropriate icons for display for user selection. Icons indicating edit options can be appended to the list of options so that the user can dynamically alter the option list. Note that the icon may be as simple as the text name of the options (e.g. Green, Red, Yellow) or more sophisticated as discussed previously. Step (79c) provides means for the user to select from the displayed value and edit options. The selected option is then passed forward to step (79d) for further processing. Note that the user may select more than one option if multiple values are allowed for the Attribute for which the options are presented. This is a minor variation, the implementation of which will readily occur to the skilled practitioner.

Step (79d) tests to verify that a value option was selected. If not, then an edit option was selected, and the (79g) appropriate edit option can be called. When the edit option is completed, the program can return to Step (79f) as previously identified. Note that the user may decide that no option is wanted, in which case an escape option must be defined; handling this case will readily occur to a skilled practitioner.

Value Clustering

One of the consequences of this embodiment that will readily occur to a skilled practitioner is value clustering. Value clustering is achieved as potential value relationships are implemented for a variety of attributes and components, and is in effect the cumulative interaction of multiple potential value relationships. Value clustering can be implemented by means similar to the inheritance schemes previously disclosed.

Value Clustering is the global effect of this embodiment resulting from linking potential values wherein one value implies others. This, in effect, allows the selection of one value to modify the selection set applicable to others. In some cases the selection set can be reduced to a single member which can automatically be instantiated as the default value of the relationship. For example, Country Code, Area Code, Prefix Number, Cities, States, Country, and Zip Codes are all related based on political entities. Knowing any one of these implies at least a small subset of possible relevance in the others, and often fully constrains the others.

More specifically, if Washington is the value of State then the Country is United States of America, the country code is always 01, and the Area Code is either 206 or 509. In addition, the Cities in Washington are a small subset of all cities, and the Prefix Numbers associated with the telephone interchanges are a very small subset of all Prefix Numbers. Value Clustering enables behaviors that exploit the interrelationship of values, so that data input time is minimized, and so that deeper knowledge of interrelationships is maintained. Note that in a practical system, the system implementor may choose to predefine significant value linking as a feature of the basic knowledge network. This a priori implementation is within the spirit of the invention and may readily occur through translation of structured digital resources into the knowledge network, or by manual entry of the relevant concepts and relationships.

Notions such as the structure of telephone numbers (e.g. Country Code, Area Code, Prefix, Number) and the values associated with this structure, color, political entities (country, states, county, city, etc), are typical of the types of values definable a priori.

(3b) Record Operations

The Record Operations (FIG. 3b) are basic operations for interaction with the records of the Knowledge Representation Database. Record operations are comprised of: Input operations (3c) whereby records or record declarations within records are created or replaced in the Knowledge Representation Database; and Output operations (3d) whereby records or record declarations within records in the Knowledge Representation Database are read out and reported to the user.

The Record Operations are implemented to handle the information contained within the structures of individual records in the Knowledge Representation Database. As such the significance of the structure of the records (name, relationships, etc.) must be programmed into the Record Operations.

The significance of the network structure of the Knowledge Representation Database is contained in the higher level functions of the Network Operations (3e), the Concept Editor and the Relationship Editor (3i), each of which uses the Record Operations as basic functions for the implementation of network-related functions.

(3e) Network Operations

The Network Operations (3e) comprise a plurality of steps for interaction with the network structure of the Knowledge Representation Database as embedded within the individual records constituting the Database. Network Operations are comprised of a plurality of functions which are programmed with an understanding of the network, together with two major classes of functions comprised of Save operations (3f) whereby information stored in the Descriptive Database is saved in the network of records of the Knowledge Representation Database, and Read operations (3g) whereby a portion of the network of the Knowledge Representation Database is translated into the Descriptive Database. The Network Operations do not understand the record structure of the database in that all interactions with the records of the Knowledge Representation Database are conducted through the Record Operations. The Network operation procedures coordinate sequences of Record Operations, which sequences comprise network operations. The network resides in the relationships between a plurality of related records in the Database as found from the cross-reference record numbers embedded therein. The programmed sequence of Record Operations which defines Network Operations embodies the understanding of the network structure.

Many of the programmed functions for interpretation of the network have a characteristic of traversing some class or classes of relationships between concepts and assembling information about the concepts in the traverse path.

Figure 15:
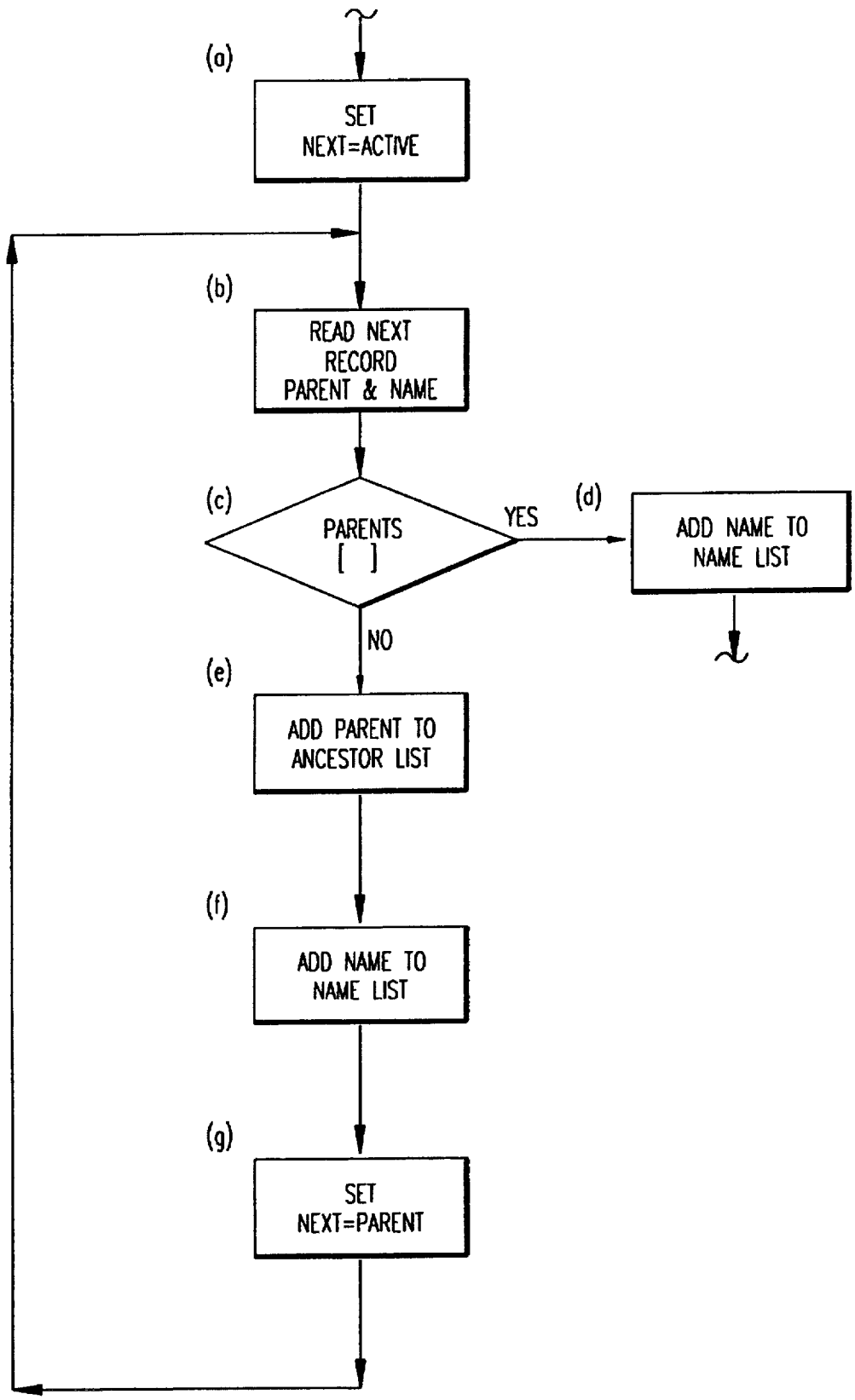
FIG. 15 is a Flow Diagram of Programmed Means for Assembling Ancestor Lists as an Example of Network Traversal.

FIG. 15 illustrates a flow diagram of programmed means for assembling an ancestors list of records constituting progenitors of an individual record as an example of network traversal. Step (15a) sets the next reference number equal to the active reference number. The "Active" is the current record reference number for which the ancestor list is to be derived. Step (15b) reads the Parent and Child record names from the active record. The read operation of step (15b) is one of the functions of the Record Operations. Step (15c) tests to see whether the Parent list is nil. The only record in the network for which the parent list is nil is the root record. Thus, the presence of a nil Parent list means that the ancestry of the individual record has been traced clear to the root record. Step (15d) adds the name read from the record to a name list. This name list is an output of the ancestry of the individual record. The resulting output of the ancestry tracing process will be the name list and also an ancestor list, wherein the ancestor list is comprised of the list of reference numbers of the records corresponding to the names in the name list.

Step (15e) adds the parent record reference number to the ancestor list in the case where, in step (15c), the Parent list is not nil. Step (15f) adds the name of the record being read to the name list, followed by Step (15g) which sets the next reference number equal to the parent reference number from the parent list.

The process then cycles back to step (15b), with the next reference number equal to the parent record found in the previous record's parent list. Note that the name added to the list in steps (15d) and (15f) is the name of the record being read, whereas the parent added in step (15e) is the reference number of the parent record of the record being read. Thus, although the parent reference number is added in step (15e) and the name is added in step (15f), the final parent for the root name ultimately must be added in step (15d), when there are no more parents.

(3f) Save Functions

The Save functions (3f) consists of programmed operation steps for assembling and structuring information stored in the Descriptive Database and storing the information in the appropriate records of the Knowledge Representation Database. Save is only required if the Descriptive Database is used to buffer editing operations so that these operations do not directly affect the Knowledge Representation Database, but rather are modifications to the Descriptive Database. If the Descriptive Database is used to buffer the Knowledge Representation from the editing operations, then save functions are required in order to transfer the changes made to the Descriptive Database into the Knowledge Representation Database. The transfer between databases occurs upon a user event requesting an update to the Knowledge Representation Database.

The Save operations are implemented as programmed code. Save translates the information in the Descriptive Database by applying a sequence of Record Operations required to input that information into the Knowledge Representation Database. The Save operation uses the record reference numbers of the Knowledge Representation Database which are associated with the information in the Descriptive Database to identify the record and record substructure where the updated information should be inputted.

The Descriptive Database contains information from a plurality of records of the Knowledge Representation Database, together with view document-specific icon and locational data which is not part of the Knowledge Representation Database. The Save operation saves only the relevant information in the Descriptive Database at the appropriate location in the Knowledge Representation Database.

Figure 16:
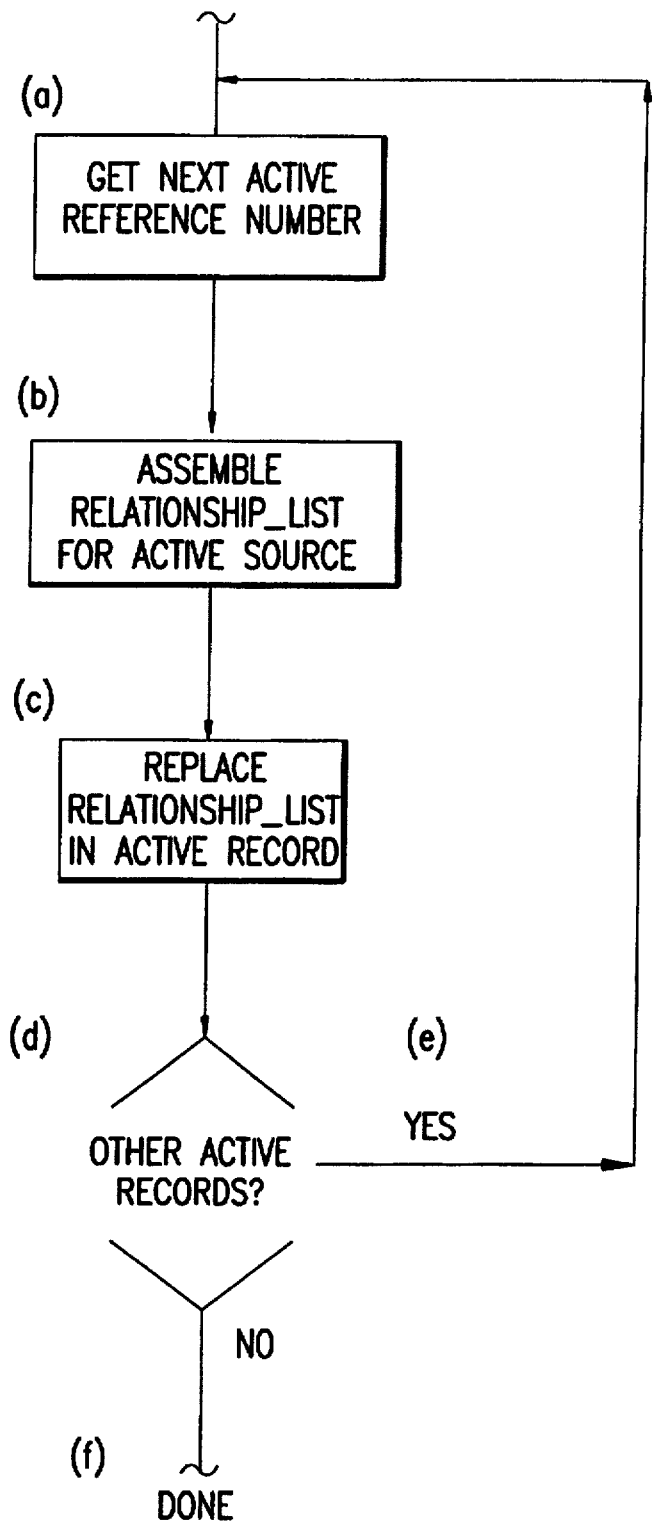
FIG. 16 is a Flow Diagram of Programmed Means for Saving Information Stored in the Descriptive Database by Storing it in the Knowledge Representation Database.

FIG. 16 illustrates a Flow Diagram of programmed means for Saving Information Stored in the Descriptive Database by storing it in the Knowledge Representation Database. The overall structure of the procedure illustrated in FIG. 16 is to process all active concepts in the Descriptive Database by getting the next active reference number in the database and cycling through the procedure for each active concept until all active concepts have been processed.

The Descriptive Database may include a plurality of Active concepts. The "Active" will be indicated in one of the fields of each of the plurality of records in the Descriptive Database comprising the description of the Active concept.

Step (16a) identifies a reference number of an active concept record in the Descriptive Database. Step (16b) assembles all of the relationships pertaining to the Active which are stored at the active record into a Relationship_list (see FIG. 12n). The relationships pertaining to the Active which are stored at the Active record are identified by means of the Source field (23b) in the records of the Descriptive Database.

A consequence of the procedure for Relationship Inheritance is that the only Source for relationships in the description of the Active concept (for which all relationships in the relationships list are present as corresponding records in the Descriptive Database) is the record of the Active concept. This is the reason that Save applies only to the Active record.

Step (16c) replaces the relationship list in the Active record with the relationship list assembled in Step (16b) from the Descriptive Database.

Step (16d) tests to see if any other Active concepts are in the Descriptive Database which have not yet been saved. If "YES" (16e) then cycle back to Step (16a) to get the next active record reference number. If "NO" (16f) then the save is done.

(3g) Read Functions

The Read functions (3g) reads information stored in the Knowledge Representation Database, appropriately formats the read information, and stores the formatted information in the Descriptive Database. The Descriptive Database is a working non-permanent database. The transfer of information to the Descriptive Database from the Knowledge Representation Database is made to transform the relationships in the concept records of the Knowledge Representation Database from reference numbers into descriptions of the concepts. The descriptions of the concepts facilitate the human-perceivable views, and consequent user interaction with the Knowledge Representation Database through the views.

The Read operations apply a sequence of Record Operations to output the information in a network of records of the Knowledge Representation Database, translate the information into the structures required for storage in the Descriptive Database, and store the information in the Descriptive Database. The Read operations utilize the ancestor inheritance characteristics of the network (embodied in the cross-reference record reference numbers). The Descriptive Database then stores information from a plurality of network of records of the (3a) Knowledge Representation Database. The Descriptive Database is discussed in more detail below.

Relationship inheritance is discussed subsequently as part of the disclosure of the descriptive significance of fundamental relationships. Characterization inheritance is the process of assembling the descriptive inheritance for each of the characterizations in a set of relationships.

Record Inheritance

The transformation of knowledge from the Knowledge Representation Database of the present invention to user interpretable format is based on two types of "inheritance" of record concepts by individual records, Relationship Inheritance and Characterization Inheritance.

Relationship inheritance is the processes for combining the relationship lists of the records in the descriptive network of a given concept. The resulting relationship list provide a description of said record.

Characterization Inheritance is the process for assembling the relationship inheritance for all attribute concepts.

Both types of inheritance are implemented as programmed code in the computer system comprised of a plurality of interrelated modules and subroutines. In general the code embodying Relationship Inheritance is distinct from the code embodying the Characterization inheritance.

In a specific real world embodiment of the system there will typically be a plurality of functions combining and coordinating the Relationship and Characterization inheritance procedures. This is a system design choice as specific implementations will readily occur to the skilled system designer once the principal methods of each type of inheritance are understood as hereinafter set forth.

Relationship Inheritance

The Relationship inheritance procedures code combine the Relationship Lists of a plurality of records to create a descriptive relationship list pertinent to an active concept (record). The relationship inheritance procedures embody rules for determining which relationships in the plurality are relevant and which values of the relationships have precedence over other values.

Relationship inheritance assembles the user relationships describing a specific concept from the network of concepts in the Knowledge Representation Database into the Descriptive Database. The user relationships are stored in the Relationship List of the records. The relationships are the vehicle for storing information defining the concepts in the Knowledge Representation Database. Relationship inheritance can be thought of as rules for combining the Relationship Lists in the records into a descriptive network of a specific "Active" concept. As such, the rules must define Attribute and Value inheritance.

The relationships defining the Descriptive networks for a Project concept are the fundamental relationships of Taxonomy (Class), Type (Classifcation), and Composition (Structure). Relationship inheritance applies to the reference numbers stored in the Parent (intrastratum and interstrata$ab$) references only. The Children references are irrelevant to inheritance. Useful inheritance may also occur through any of the reference numbers in the user defined internal relationships.

Taxonomy, Type and Composition are simply schemes for tying each record to all other records in a useful manner. The only essential requirement for the invention is to tie the records to each other with at least two, always-present, relationships: to a parent, and to a type definition. The result of the preferred embodiment described herein is that Taxonomy, Type and Composition tie all records to the network with relatively few relationship statements, all in a manner easily interpreted by the program.

In some senses the meaning of a concept is conveyed by the totality of the network in which it is embedded. This totality can rapidly become incomprehensibly complex, and thus the totality must be represented by a comprehensible summary description. A comprehensible description of a concept can be derived from the network by limiting the fundamental relationships which are traced out in deriving the description. In limiting the fundamental relationships, the connectedness of the network is limited so that only a small subset of the concepts can be reached from a given concept by following the paths in the specific fundamental relationships.

The reason the descriptive network is a small subset of the entire network is because the train of interstrata Parent(s) references must necessarily lead to the root record. The interstrata parent(s) only references a finite number of component records, each of which must be a classification of the active record.

FIG. 23 summarizes the types of inheritance based on the descriptive networks. Each path in the descriptive network is used to characterize a type of inheritance. In subsequent discussion, relationship inheritance based on Taxonomy (Class) will be referred to as Taxonomy inheritance, and similarly inheritance based on Type (Classification) will be referred to as Type inheritance, Composition (Structure) will be referred to as Composition inheritance, and User (Relationship) inheritance will be referred to as User inheritance.

User inheritance is based on user defined relationships instead of the fundamental relationships. User inheritance has been found particularly useful in the description of Project concepts (and in fact, tends to be limited thereto). All inheritance deals with the combination of the relationships in the Relationship List of all the records in the inheritance path defined by the cross-reference record numbers. Each relationship is comprised of a characterization and a value each of which can be inherited. The Characterization relationship and the Value relationship inherits differently for each category of inheritance. The columns of FIG. 17 summarize the inheritance of Characterization and Value for each type of inheritance on the corresponding row: "Yes" means it is inherited and "No" means it is not inherited.

The summary of applicability of the types of inheritance to the libraries indicated in columns (17$d$) through (17$f$) is self-explanatory in that if the relationship defining the inheritance path applies then the inheritance applies.

The Type inheritance for a Project record (17$f$) is the descriptive Relationship List of the referenced record (i.e., one record only). This is distinct in that all other categories of inheritance are for the Relationship List of all the individual records in the inheritance path.

Column (17$g$) identifies the inheritance path length for each category of inheritance. Both the Taxonomy and Composition paths extend to the root. The Type inheritance is always only one step deep, because of the nature of the Classification relationship. The User Relationship path length must be specified by the designer. In practice two steps is often a useful length for user inheritance.

Taxonomy inheritance is based on the logical premise that all of the relationships of a class apply to a subclass. This is true in that Classes are necessarily the genus of all of the species of subclasses belonging thereto.

Type inheritance is based on the premise that all Projects are comprised of specific occurrences of certain components. The component is the classification of the specific elements comprising the Project. The classification of an element is the generic description of the common features of all specific elements.

Composition inheritance is based on the principle that many of the values of the relationships of specific objects are properties related to the structures of which the concept is part. For example, all customers in a particular city have the same zip code, area code, county, state, congressional representative, senator, etc. because these are properties of higher level structures. Such values can be inherited by virtue of the compositional hierarchy in the Project. This embodiment of the invention uses only one fundamental relationship, the parent, in concepts that are Attributes or Components. Two fundamental relationships, parent and type, are used only the Project concepts.

Figure 18:
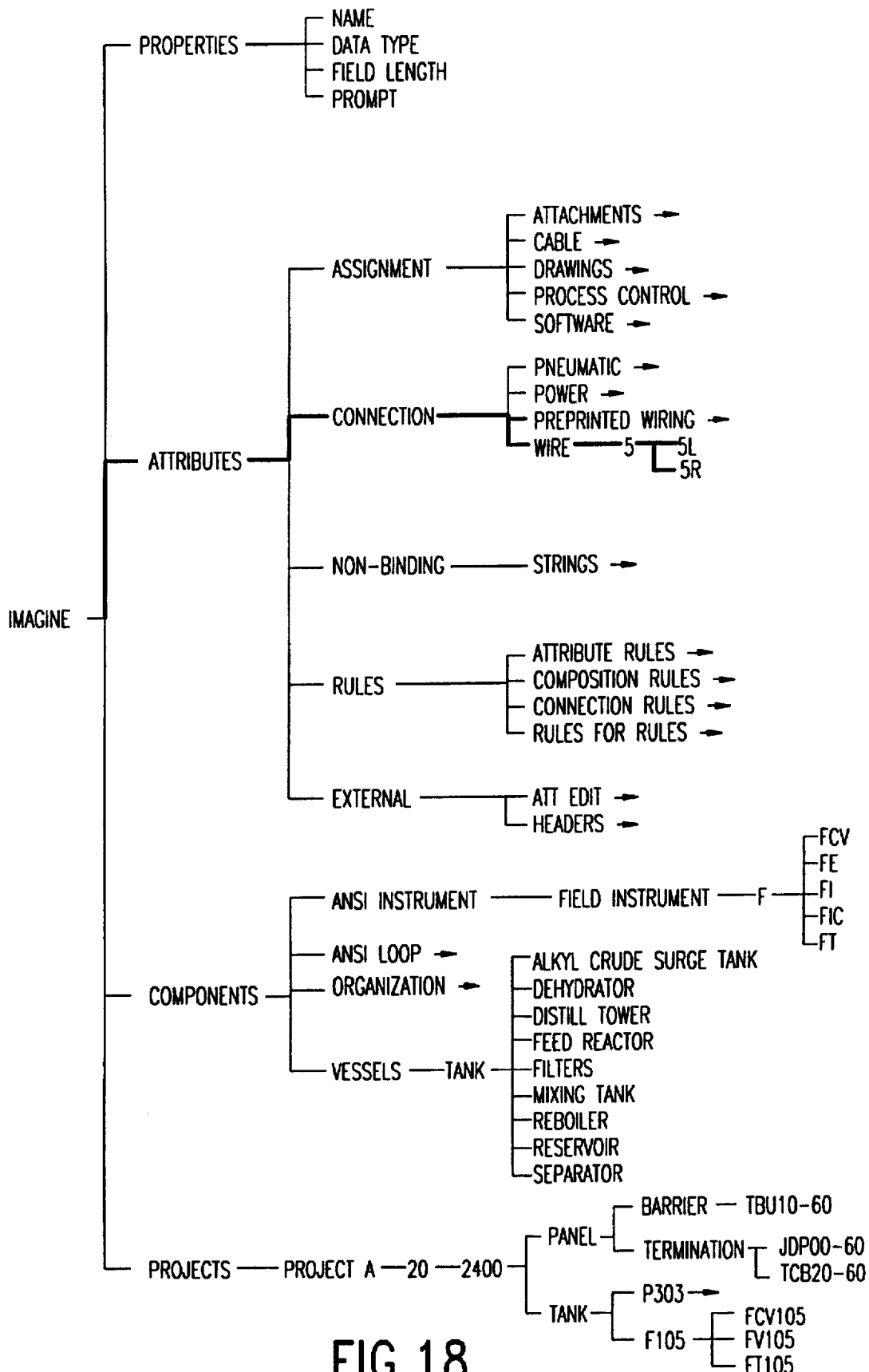
FIG. 18 is a logic diagram illustration of concepts in the descriptive network of an attribute record.
Figure 19:
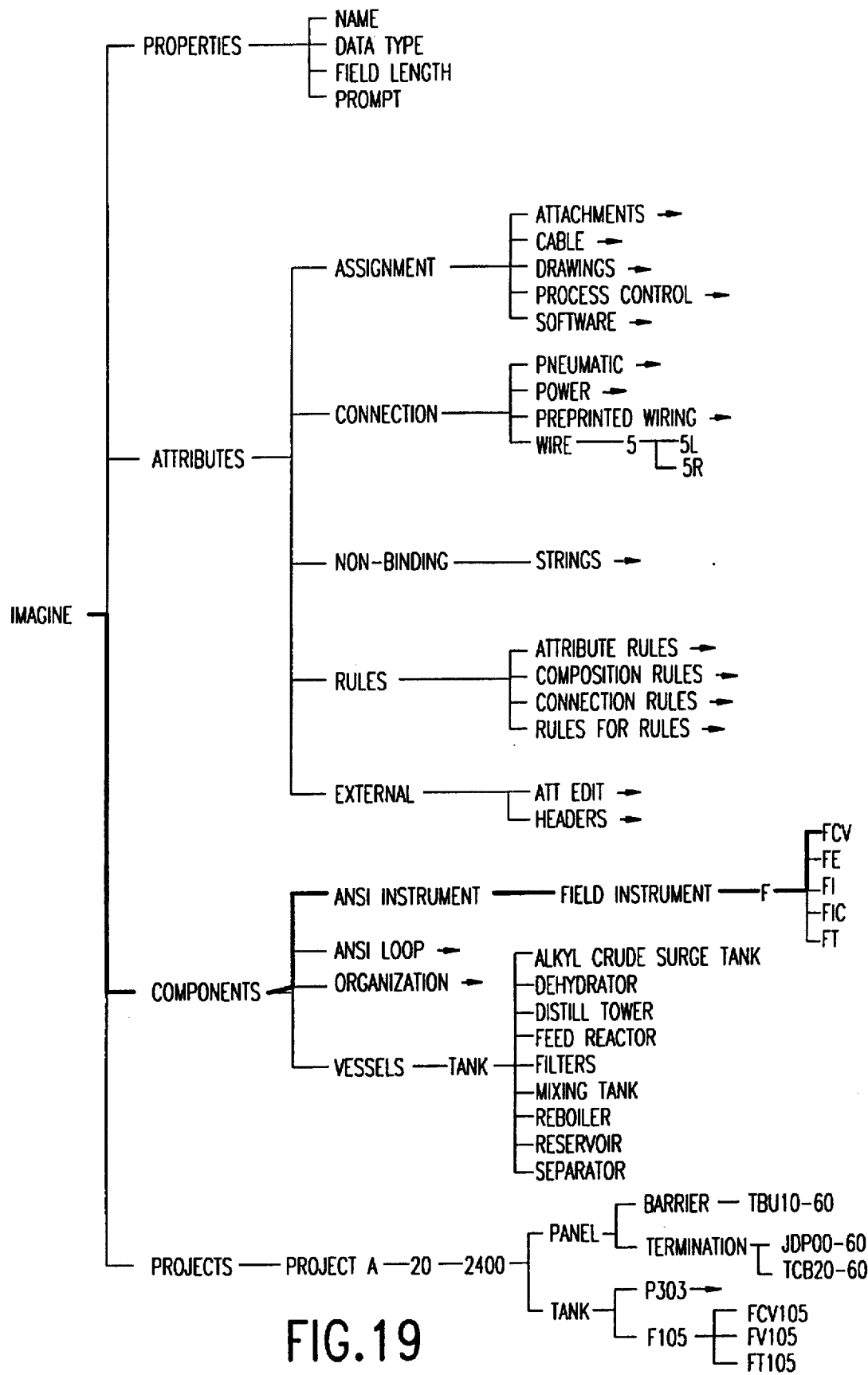
FIG. 19 is a logic diagram illustration of concepts in the descriptive network of a component record.
Figure 20:
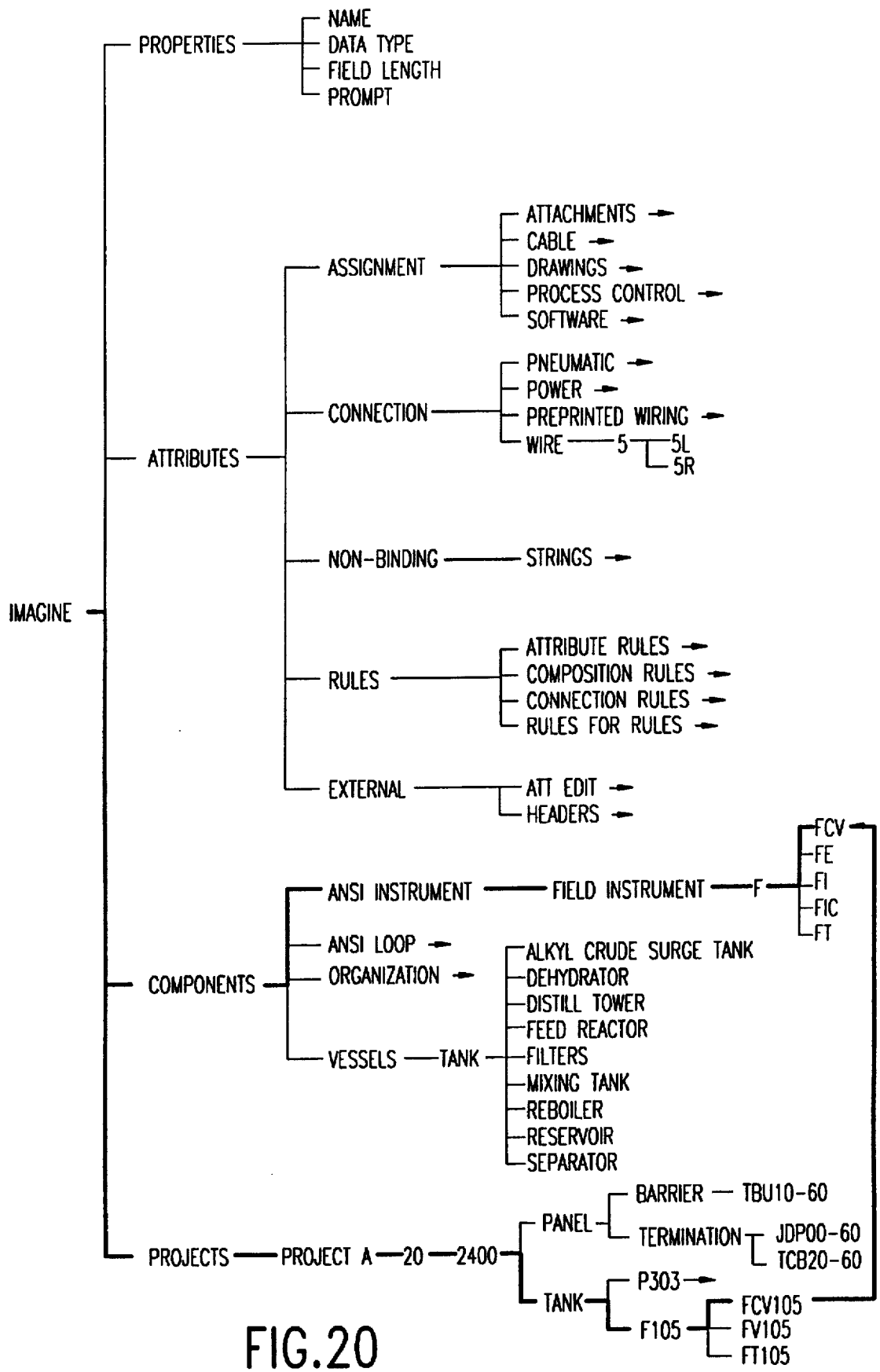
FIG. 20 is a logic diagram illustration of concepts in the descriptive network of a project record.

FIG. 18 illustrates the concept of a descriptive network for an active Attribute record. Here, "5L" (upper left hand side of FIG. 18) is the active concept for explanation. FIG. 19 illustrates the concept of a descriptive network for an active Component record. Here, "FCV" (upper right hand side of FIG. 19) is the active concept. FIG. 20 illustrates the concept of a the descriptive network for an active Project record. Here, "FCV105" (upper right hand side of FIG. 20) is the active concept.

There are two properties of the descriptive networks illustrated in FIGS. 18 through 20 which are universal properties of all descriptive networks according to the present invention: First, the number of concepts in the network is very small; second, the paths associated with the descriptive networks lead "up the tree" and terminate at the root record (here, the root record is the record for the IMAGINE™ processing system of the present invention).

Figure 21:
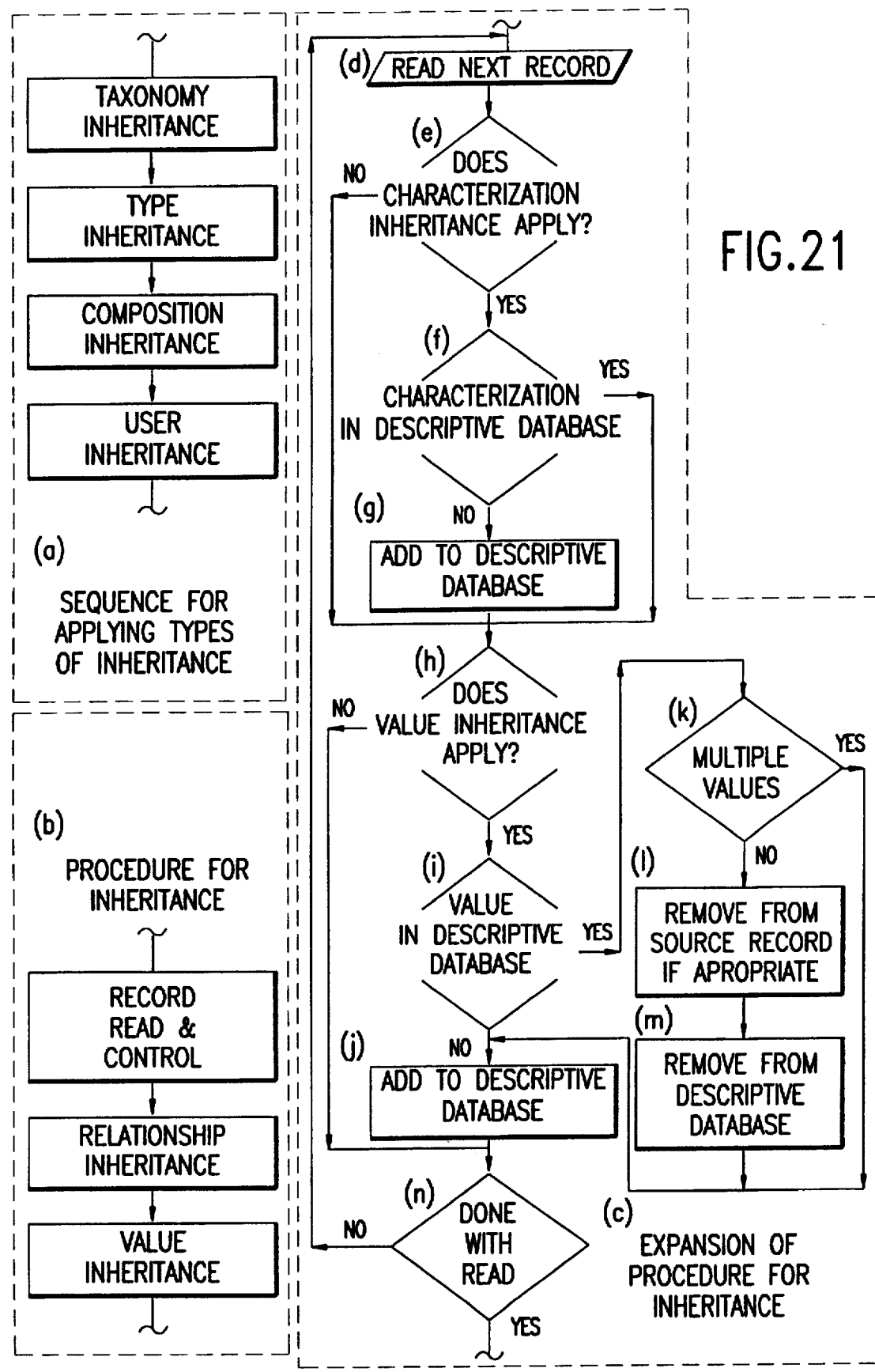
FIG. 21 is a Flow Diagram of Programmed Means for Implementing Relationship Inheritance.

The types of inheritance must (summarized in FIG. 17) be applied in a specific order to assure that the correct meaning of the record is inherited. FIG. 23 provides a flow diagram of the programmed procedures for assuring that the inheritance is correctly implemented in sequence. The sequence for applying the inheritance is illustrated on the left side of FIG. 21. Each type of inheritance has a common underlying procedure which is illustrated (21b). An expansion of the procedure for inheritance is illustrated on the right side of FIG. 21 (21c). Note that the procedures are the same for each type of inheritance: the only differences lie in the tests as described below and the responses to the tests summarized in FIG. 17.

The sequence (21ab) for applying the types of inheritance is recommended; however, other sequences could be implemented. Whether or not a particular category of inheritance applies to a given record is a function of the Library (i.e., attribute, component or project) to which the record belongs, as summarized in FIG. 17 items (17d), (17e), and (17f).

Note that relationship inheritance does not apply to attribute properties because they are all system (i.e. internal) concepts with nil relationship lists.

The (21b) procedure for inheritance is to read a record for which inheritance is to be assembled using the Output Record Operations. The information from the Output operation is temporarily stored in internal memory. The information includes cues to the Library to which the record pertains, to the parents, to the type, and to the relationship list of the record. Each of these are used in subsequent tests and steps in the Inheritance procedures which evaluate and apply the Relationship and Value inheritance that may be applicable to the items in the relationship list.

Inheritance is most easily implemented as a recursive process, wherein the inheritance of a record is obtained by retrieving the inheritance of its parent record. The only condition is that the record for which the inheritance is being assembled (called the "Active" record) must be passed forward or otherwise indicated in the system so that the active reference number can be recorded, since the inherited information is provided to the Descriptive Database.

The Expansion of the Procedure for inheritance provides details of the procedures for Relationship inheritance and of the procedures for Value inheritance.

At step (21d) the next record is read if the relationship list of the current record is empty. If the relationship list of the current record is not empty, the first relationship is read from the list and sent forward for relationship value inheritance. At step (21e) it is determined whether characterization relationship inheritance is applicable to the record. The applicability of relationship inheritance is determined by evaluating the type of inheritance being evaluated as summarized in FIG. 17.

If (21e) was Yes, then check to see if a characterization relationship with the same characterization is already in the (3h) Descriptive Database for the Active node (step 21f). If not, then the relationship is added to the Descriptive Database (step 21g). If (21f) was Yes, then bypass the relationship inheritance.

With the relationship inheritance complete, check to see if Value inheritance applies (step 21b). In general Value inheritance does apply; however, a specific attribute characterizing a user relationship may have a property or rule attached to it which prohibits inheritance.

If step (21h) does not apply the value inheritance procedure is bypassed. If (21b) does apply then it is determined if there is a relationship with a value reference the same as the current value reference (step 21i). If (21i) is Yes, then determine if the characterization attribute allows for multiple values as one of the properties of the attribute or attribute class (step 21k). If (21k) is yes then go to (21j) and add the relationship to the Descriptive Database. If (21k) is No, get the source record of the relationship from the information in the Descriptive Database and remove the relationship from the source record if appropriate (step 21l). Then remove the relationship from the Descriptive Database (step 21m). Then add the relationship to the Descriptive Database with the current record as the source. (Note that the deletion from and addition to the Descriptive Database is equivalent to substituting the current record reference for the existing source reference of the relationship in the Descriptive Database).

If the inheritance is for a fundamental relationship, check to see if done with read by verifying that the current record is a system concept and the remaining relationship list in temporary memory is nil (21n). If the inheritance is for a user concept, then check to see if the reading has progressed a defined number of levels away from the Active record. The number of levels for user inheritance will tend to be a property of the Attribute Classes, as in the preferred embodiment. Usually one or two levels are adequate for user inheritance.

If (21n) is No, go to (21d) Read Next Record. If (21n) is Yes proceed to next process.

Note that the described flow process was based on resolving inheritance from the active record through the path to the system concepts (or levels of traversal) which terminate the path. This process can be reversed so that the resolution is from the system concept to the Active Record. If this is done step (21l) remove from Source Record should be changed to Remove from Current Record, and (21m) is not required. The implementation of relationship inheritance is very powerful and results in tremendous economies in data entry: a relationship or value must only be entered so that it is stored in a specific record (one time, one place), and it will automatically appear in the description of all concepts which include that record in their descriptive networks.

Characterization inheritance

Characterization inheritance assembles the descriptive inheritance list for the attributes characterizing relationships in the Descriptive Database. Characterization inheritance essentially assembles the descriptive meaning of each of the attributes referenced in the characterization of relationships in the Descriptive Database. The process disclosed below sequentially applies the procedure for relationship inheritance to the characterization of each relationship in the Descriptive Database.

The Characterization of each relationship is stored in the structure of the relationship. The procedures for Characterization inheritance are fairly simple compared to those for Relationship inheritance. This is largely due to the fact that the Characterization inheritance calls on the Relationship inheritance procedures and therefore does not need to repeat the methods programmed in the Relationship inheritance.

Figure 22:
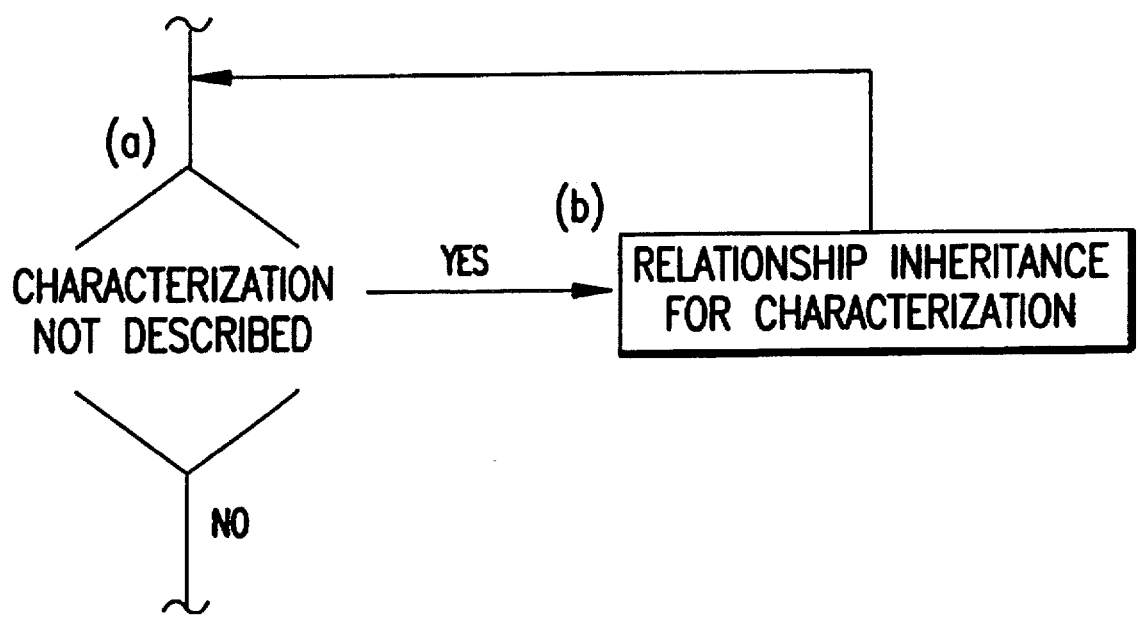
FIG. 22 is a Flow Diagram of Programmed Means for Implementing Characterization Inheritance.

FIG. 22 illustrates a Flow Diagram for Implementing Characterization Inheritance. Characterization Inheritance is a simple two step process. First find a characterization in the Descriptive Database for which the characterization inheritance is not assembled in the database (step 22a). Then assemble the description for the characterization by means of Relationship Inheritance for said characterization (step 22b). This two step process is applied until all characterizations are described in the Descriptive Database, and then the cycle terminates. Numerous variations of this basic process for Characterization inheritance can be implemented as part of a family of functions for Characterization inheritance in any real world application of the invention. Typical variations can include: assembling the Characterization inheritance for only a particular class of attributes; and assembling the characterization inheritance for only those attributes required for a particular view.

(3h) Descriptive Database

The Descriptive Database is a means for storing information in a plurality of records in a computer database. The descriptive database is a 'working' non-permanent database. The transfer of information to it from the Knowledge Representation Database is made to consolidate the relationships in the concept/records from references to other concepts into descriptions of the concepts. The description of the concepts facilitate the views, and user interaction with the knowledge representation database.

The information stored in the computer database is structured by means of suitable database data type declarations wherein the structure of each record in the database includes substructures designed to store individual relationships from the Knowledge Representation Database together with structures designed to store the reference number of the "Active" record to which said individual relationship applies and the source of said relationship in the Knowledge Representation Database.

The Descriptive Database embodies a portion of the network of the Knowledge Representation Database, by means of suitable record structures in a computer database. The records embody each of the relationships in the relationships list of the records of the Knowledge Representation Database. The Descriptive Database embodies a description of the information stored in a plurality of records comprising a portion of the records in the network of the Knowledge Representation Database by associating the record reference numbers of the records (Active and Source) with the information from the relationship lists of the records. This is required if relationship inheritance is implemented because otherwise there is no way to assemble all of the relevant relationships for a record and know the source of those relationships.

The structures of the records for the Descriptive Database are established as database data-type declarations in the programming language in which the structures are implemented. Suitable provisions for declaring such structures are provided by the various programming languages and tools which are suitable for implementation of the present invention.

The translation from the Knowledge Representation Database and to the Descriptive Database is provided by means of the Network Operations. Other functions in the system such as the Concept Editor and the Relationship Editor use the Descriptive Database by means of native calls to the database. Native calls are not discussed further herein because they are well known standard techniques.

FIG. 23 illustrates a suitable Domain Declaration for the Descriptive Database. The Source of each relationship is recorded together with the Active for which it was assembled.

The Database (23a) identifies the database of the Source as either a project database (prj) or an environment database (env). If additional databases are used, they can be added to the list. In Knowledge Representation Databases which include the environment and projects in a single file the Database (23c) is not required to define the Source.

The Active (23b) identifies the reference number of the record and the database in which the record occurs for which the description is assembled in the Descriptive Database; the order is arbitrary.

The Source (23c) identifies the reference number of the record and the database in which the record occurs; the order is arbitrary.

The structure (23d) of the Descriptive Database record includes a Relationship together with items (23a) through (23c). The order of the items in the structure is arbitrary.

The illustration of FIG. 23 identifies the essential elements comprising the records of the Descriptive Database. The structure of the Descriptive Database record can easily be supplemented with additional structures to store additional information which facilitate the views.

The Descriptive Database can be augmented to also associate document defined icons and icon locations appropriate to the record and relationships, by declaring a plurality of supplemental records suitable to the storage of the document related information. The icons and the icon locations associated with the information and the record reference numbers in the Descriptive Database are derived and placed in the Descriptive Database by means of one of the plurality of views. The views may add supplementary data structures to the Descriptive Database as required to support the view.

A plurality of data structures are used in the Descriptive Database to facilitate storing the icons and icon locations required to support the documents in the plurality of views implemented for the system. There is considerable latitude available to the system designer in declaring suitable data structures; however all declarations will have common characteristics which are set forth in the subsequent discussion.

(3i) Concept and Relationship Editor

The Concept and Relationship Editor is a code module for editing the concepts (records) and relationships (cross-references within records) comprising the Knowledge Representation database. This module is comprised of a plurality of programmed operations which make use of the Record Operations, the Network Operations, and the Descriptive Database. The following subsections will highlight specific aspects of the Concept and Relationship Editor which are particularly unique to the invention.

Concept Editor

The Concept Editor is comprised of a plurality of programmed procedures. The Concept Editor embodies means for editing the concept records of the Knowledge Representation Database and assuring that all records maintain appropriate fundamental relationships.

Figure 24:
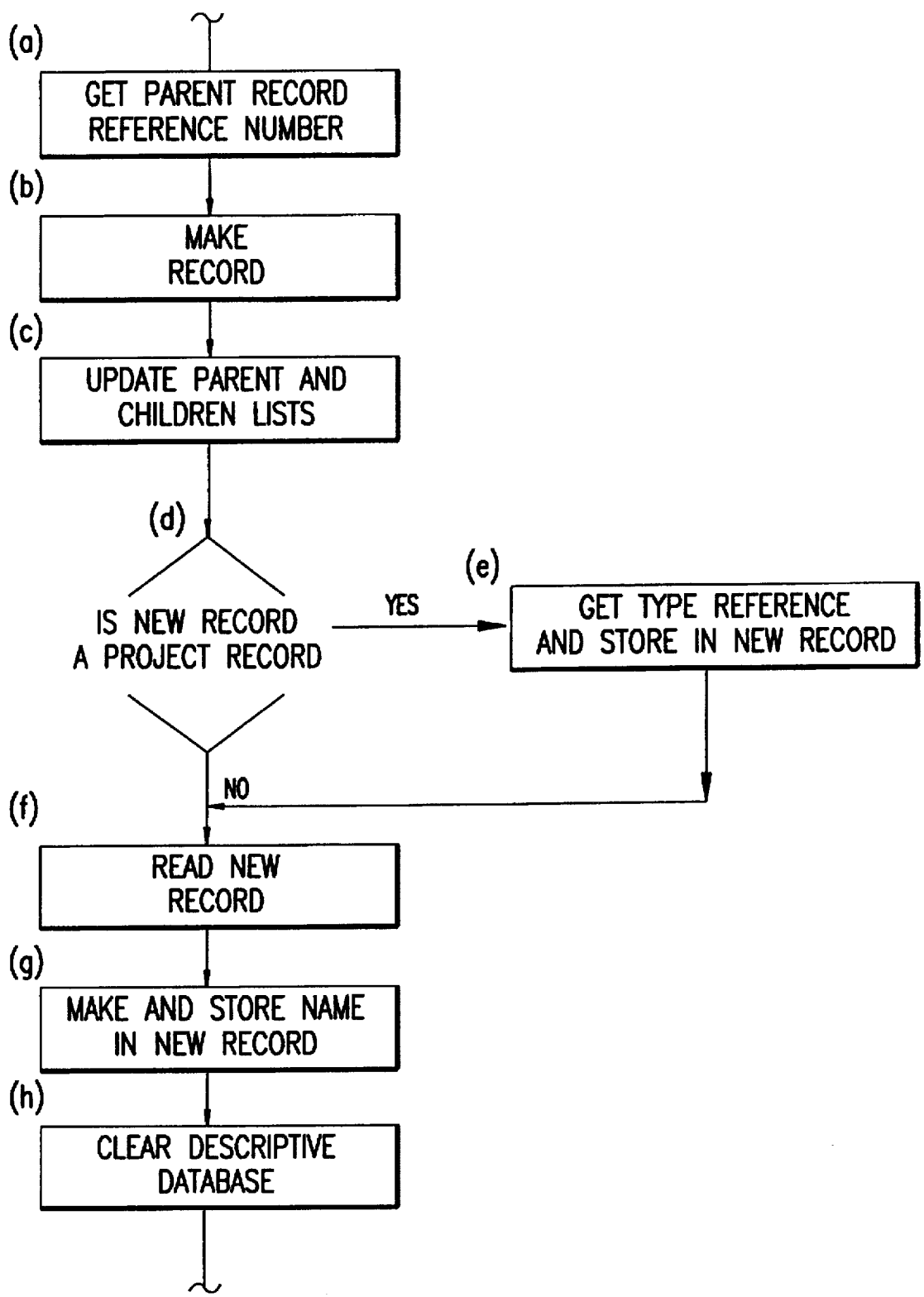
FIG. 24 is a Flow Diagram of Programmed Means for Adding a Node to the Knowledge Representation Database.

The Concept Editor coordinates the Record Operations to create new records and to store the appropriate information in the substructures of the records. The coordination of these operations assures that all records are connected to the network through appropriate fundamental relationships. The Concept Editor also coordinates user interface to enable user interaction in identifying the values for the fundamental relationships. The Concept Editor is invoked by the Natural Language Interface with Knowledge Representation and the User View Interaction interface as required to edit concept records in the Knowledge Representation Database. FIG. 24 illustrates a Flow Diagram for Adding a Node (record) to the Knowledge Representation Database. It illustrates the principle steps in creating a record and assuring that the fundamental relationships are correctly formed. Each new record must have the correct fundamental relationships in order to assure interpretability in the network.

User interaction to add a node can be implemented in a variety of ways through the Natural Language Interface and through the User View Interaction interface.

Each new record will be added in relationship to some existing concept record. Getting the Parent record reference number (step 24a) can be accomplished through user interaction. For example the Natural Language Interface or the Tree View can be used to ask the user to identify an appropriate Parent for the concept record which is to be added to the database.

Often the request to add a new record is invoked by identifying the parent and requesting the addition of a child (this is especially typical of Tree View interaction). In such Case step (24a) is merely the process of determining which record is highlighted or active on the display screen of the computer when the request to add a record was made. The record can be made immediately without any information stored in the substructures (step 24b). If the record is made as illustrated, the additional information for the record, which is subsequently derived, can be added to the record. The record can be made as a final step if all of the additional information is temporarily stored for addition to the record as soon as it is made.

In general the procedure illustrated in FIG. 24, wherein the record is made first and the subsequent information added to the record as the information is derived, will result in multiple disk accesses during the creation of and addition of the information to the record. This does not present a problem for single user systems. In networked systems, however, moving step (24b) to last may be preferable as it will minimize disk accesses.

The next step is to Update Parent and Children Lists (24c). The Parent reference number field of the new record must contain the reference number of the Parent record. Reciprocally, the Children reference number list of the Parent record must include the reference number of the new record as a descendant of the Parent.

Project Library records require Type references, therefore step (24d) determines if the new record is a Project record. If the outcome of (24d) is YES, then the Type reference is retrieved and stored in the interstrata Reference List of the New Record (step 24e). If (24d) is NO, then the flow proceeds to step (24f) to read the New Record.

The Type reference can be determined by querying the user for the type of the record. This is done by displaying the Component library in a Tree View, and allowing the user to select the component which corresponds to the Type of the new Project record. The process of selecting a component for the Type can be supplemented through the addition of routines which will provide best guesses on what type of component the Project record is, based on the context of the parent of the new record. The context of the parent record may provide guidance in selecting the Type by one of two means which can be implemented by the system designer as supplementary procedures to assist the user in identification of the type of a new Project record. First, the parent record may include an abstraction defining the type of the objects which exist in its compositional hierarchy as children. This abstraction may furnish a list of likely types from which the user can select the Type of the new record.

The second method is to infer a likely Type based on examination of the existing children of the parent record. It is likely that a new record will be of the same Type as the record's siblings. The addition of these supplementary procedures for determining the Type is at the discretion of the system designer.

If the Type does not already exist, the user should be allowed to create a new component of the Type desired, and then select that new component as the Type of the new Project record. This is merely a modification and enhancement of the selection of the type, and therefore is not discussed in further detail.

The new Record is read at step (24f) by using the Read Network Operations (16e) to assemble the Descriptive Database for the new record. This will assemble the relationship inheritance for the new record. This is required because the record Name will be the value of an external relationship of the new record.

In order to Make and Store the Name in the New Record (24g), an external relationship for the name must be formed and added to the Relationship List of the new record. The name and the attribute characterizing the name must be obtained either by user interaction wherein the user specifies the name and characterization of the name for the new record, or by deriving the name and characterization from the inherited relationships of the new record. The procedures consist of prompting the user to provide a name, and prompting the user to specify which of the external relationships of the new record contain the Attribute characterizing the name.

The procedure for deriving the name from the inherited relationships of the new record is by means for Pattern Recognition and Storage wherein a pattern specifying some portion of the name relationship for the new record has been previously identified and stored.

Note that in some cases the attribute characterizing the relationship for the name will not be part of the relationship inheritance of the new record. In this case a relationship with the correct characterization must be added by means of the Relationship Editor and then selected by the user.

The name must be stored in the appropriate structures of the record. In the preferred embodiment this includes storing the name in the Name location of the concept record structure, and storing the characterization in a substructure of the record.

With the completion of step (24g) the process of adding a new record is complete and all that remains is housekeeping including clearing the Descriptive Database and any internal variables or data structures used in the process (24h).

The following paragraphs provide notes on the preferred embodiment of the invention to provide guidance to the system designer in implementation.

In practice it has been found advantageous to keep a list of reference numbers of all deleted records, and to use a deleted record reference number whenever possible in creating a new record.

The preferred embodiment allows for the definition of synonyms for each of the concepts. This is enabled by providing a single name for each concept in the Name field of the record, but indexing all synonyms as part of the index associated with the database. This means that a plurality of names will be associated with each reference number in the index. This is particularly convenient in connection with the Natural Language Interface wherein synonyms for the concepts will regularly be defined.

Another optimization that is present in the preferred embodiment is that conjugate types of relationships are not stored in the corresponding component record. Rather, the conjugate relationships between the component record and the Project record are stored by indexing the reference number of the component record in the index of the Project database. This is particularly convenient in multi-project databases, in that it allows for distinguishing the presence of the component in a particular database.

Relationship Editor

The Relationship Editor is comprised of functions for editing the relationships describing a concept record of the Knowledge Representation Database. These functions include editing 1) the relationship list of a record; 2) the characterizations of relationships; and 3) the values of relationships.

The Relationship Editor coordinates the unit operations of the Descriptive Database, the Network Operations, and the Record Operations to edit the relationships in the Relationship List in the records of the Knowledge Representation Database. The Relationship Editor also coordinates user interface to enable user interaction in identifying the characterizations of and values for the relationships. The Relationship Editor is invoked by the Natural Language Interface with Knowledge Representation and the View User Interaction interface as required to edit relationships in the Knowledge Representation Database.

Each of the domains declared for the Values (internal or external) will in general require a separate class of editor. This is because the domains of the Values are distinct from each other. External values are those that are not further conceptualized (no record embodying the concept exists) in the network and are represented in the value field by a character string such as 'red' or 'positive'. Internal values are those that are further defined by other concept records and the value field holds the reference numbers of those concept records.

In specific implementations where additional classes of external values are implemented, specific editors suitable for those classes of values may be required. For example, in the preferred embodiment, there is a domain declared for representing graphical icons as the values of external relationships. Such icon definitions require a separate editor suitable to editing the entities comprising said definition.

In the preferred embodiment the editor for the external values is implemented in a manner very similar to standard word processing type environments, wherein the editor includes the full range of event processing characteristic of word processors. In general, editors implemented for the Values include event driven processing of user actions in control of the editor. These editors, in many ways, resemble standard word processing programs designed to create a particular type of document. The specifics of the development of these types of editors is not disclosed herein, as it is considered standard technology which will readily occur to any skilled practitioner given the value domain upon which the editor must operate.

Adding a Relationship

The following discussion identifies the procedures for adding a relationship to the Relationship List of a specific record. The process of adding a relationship is essentially to identify a characterization for the relationship and adding it to the Relationship List with an unbound value.

Each relationship has a reference number of an attribute, or an attribute property, which defines the characterization of the relationship. The Value of a relationship is constrained by the characterization in that the characterization specifies the properties of an acceptable Value (e.g. data type, field length, range, etc.).

In any specific relationship the value can be undefined: such values are said to be "free" or "unbound". A relationship is always initially added to the Relationship List of a record (or equivalently to a description in the descriptive database) with the value unbound. The value is subsequently bound through various means for specifying the value.

Figure 25:
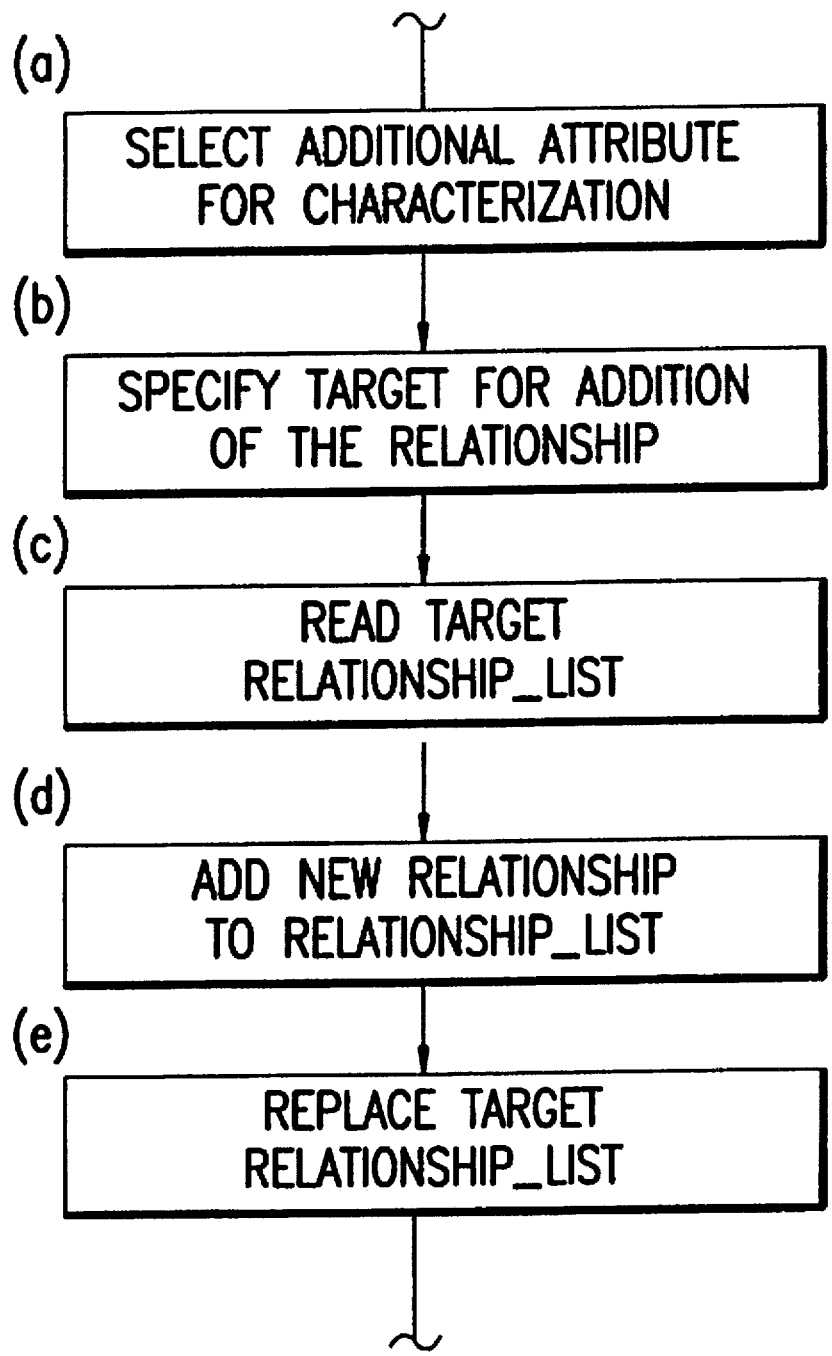
FIG. 25 is a Flow Diagram of Programmed Means for Adding a Relationship to the Relationship_List of a Record.

FIG. 25 illustrates a Flow Diagram for Adding a Relationship to the Relationship list of a Record in the Knowledge Representation Database. Each of the steps of the process are briefly discussed in the following paragraphs.

In step (25a) the selected attribute should not be the same as any characterization in the current description of the Active record. The selection may be supplemented by a variety of means to assist the user by making a "best guess" or likely choice based on the view context in which the query occurs.

The user must identify the target for the addition of the new attribute relationship at 25b. The user is prompted for the specification of the Target. It is helpful to present a menu of possible targets for the user's selection. The target will be one of the Component Library concepts in the descriptive network of the Active record.

At step (25c), the Target Relationship list is read using the Output Record Operations to read the Relationship list stored in the target record of the Knowledge Representation Database. The Relationship list is passed forward to step (25d) where the new relationship is added to the Relationship list. The new relationship is formed using the new characterization and a nil value.

Finally, at step (25e) the target Relationship list is replaced with the new Relationship list using the Input Record Operations to store the new Relationship list in the target record of the Knowledge Representation Database.

Instantiating a Value

The following discussion identifies the procedure for instantiating a Value for a relationship and adding the relationship with said Value to the Relationship List of a specific record.

The process of instantiating a Value is essentially to use the characterization for the relationship as a basis for guiding the user in editing the current Value to specify an acceptable Value. All relationships always have a value in that an unbound value can be considered to be nil. Thus the process of instantiating a Value is equivalent to the process of editing a value.

The Value domain is comprised of two domains: Internal and external. The following discussion refers to flow diagrams and descriptions of procedures for instantiating both types of values. The procedure for instantiating a value assures that all relationships are stored at the correct locations in the networks and that reciprocal relationships for internal values are coordinated.

The Relationship Editor is invoked by the Natural Language Interface with Knowledge Representation and the View User Interaction interface, as required to edit concepts in the Knowledge Representation Database.

Instantiating an Internal Value

Figure 26:
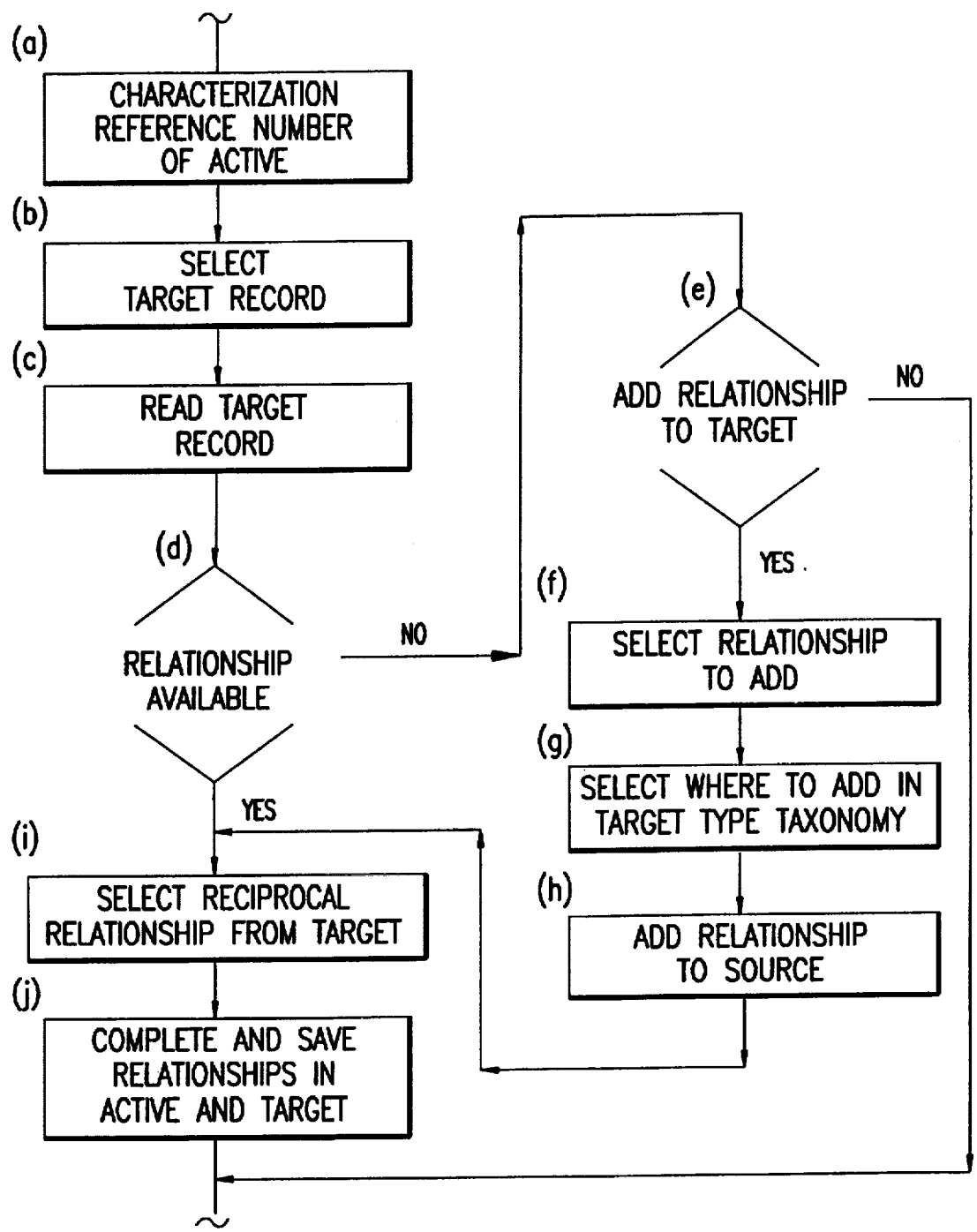
FIG. 26 is a Flow Diagram of Programmed Means for Instituting the Value of an Internal Relationship.

FIG. 26 illustrates a flow diagram for establishing a reciprocal relationship between two records. The calling functions will typically track both the current Active record and the current relationship of the Active record. Typically, the Active record will be in the Descriptive Database, as is assumed in the following discussion. These items must be present prior to proceeding with establishing a reciprocal relationship.

The first step (26a) is to determine the characterization reference number of the current Active relationship. The characterization reference number is required because the reciprocal relationship will be based on a compatible relationship in the target record (the record to be connected to). At step (26b) the target record is selected as described above.

First, it must be determined if the Active record has an abstraction which identifies a pattern for the target of the Characterization reference number (see subsequent discussion of Means for Pattern Recognition and Storage).

A second procedure for selecting the target record is to prompt the user and transfer control of the selection to an appropriate View for user selection of a target record. This can be optimized by making a best guess by looking at other instantiated relationships for the Active record of the same attribute class as the Active characterization and prompting the user to an appropriate view document of the local network. Once the target record has been selected, the Target record is read at step (26c) by using the Read functions of the Network operations. This will assemble the relationship inheritance of the Target in the Descriptive Database.

The relationships of the Target in the Descriptive Database are checked to determine if a suitable relationship is available for the reciprocal of the Active Characterization at step (26d). The suitability of the relationship is governed by two things: 1) the attributes must be of the same Attribute Class (i.e. the same Attribute Class system concept must be a common parent of both the Active and the Target characterizations); and 2) the Attribute Class of the characterizations must not exclude the available Target characterizations.

If a suitable relationship is available the flow proceeds to step (26i) to select the characterization of the reciprocal relationship from the target record. If a suitable relationship is not available then the user is notified that the Target contains no suitable relationships and the user is prompted to add a Relationship to the Target record at step (26e). If the user declines, the procedure is aborted. A modification would be to return to step (26b) Select a different Target Record, instead of aborting. This could be augmented by asking the user whether to abort or select new target.

If the user wants to add a Relationship to the Target record, then an Attribute is selected to characterize the relationship to add from the descendants of the Attribute Class system concept of the Active relationship characterization at step (26f). Tree view is a convenient view for enabling this selection. The selection could also conveniently occur through a menu pick wherein the appropriate candidate attributes are presented for user selection.

The selected characterization must be added to one of the records in the Target Type taxonomy. The user typically must, at step (26g) select where to add the new relationship in the Target Type taxonomy. This can be accomplished by means of presenting the names of the Taxonomical ancestry of the Type record together with the name of the Type record in a menu for the user to identify which record (Source) should store the uninstantiated relationship.

The new uninstantiated relationship should then be added to the source record at step (26h) by means of the Input function of the Record operations. At step (26i) a Reciprocal Relationship for the Target is selected from the available relationships. If only one relationship is present take it. If more than one relationship is present the names of the attributes characterizing the relationship can be presented to the user for user selection of the desired relationship. Note that this selection process may be modified by (1b) Means for pattern recognition and storage if previous patterns of connections have been identified (see subsequent discussion of the (1b) means).

The program can then complete and save Relationships in the Active and Target records at step (26j). The relationships are completed in a form similar to that illustrated in FIG. 5 where (5c) and (5d) are typical of the instantiation of the relationships which will be stored at the Active and Target records respectively.

Instantiating an External Value

Figure 27:
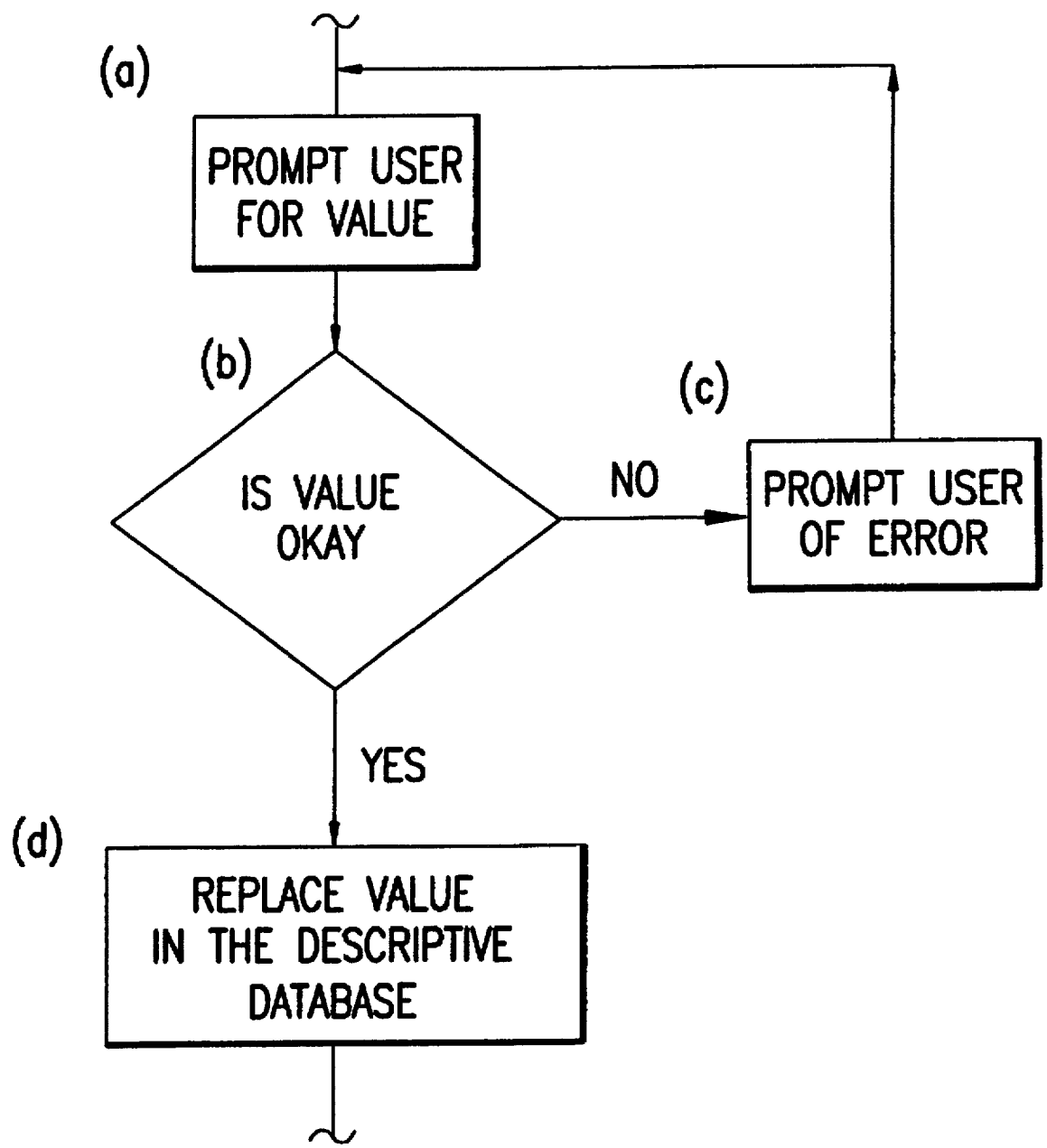
FIG. 27 is a Flow Diagram of Programmed Means for Instituting the Value of an External Relationship.

FIG. 27 illustrates a Flow Diagram for Instantiating the Value of an External Relationship. Each step is described in the following paragraphs.

At step (27a), the user is prompted for the value. External values must be entered by the user. It is possible to assist the user with likely defaults, particularly if the means for pattern recognition and storage have been implemented and a pattern has been stored for the characterization of the value. Such assistance is an optional enhancement of the embodiment presented here.

Upon user definition of the value, test (27b) the value is approved by comparing it with any restrictions on or specifications of data type which may be part of the description of characterization of the relationship. Step (27b) may be comprised of a plurality of tests to determine if the value is ok. For example, the test might include data type, field length, and value range. If the value is not satisfactory to all tests, then step (27c) prompts the user of the error (failed test) and allows the user to edit the value. If the value is satisfactory to all tests, then step (27d) replaces that value in the Descriptive Database. The user will need to invoke the Save operations in order to place the new value in the (3a) Knowledge Representation Database.

Some useful variations include: allowing the user to set a flag which will automatically save all new values to the Knowledge Representation database; or to always automatically save the new values to the knowledge representation database.

(1b) PATTERN RECOGNITION, STORAGE, AND UTILIZATION MODULE

The pattern recognition, storage, and utilization module (1b) recognizes patterns in the relationships stored in the Knowledge Representation Database, stores the recognized patterns as relationships in the relevant records of the Knowledge Representation Database, and utilizes the stored patterns in the editing of concepts and relationships comprising the Knowledge Representation Database.

Recognizing, abstracting, and storing patterns provides for the embodiment of significant knowledge which, when utilized, results in intelligent behavior of the system.

Relationships in the Knowledge Representation Database are established by the Concept and Relationship Editor (3i). Patterns in relationships can be abstracted and learned by adapting procedures to monitor and record the operation of the Concept and Relationship Editor. Such procedures are implemented in the invention so that the recognition, utilization, abstraction, and storage of the patterns occurs as part of the operation of the Concept and Relationship Editor.

The abstraction of the patterns are stored by means of a class of Attributes which will be known herein as Rules. All Rules are implemented as system concepts and are used to characterize a relationship wherein the Value stores the abstraction of the relationship pattern. All rules are declared as system concepts in that the interpretation of each Rule must be embodied in specific code associated with the relevant editor. The values in relationships characterized by rules can be edited to provide a priori definitions and to modify stored patterns. The principles by which such a Value editor can be implemented was briefly described in connection with the means for editing relationships.

Relationships characterized by rules are added to a Relationship List of an appropriate record by use of the same editing procedures that are used to add any relationship to the Relationship List of a specific record.

The patterns are, in essence, a record of the patterns in relationship at the next higher level of abstraction, than the level upon which the instantiation of the value occurs. This means, for example, that when a substructure is being added to a project concept record, what is recorded is the reference number of the classification or type of the specific substructure rather than the reference number of the specific record embodying that substructure. The rule embodying the abstraction is stored within the Type record of said project concept record.

Similarly, patterns of relationship between external values, (for example as occurs in the concatenation of First Name, Middle Name, and Last Name to derive the value of the Full Name) would store the reference numbers of the characterization of the values in the concatenation, independent of their values (e.g. the attribute record for the concept of "Full Name" would include a rule for concatenation, the value of which would be comprised of the reference numbers of the attribute concepts for First Name, Middle Name, Last Name.)

The unique means for pattern recognition, storage, and utilization are discussed under the following subheadings: implementing Attributes characterizing Rules as system concepts; implementing Attribute Properties of Rules as system concepts; and implementing programmed code for pattern recognition, storage and utilization in conjunction with the means for editing relationships and values.

Implementing Rules as System Concepts

The Rules of this invention is the class name for characterizations of the relationships wherein recognized patterns are stored in the (3a) Knowledge Representation database. All recognized patterns are stored relationships as values with an associated characterization that must be a Rule. This provides compatible means for storing the abstracted patterns as properties of the concepts in the Knowledge Representation database. The specific characterizations implemented as system concepts will typically be implemented as a subclass of the Attribute Library. The rule system concepts are implemented as per the methods for including system concepts typical of the Knowledge Representation database.

Figure 28:
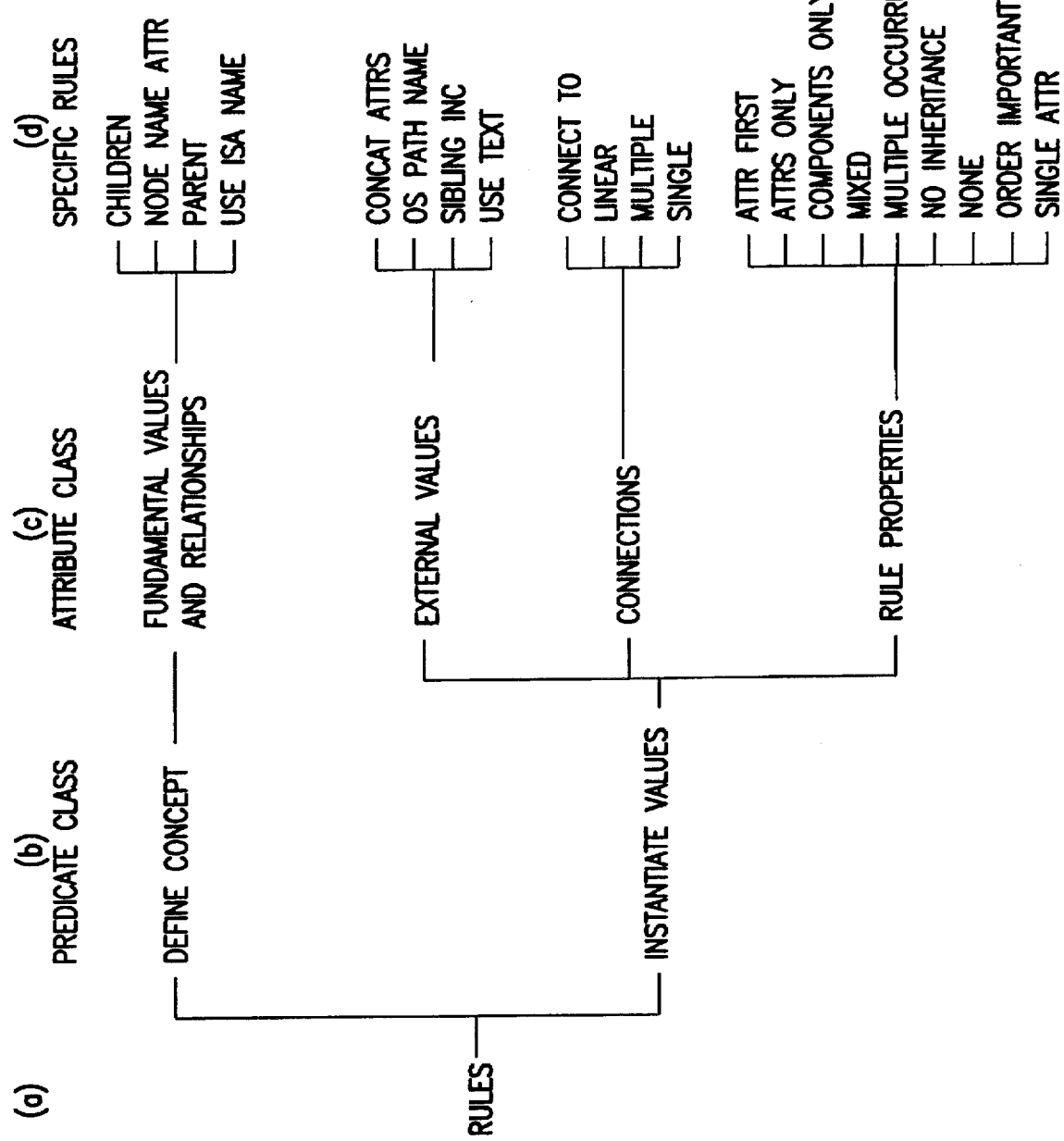
FIG. 28 is a Tree Diagram of the Taxonomy of Rules System Concepts.

FIG. 28 provides a tree diagram of a taxonomy of rules system concepts and illustrates the principles for deriving rules and implementing said rules as System Concepts. FIG. 29 provides a summary and description of specific rules which are illustrated in column (28d) of FIG. 28 and included in the preferred embodiment. Column A of FIG. 28 merely represents that we are talking about the Rules. This corresponds to the suggested implementation of a Rules system concept.

The predicate classes illustrated in FIG. 28 Item (28b) are typical of the editor predicate (procedure) classes responsible for establishing and editing relationships in the preferred embodiment. Said classes include: define concept, which provides a plurality of program means for creating and editing a concept definition; and instantiate values, which provides the programmed means for instantiating the values embodying the user relationships in the Knowledge Representation database.

The attribute classes in Column (28c) identify typical classes of rules implemented in the preferred embodiment. Each of these classes are associated with the operations or the predicate classes relevant to the instantiated values within said classes. Having identified the predicate classes for establishing and editing relationships, and having identified the classes of characterizations of those relationships, the final step is to identify specific Rules characteristic of the programmed operations for each of the attribute classes.

The specific Rules in Column (28d) illustrate specific rules which have been found useful and are implemented in the preferred embodiment. Broadly conceived, they represent a plurality of system concepts which may be defined by the system designer to meet the objectives of the specific implementation. The specific function and purpose of the rules identified in Column (28d) will not be discussed in detail as they will be obvious from the description and preferred embodiment thereof.

FIG. 29 is provided as a summary and with a brief description of the specific Rules implemented as system concepts in the preferred embodiment. This will assist the system designer in understanding the specifics of the preferred embodiment. It also provides some sense of the function of the Rules.

Implementing Rule Properties as System Concepts

The values of Rules are typically complex structures of (12f) Mixed Type. There are a variety of attribute properties which are useful in constraining the behavior of mixed values. The attributes characterizing the behavior of a specific Rule's value are most easily implemented as attribute properties system concepts. As such, they may only be stored in the relationship list of records in the attribute library. More specifically, the attribute properties of rules (or rule properties) may be stored only in the relationships lists of rules system concepts. This restriction on where said rules properties may be stored must be embodied by the system designer within the program definition of rules properties systems concepts.

FIG. 30 provides a summary and description of specific rule properties implemented as system concepts in the preferred embodiment. In general, the rules properties will be implemented as part of the attribute properties library. They may however, be implemented in any of several other taxonomies, as their function as system concepts can define their meaning independent of the taxonomy of said concept. In the preferred embodiment, the rules properties system concepts were implemented within the attribute library. This illustrates the flexibility of the system in specific location of system concepts.

The specific properties identified and described in FIG. 30 and implemented in the preferred embodiment should be viewed as merely specific embodiments of the principle disclosed herein and most broadly conceived. A wide variety of specific rules properties system concepts will occur to the system's designer in the course of implementing a specific embodiment, given understanding of the principles of the invention and the example of the preferred embodiment. Each of the plurality of programmed means comprising the (3i) Concept and Relationship Editor will utilize the reference number of the rules system concepts as means for identifying said rules which pertain to each of the specific programmed means for editing.

Programmed Pattern Recognition, Storage and Utilization

The programmed pattern recognition, storage and utilization functions are implemented within the procedures of the (3i) Concept and Relationship Editor. The functions are implemented within the editing procedures so that the editing procedures both utilize and modify the patterns in order to enable the intelligent operation of the editing function. The functions implemented in the editing procedures include the ability to recognize and abstract user variance from the stored patterns, and to update said stored patterns based on the observed user variance.

Figure 31:
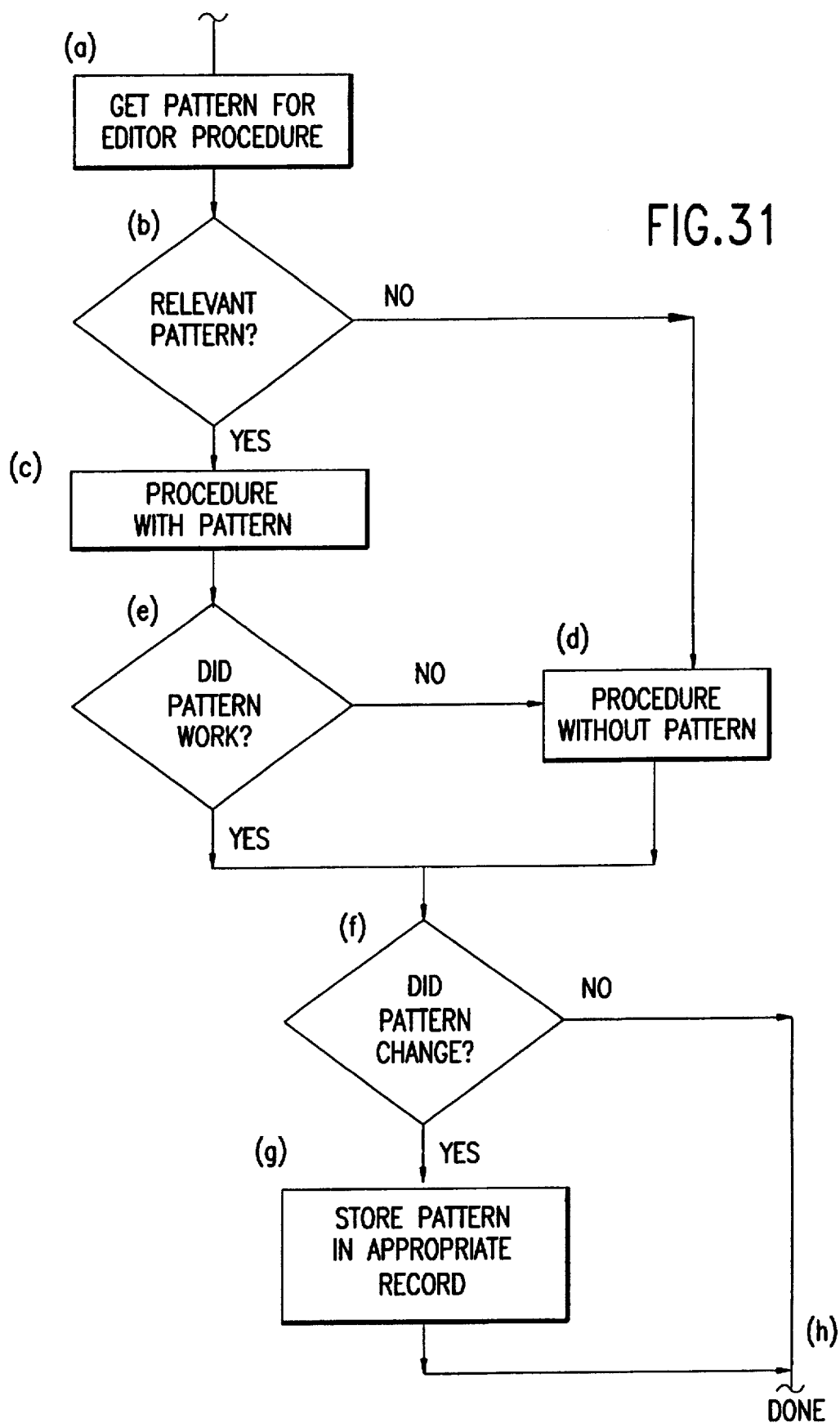
FIG. 31 is a Flow Diagram of Programmed Means for Pattern Recognition and Storage in the Knowledge Representation.

FIG. 31 provides a Flow Diagram of programmed means for Pattern Recognition and Storage in the Knowledge Representation. Upon entering each of the plurality of programmed editing procedures, Step (31a) is to get any relevant patterns for the active record, current relationship, and editing procedure to be performed. Step (31b) checks to see if any relevant pattern(s) were obtained.

If no relevant pattern is present, then execute Step (31d), the edit procedure without a pattern. This procedure may simply be no action at all (the null case.)

If a relevant pattern(s) is present, Step (31c) indicates use of the pattern(s) in a suitable procedural variant of the editor. The pattern(s) are used to constrain the operation of the procedural variant. The values are used during the procedural operation.

A primary means by which the system concepts are defined in the programmed code is the embodiment of the procedural variant that uses the pattern stored in the relationships characterized by one of the system concepts. In some ways, the definition of the system concepts can be thought of as being embodied in the procedural variant for the editing operation for which the system concept was declared.

Step (31e) tests to see if the rule or procedural variant worked. If it did not, then the failure case should take it to Step (31d) to execute the procedure with out a pattern.

If user selected options occur during the course of the editor operation in either Steps (31c) or (31d), which are not part of a pattern, an abstraction is made, then the pattern could change to accommodate the new options.

Step (31f) checks to see if the pattern of the rule changed during the course of the execution of the procedure. If the pattern did not change, then the procedure has been successful, and is (31h) done. If the value did change then the new value needs to be stored.

Step (31g) stores the changed pattern in the source record for that rule. This is accomplished by storing the pattern in the appropriate relationship in the record which is indicated as the source of the relationship. The means for identifying the source record and the meaning of source have been defined in previous discussion. In short, the source record is the record within the primary Knowledge Representation within which the relationship storing the pattern is stored as a member of a relationship list of said source record.

Step (31h) indicates the completion of the editing procedure.

(1c) NATURAL LANGUAGE INTERFACE WITH THE KNOWLEDGE REPRESENTATION

The Natural Language Interface module for interaction with the Knowledge Representation database (NLI) processes Natural Language expressions in conjunction with stored language related concepts for use in the Natural Language processing system. The NLI is particularly suited for implementation in conjunction with the Knowledge Representation database in that the network of relationships present in the Knowledge Representation is similar to the network of relationships present in linguistic expressions.

The Natural Language processing utilizes specific adaptations of standard Natural Language processing techniques. The Natural Language Interface module includes: 1) The sequential use of a functional parse and a functional pattern match parse which combines the features of both transitional network analysis and parsing by differences; 2) The use of a functional identification of the word in the Knowledge Representation instead of a grammatical identification as the basis for the functional parse; and 3) parsing by differences list based on function and value instead of value only wherein the function is identified by means of the system concepts in the descriptive network of the identified concept.

The Natural Language processing module interprets human language input expressions and responds appropriately thereto. The module includes the ability to recognize and learn new words and concepts contained in the input expression through interaction with the user concerning the definition of the new concept.

The program relies on the information stored in the Knowledge Representation database, and uses the patterns in the network of the Knowledge Representation to understand and respond to the linguistic patterns in the input expression.

In essence, the NLI matches the patterns inherent in human languages to the patterns embodied in the networks of the Knowledge Representation. This pattern matching enables human interaction with the computer in ways characteristic of human interaction with other people. This is a result which has heretofore not been achieved on this scale, and which is a major advance in the state of the art.

The preferred embodiment uses a natural language dialogue window, with suitable means for displaying the dialogue as it occurs. Such means are standard and will be obvious to the skilled practitioner, therefore they are not disclosed in detail.

Figure 32:
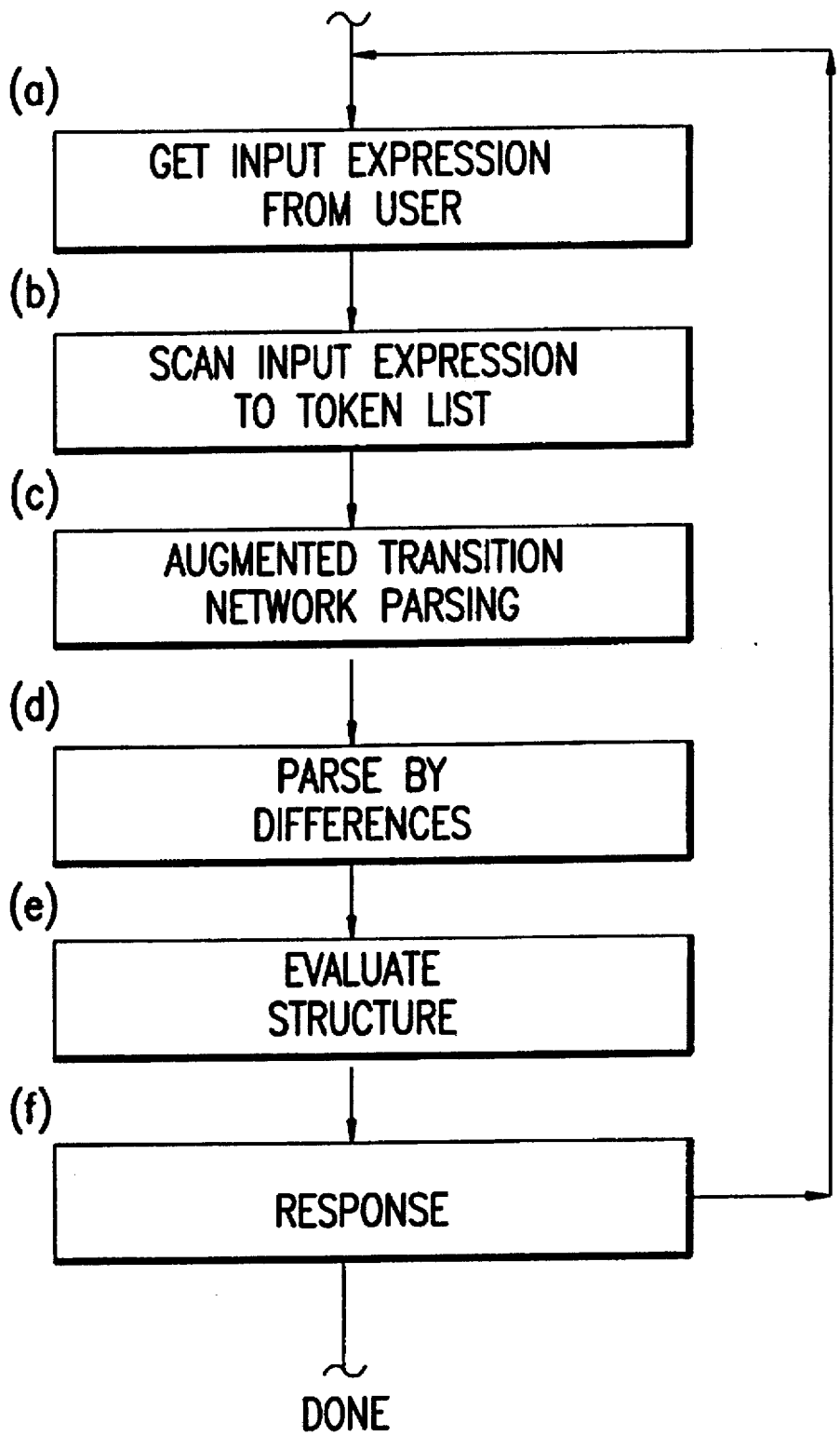
FIG. 32 is a Flow Diagram of Programmed Means for Natural Language Processing.

FIG. 32 illustrates a flow diagram for Natural Language Interface with the Knowledge Representation. FIG. 32 is an expansion and annotation of the Natural Language Interface of FIG. 1. Step (32a) Get Input Statement From User indicates the process of getting an input expression from the user. Such processes may include speech recognition or keyboard input or other appropriate means. In any case the result will be the presence of an ASCII string in an input buffer. The ASCII string is the expression that is processed by the subsequent steps of the NLI.

Step (32b) Scans the Input Expression to Token List. Scanning is a well known process which consists of converting the input expression into a list comprised of the words and punctuation present in the input expression. The token list is passed to the next step.

Step (32c) represents the Augmented Transition Network Parsing of the token list. The (32c) Augmented Transition Network Parsing of the token list results in the identification of the function of each token in the token list. The Functional identification is in terms of the system concept (e.g. library) in the descriptive network of the concept represented by the token in the Knowledge Representation database.

In standard Augmented Transition Network Parsing, the identification of the function of each token is in terms of the standard part of speech (e.g. noun, verb, adjective, etc.) It is this difference in the identification of the token which is a significant contribution of the invention to the state of the art.

Another significant feature in the (32c) Augmented Transition Network Parsing of the Token list, is that words or expression that are unknown to the Knowledge Representation are learned through interaction with the user to ascertain the definition of the expression.

Upon completion of the Augmented Transition Network Parsing of the Token list, each token has been associated with a functional indicator, and the overall functional pattern of the input expression has been identified. The patterns in the functional definition are then matched to known patterns within the Knowledge Representation. This matching of functional pattern to the network patterns of the Knowledge Representation database is accomplished through a pattern matching algorithm, known generically as parsing by differences.

Step (32d) Parsing by Differences is the procedure which matches the functional patterns to the network patterns of the Knowledge Representation database. The pattern matching during parsing by differences generally includes rearranging portions of the pattern to optimize the search paths required to respond to the input expression. Such optimization is recommended but is not required for the operation of the system. The optimizations will not be discussed in detail here. In step (32d), the parsing is based upon parsing of the patterns and functions identified in the Augmented Transition Network.

Step (32e) Evaluate Structure evaluates the expression as structured by the parsers. The evaluation is the action taken by the computer in response to the input expression. The evaluator must be programmed to evaluate the input structures recognized by the parsers.

Step (32f) Response may combined with step (32e) in many implementations. The response in general is an acknowledgement to the user that the input expression has been satisfied. The response may take the form of a report of action completed based on the expression, or may take the form of display of the answer to a query based on the action taken. The response can often be integrated with the program for evaluating the structure, however, in most cases, some type of a response will occur subsequent to the evaluation to indicate the completion of the evaluation. Step (32f) Response typically consists of derivation of a document of one of the plurality of views of the Knowledge Representation in order to show the user the results of a requested process, or the answer to a query. As such, Step (32f) often constitutes a transfer of control from the NLI module to related modules in the overall system. Step (32f) Response may include returning to the Natural Language Interface Step (32a). This return to Step (32a) is indicated in FIG. 32.

Figure 33:
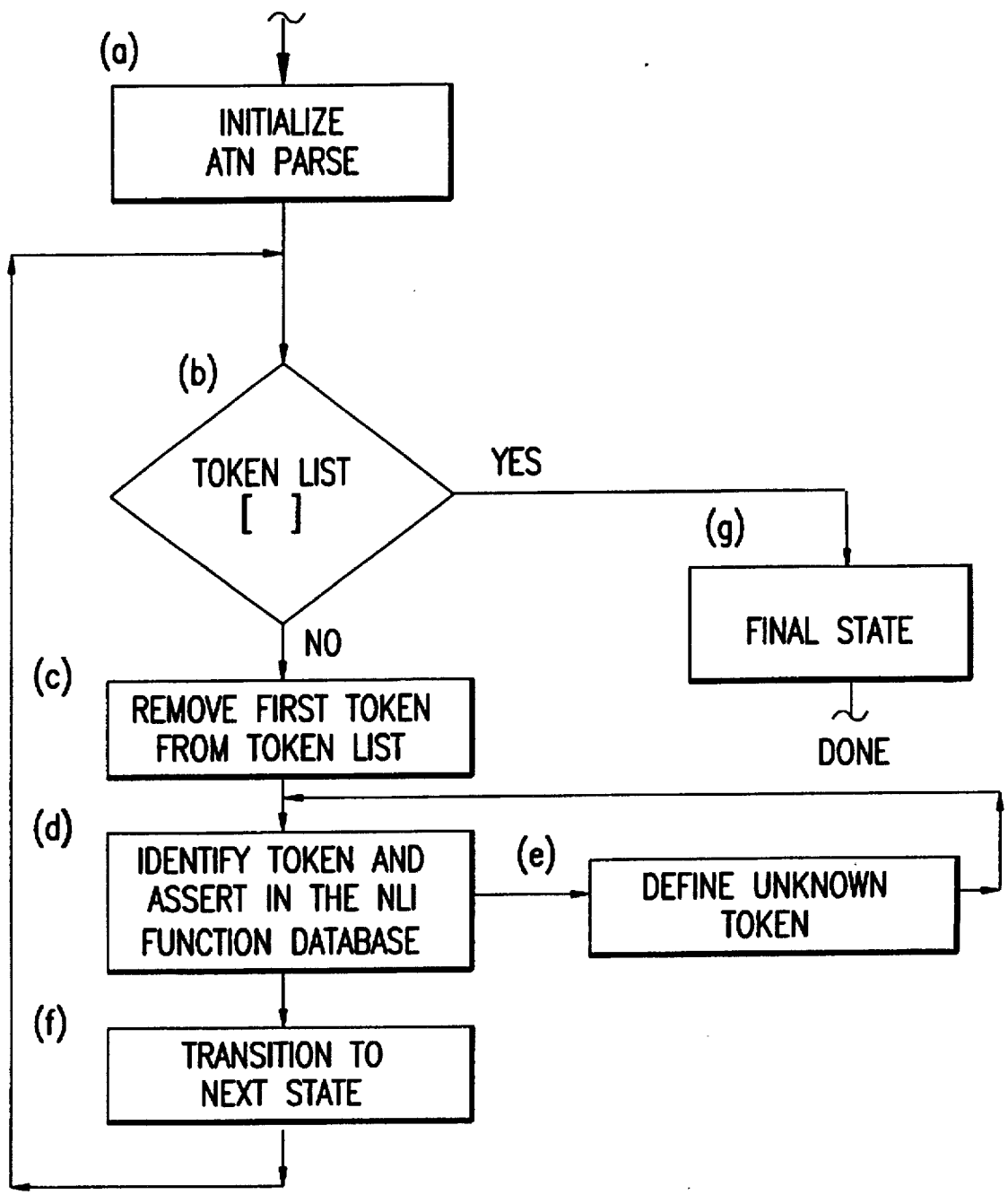
FIG. 33 is a Flow Diagram of Programmed Means for Augmented Transition Network Parse.

FIG. 33 illustrates a flow diagram of program means for the Augmented Transition Network Parse. The Augmented Transition Network Parse is comprised of a plurality of program means, whereby the token list resulting from the scan of the input structure is associated with the function of that token in the Knowledge Representation (e.g. Attribute, Component, Project, etc.) This is distinct from standard methods of Augmented Transition Network Parsing in that Augmented Transition Network Parses traditionally associate the input token with the part of speech represented by that token (e.g. nouns, adjectives, adverbs, noun phrases, etc.)

In order to accomplish the association of the function of the token with the token, it is necessary that the tokens be recognized as concepts within the Knowledge Representation and that the token be associated with the function of the concept in the Knowledge Representation. The concepts may be identified be creating supplemental libraries of concepts in the Knowledge Representation or, equivalently, through supplementary external files or indexes identifying the function.

The association is most easily achieved by means of suitably declared database domains wherein the function of the token, the token, and its corresponding record reference number (if it is a concept in the Knowledge Representation) may be stored. FIG. 34 illustrates a suitable database declaration for storing the associations it used in the Augmented Transition Network Parse.

FIG. 33 Step (33a) indicates the initialization of the ATN Parse. This is merely the implementation of various housekeeping functions in making sure that the database and relevant registers are initialized. Step (33b) checks to see if the input token list is empty. If the input token list is not empty, then Step (33c) calls for removing the first token from the token list. This is a simple list operation, that separates the token to be identified from the list. The reduced list is saved for further processing, and the token is passed forward. Step (33d) Identify the Token and Assert the Token with its Functional Identification in the NLI Function Database. The tokens are identified by programmed means for identifying the tokens in the index(es) of the Knowledge Representation database. Alternatively, the tokens may be identified by means of code containing the tokens or by means of supplementary files containing the tokens and/or synonyms thereof.

FIG. 35 provides a summary of suggestions for system concepts and associated user concepts to add to the Knowledge Representation database. These concepts will need to be added in order to assure that the variety of tokens present in a Natural Language expression are in fact recognized. In column A of FIG. 35, there is an indication of various categories of words that need to be accounted for in order to implement a functional system. This list is not intended to be exhaustive, but illustrates the type of supplement appropriate to the Knowledge Representation database in order to insure that a wide variety of input expressions can be interpreted. Column B of FIG. 35 provides examples of each of the libraries of concepts. Column C provides notes on how these concepts were implemented in the preferred embodiment.

All of the supplementary concepts can be implemented within a framework of appropriate library system concepts with associated classes of user concepts within the Knowledge Representation database. Many of the supplementary concepts can equivalently be implemented as specific identification of the words within the ATN Parse (as is the case with logical operators) or by means of supplementary files containing lists of words of that class (as is the case with words to ignore.) Any of these classes could be implemented by any of the three means. In the preferred embodiment, various classes have been implemented in each of the three ways to illustrate the flexibility of the invention, and the principles whereby such supplements to the Knowledge Representation may occur.

In FIG. 33 Step (33*d*) identifies the token and assert the token with its functional identification into the Natural Language Interface functional database. Unknown tokens will regularly be encountered in the process of evaluating an input expression. The meaning of such unknown concepts can generally be derived by the context of the tokens which have previously been identified.

Step (33*e*) Define Unknown Token allows for identification of an unknown token by means of the context provided by the input expression together with supplementary user dialogue as required to identify the token. Said means for defining the unknown token should include means for adding the concept designated by the token to the Knowledge Representation database (or supplementary file) so that the token is recognized in future transactions with the user.

In general, it is best to implement most of the libraries indicated in FIG. 35 within the Knowledge Representation database so unknown concepts may easily be categorized and added to the knowledge representation. Note that it is difficult to add system concepts to code, therefore only those concepts which are categorically knowable a priori should be implemented as system concepts (for example, the logical operators.) This means of identifying unknown tokens and dynamically adding them to the Knowledge Representation database are unique to this invention.

System operators provide means for linking programmed operational concepts to the Knowledge Representation. This makes these concepts easily available to support view definition.

There are two classes of system operators which are particularly useful to the invention: Logical Operators, and Relational Operators. These may be implemented in programmed code and may be represented by system concepts in the Knowledge Representation database. These System operators may be supplemented by additional operators useful to the designer in a particular knowledge domain.

Logical Operators provide the means for implementing logical queries on the Knowledge Representation. Logical Operators are the standard logic functions (i.e. AND, OR, NOT, NOR, NAND, etc.) as implemented for list processing. They are implemented to perform the logical operations on lists of reference numbers. This provides the basis for logical statements used in subsetting nodes and relationships in developing particular views of the data.

Relational Operators represent relational concepts in the Knowledge Representation. Relational Operators represent concepts typical of prepositions (i.e. in, through, containing, before, beyond, etc.).

Step (33*f*) provides for the Transition to the Next State. The transition is typical of standard state-transition procedures used in standard transition network analysis. The formulation of the state-transition rules is based upon the functional constructs of the Knowledge Representation, rather than the grammatical constructs of the NLI. This is the only significant difference in Step (33*f*) as required for this invention and standard techniques. The Step (33*f*) Transition to the Next State moves to Step (33*b*) to see if any tokens remain in the token list and, if so, the process is repeated for the next token.

Note that in Step (33*d*) in Identifying the Token and asserting the token in the NLI function database that many known expressions in the Knowledge Representation database will be comprised of a plurality of tokens. Upon recognition of a token as being the front token of an expression comprised of said plurality, additional tokens should be taken from the input token list to match the concept name in the Knowledge Representation database.

Figure 36:
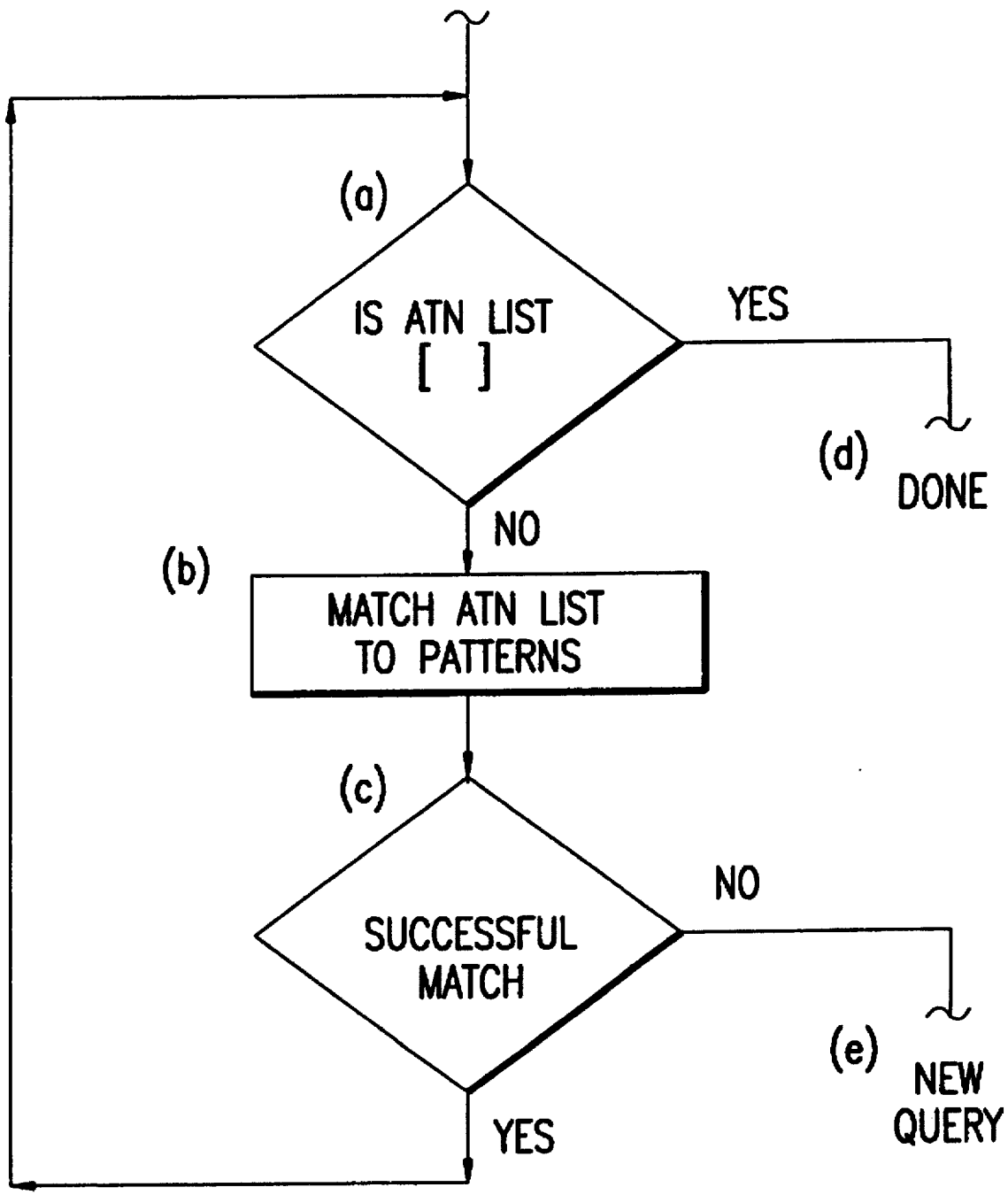
FIG. 36 is a Flow Diagram of Programmed Means for Parse by Differences.

FIG. 36 illustrates a flow diagram for Parsing by Differences. The Parse by Differences is illustrated in simple form since the essence of Parse by Differences is well understood.

Step (36*a*) looks to see if the inputted list from the Augmented Transition Network is nil. If it is nil, then the process is complete, and we are done at Step (33*d*). If the list is not nil, then the list is evaluated in the parse by differences procedure.

The patterns used to match the ATN list indicated in Step (36*b*) are comprised of a plurality of program functions embodying the mapping of the structure of the ATN into structures that will readily be executed in an evaluator. This plurality of program means embodying the patterns is typical and is the essence of a parsing by differences scheme. In effect, the parse by differences constitutes a transformation of the structure received from the ATN. This transformation should be designed to make the evaluation of the input expression as optimum as possible.

The patterns in the parse by differences correspond to patterns in the evaluator; thus, if a successful match is achieved in Step (36*b*) the eventual outcome of the parse would be assured to be interpretable. Step (36*c*) tests to see if a successful match was achieved in Step (36*b*). If a successful match was achieved, the process returns to Step (36*a*) to process the balance of the ATN list. If there was no successful match for the pattern matching of the ATN list, then Step (36*e*) the procedure fails and returns to the NLI for a new query.

Note that in Step (36*b*), that the pattern match proceeds by matching substructures within the ATN list. As these substructures are successfully matched to patterns defined in the differences parser, the elements of the ATN list which have been successfully matched are removed from the ATN list to form a new list. This new list is then passed forward for further evaluation.

(1*d*) MEANS FOR AUTOMATICALLY DERIVING A PLURALITY OF DOCUMENTS OF THE KNOWLEDGE REPRESENTATION

The (1*d*) module for Automatically Deriving a Plurality of documents of the Knowledge Representation provides the means for view management and derives a plurality of view documents from the information network in the Knowledge Representation database.

The automatic derivation of a document is accomplished by programmed means which embody three levels of abstraction of document characteristics.

A View is the highest level of abstraction which embodies identification of relevant classes, representation of connectivity, and ranges of meaning of icons in documents.

A Class abstracts the organization of icons within a document. The procedures embodying organization can be thought of as embodying a grammar for the document class.

A Type abstracts the icons used to represent concepts in a document and the principles whereby the concepts are selected for representation. These procedures for selecting and representing icons can be thought of an embodying a vocabulary for the document type.

FIG. 37 summarizes some examples of various views, classes, and types of documents which can be derived for the Knowledge Representation. FIG. 37 is intended to be illustrative only, and should not be interpreted as a restriction of the claims of the invention. Column (37a) summarizes some examples of views, Column (37b) summarizes examples of view classes, and Column (37c) summarizes examples of document types for each class. Each of the columns in principle comprise an unbounded set of possible views, classes, and types.

A specific document derived from the Knowledge Representation database is sent to the desired output device (display screen, printer, disk, etc.).

View Management

The view management enables the selection of the view, class, and type of document desired. It generally enables the coordination and selection of a document from the information available in the Knowledge Representation database.

Figure 38:
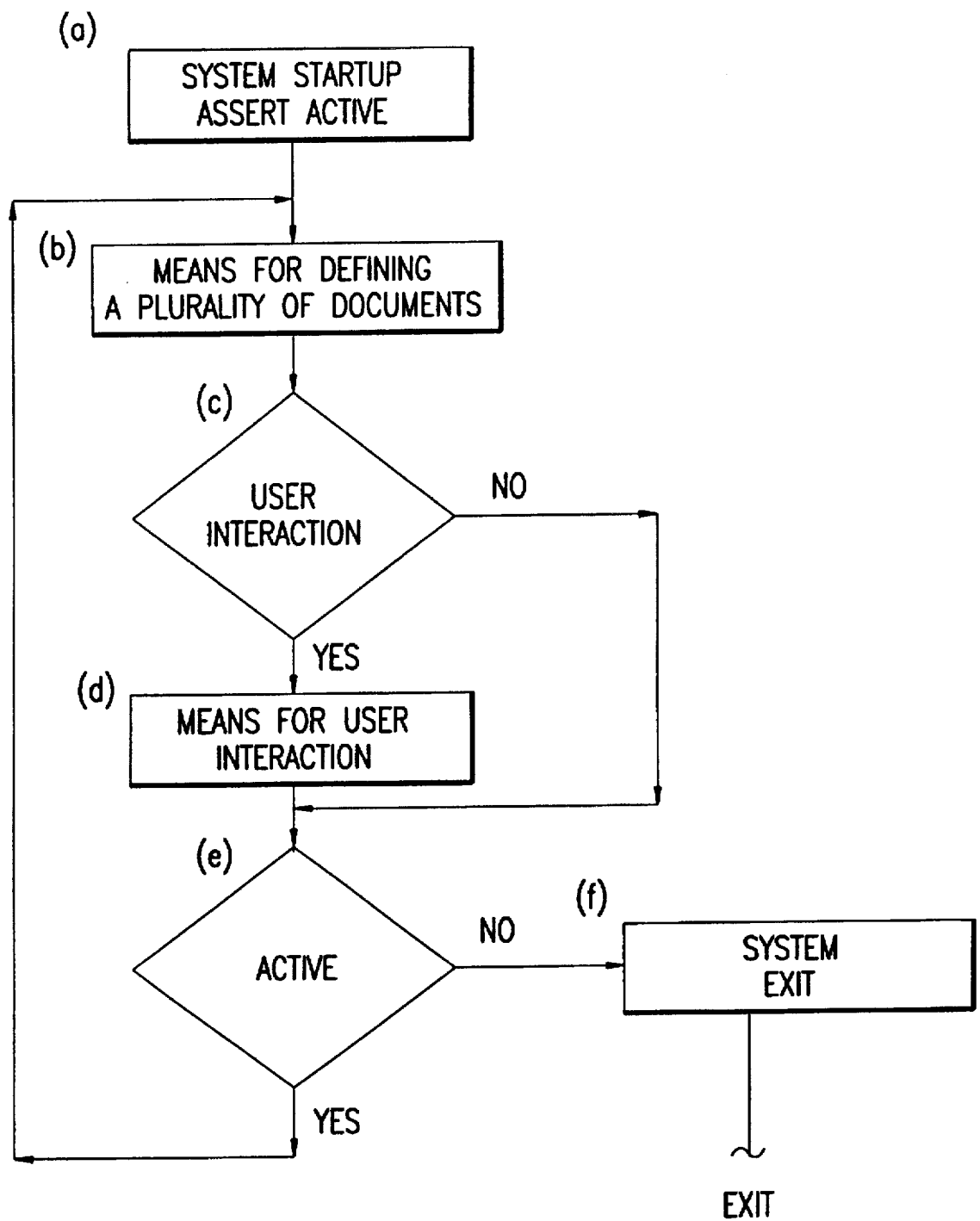
FIG. 38 is a Flow Diagram of Programmed Means for View Management.

FIG. 38 illustrates a flow diagram of programmed means for view management. The major features are that it shows the coordination of Step (38b) the means for deriving plurality of view documents with Step (38d) the means for enabling user interaction with the Knowledge Representation through view documents.

This coordination is facilitated by a system flag herein called 'Active' which, in the preferred embodiment, is established by means of a database declaration similar to that shown in FIG. 39. The declaration of the Active is comprised of at least four key features.

Item (39a), stores a statement of the view which is to be derived. This can be accomplished by means of establishing system concepts corresponding to each view and recording the reference number as the view in the Active, or by directly using the names of the various views. The view will indicate the view, view class, and the specific type of document desired.

Item (39b), stores the record reference number of a specific concept for which the view document is to be developed. All view documents are developed or derived from the Knowledge Representation with respect to a single active concept.

Item (39c) stores the database of the active concept. This is required in systems where multiple databases are used in that it is not possible to distinguish the reference number of the active without designating which database it came from. The database may be a symbol or may be a string containing the database file name, or it may be a system reference number wherein system concepts are established for each of the database files in every database file comprising the system.

Item (39d) stores the reference number of the characterization. This is used in later processing within the view to indicate which of the relationships are current in the display, wherein current means which of the relationships are currently highlighted or are near the current cursor position.

The specific order of the items comprising the declaration of the active as indicated in FIG. 39 is arbitrary. Note also that the system flags comprising the declaration of active can be implemented in a variety of means other than database declaration, however, the system flags identifying these four items must be present in order to manage the views.

In Step (38a) we indicate the system start-up. In general, the view management function will be the initial entry point at start-up of the system. This start-up should include the assertion of an initial active. Which view and which active is initially asserted is up to the designer. In the preferred embodiment, the system is started up using a text based tree diagram of the taxonomical relationships using the root library concept as the active, in the environment database, with a nil characterization. Other appropriate selections can be made. However, an active must be asserted in order for the process to proceed. Step (38b) indicates the means for defining a plurality of documents. These means include the means for using the active to determine which view, class, and type of document is requested, and for deriving the requested class of document relative to the active concept. The explanation of this Step is expanded and detailed in subsequent discussion.

If, in Step (38c), no user interaction is required, then the Step (38d) means for user interaction are bypassed. If user interaction is requested, then Step (38d) the means for user interaction are invoked.

The means for user interaction correspond to (1e) and are discussed in detail subsequently. The means for user interaction include means for retracting the active upon completion of the interaction. Some of the means for interaction will include the ability to select additional views. Such additional selection will result in the assertion of an additional active onto the stack. Upon completion of either Steps (38c) or (38d) the program proceeds to evaluate whether there are any remaining actives available on the stack.

Step (38e) indicates the test of whether additional actives have been set for the system. If so, the process cycles back to Step (38b) to derive a view document by means embodied in the plurality of views. If there is no active left in the stack, then Step (38f) indicates a system exit. The system exit typically will include an interaction with the user to verify that exit is desired, and to allow options for backing-up files or re-entering the system. A variety of system exit procedures will readily occur to the skilled practitioner.

(40b) Defining a Plurality of Documents

Figure 40:
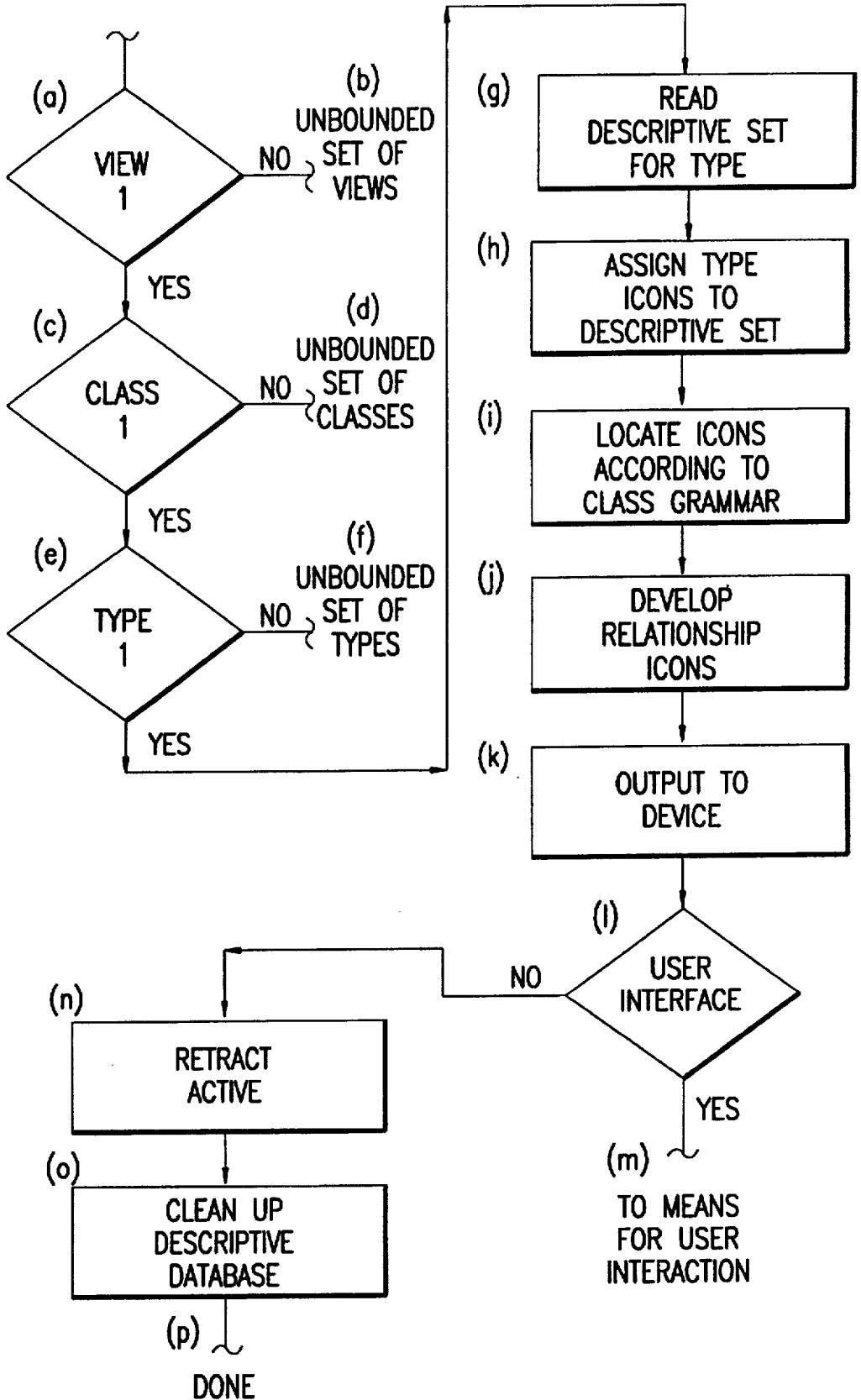
FIG. 40 is a Flow Diagram of Programmed Means for Deriving a Plurality of Documents of the Knowledge Representation.

FIG. 40 illustrates a flow diagram for deriving a plurality of documents from the Knowledge Representation. This flow diagram is a generalized abstraction that applies to all views. Subsequent discussion will illustrate specific application of these general principles in developing the plurality of views. The flow diagrams and the principles disclosed in the following paragraphs will enable a skilled practitioner to derive a plurality of views, and extend the principles herein illustrated to encompass any class of document that is traditionally used within the knowledge professions, such as engineering, law, business, etc.

Step (40a) is a test to determine which views are supported by the program. This typically takes the form of a series of tests wherein the program checks to see if view 1 is wanted, if not, it looks to view 2, and so forth. Step (40*b*) indicates that an unbounded set of additional views may be defined by the system implementer. Within each view, there are a plurality of classes. Step (40*c*) checks to see which class is desired. Step (40*d*) transfers the test to the unbounded set of class definitions comprising the view.

Each class is comprised of a plurality of types. Step (40*e*) checks to see which type of document is to be developed, and Step (40*f*) indicates that the plurality of type is comprised of an unbounded set for each class. Subsequent discussion will show typical expansions of Steps (40*b*), (40*d*), and (40*f*) together with typical means for testing as indicated in Steps (40*a*), (40*c*), and (40*e*.)

All documents of the Knowledge Representation are derived with respect to an active concept. The active concept must be one of the concepts within the network of the descriptive relationships that are the basis of the view. This property makes it fairly easy to implement programmed means for determining which views may be applicable to a given concept. This enables the system designer to implement code which will prompt the user of the available views for any desired concept. This provides much easier user interaction in that Steps (40*a*), (40*c*), and (40*e*) may be reduced to user selection of a valid view, class, and type for said Active concept.

Having successfully identified the view, class, and type of document that is to be derived for the Knowledge Representation, the subsequent typical steps occur in deriving the view. Steps (40*g*) through (40*l*) are typical of specific means which must be established for view, class, and type of document.

Step (40*g*) is a process of reading a descriptive set for the type. The descriptive set is comprised of a plurality of concepts read into the descriptive database. The concepts are read into the descriptive database by means of the read functions of the Knowledge Representation. Subsequent discussion of procedures for reading a descriptive set will occur hereafter. The descriptive set is read by reading the Defining and Auxiliary relationships for the active concept. Each type of document will have specific defining and auxiliary relationships.

Step (40*h*) assigns appropriate icons to the descriptive set. The type of document being derived defines which icons are appropriate. The icons are the symbols for the concepts in the descriptive set. These symbols can be thought of as the vocabulary of the language in which the view will be expressed, wherein 'vocabulary' is considered in its broadest sense, including, but not limited to texts, graphics, sound, mathematical equations.

The association of an icon with a concept occurs either in the Descriptive database, or in a supplementary database. If the association occurs in the Descriptive database, then suitable domains must be declared to contain the information required for the definition of the appropriate icons. Such supplemental structures are included in the domains declaration of the Descriptive database in the preferred embodiment of the appendix. These will serve as examples and illustrations which can be adapted to accommodate the plurality of views which may be desired by the system designer.

The implementation of the association of the icons with the concepts as a separate database requires the declaration of suitable domains in that database. In effect, said implementation merely isolates the domains augmentation required for the descriptive database into a separate database.

The Descriptive database typically includes the association of every concept with all of the relationships within the descriptive network which apply to said concept. In general, a particular view document will not express all of the relationships of the actives in the working set of the descriptive database. Typically, a view document will include a single icon for the concept with one or more icons developed to illustrate specific relationships between the working concepts. Since this is the case, the icon is generally stored in a separate structure in the descriptive database from the structures which store the relationships. This icon is then associated with the active by including the reference number and the database of the concept illustrated by the icon.

In some views every relationship is in fact expressed within the view. In such cases, the icon may be associated with each relationship or embodied within the relationship record in the descriptive database. The association of the relationship with the icon will need to include the active reference number, the database, and the reference number of the characterization for which the icon is developed. In these cases, the icon is typically some expression of the value. Both means of associating icons with the descriptive database are included in the preferred embodiment of the invention.

Step (40*i*) provides programmed means to locate the icons within the document according to the class grammar. The location of the icons is per the standards and placement typical of the class. The grammar governing the placement and the relationship of icons in a document is comprised of the rules whereby the location of the icons within the display space are established and the rules or procedures whereby relationships between concepts are illustrated within the display space.

The procedures for location are a function of the class, whereas Step (40*j*) the Development of the Relationship Icons, is a function of the view. In Step (40*j*) the relationship icons are developed to illustrate the connection and interrelationship of the concepts described in the derived document. Upon completion of Steps (40*g*)–(40*j*), the resulting information can be output to an appropriate device.

In Step (40*k*) we indicate the output of the document to an appropriate device. Devices may include external files, monitors, plotters, printers, or any suitable device for output. It is often desirable to output a particular view into a file format adapted to the requirements of some other program. For example, a drawing could be output as a DXF file for use in various CADD programs. Such output is easily accomplished by writing the suitable translator for the output.

Certain output devices facilitate user interaction. Output to a CRT or other type of video display terminal can facilitate human interaction with the Knowledge Representation through the view document.

Step (40*l*) tests to see if user interaction was requested. If so, the process continues with Step (40*n*), which is the programmed means for user interaction, discussed subsequently. If no user interaction is requested, then Step (40*m*) the process of deriving the view document is complete.

Step (40*n*) indicates the retraction of the active. This removes the active that was the basis for the derivation and subsequent output of a document in preparation of the next activity.

Step (40*o*) provides for the cleanup of the Descriptive database. This is essentially a system reset, to clear the descriptive database and view associated databases in order to initialize all relevant databases, counters, and associated system parameters in preparation of the next view document.

Step (40p) indicates the completion of programmed means for deriving a plurality of views of the Knowledge Representation.

Steps (40a)–(40f) comprise the means for determining the specific type of document to be developed. Steps (40g)–(40j) can be seen as the steps for view derivation which must be embodied for each view, class, and type of document. Steps (40k)–(40p) can be seen as the output and view control procedures. Note that particularly Steps (40n)–(40p) are an embodiment of view management steps corresponding to Step (38f). These view management steps are typically embodied immediately following Step (40k) the output to the device.

Document Type Selection

The view derivation, Steps (40g)–(40j), must be developed to accommodate the plurality of views that will be developed for the Knowledge Representation. The development of each of these steps is a function of the view, the class, or the type of document. FIG. 41 summarizes the correlation between the view derivation step and the level of abstraction. Column (41a) summarizes the view derivation steps for Steps (40g)–(40j) of FIG. 40, while Column (41b) summarizes the level of abstraction in terms of the view, the class, and the type.

Note that Steps (40g) Read Descriptive Set for Type and (40h) Assign Type Icons to Descriptive Set are a function of the type of document. Step (40i) Locate Icons According to Class Grammar is a function of the class of the document. Step (40j) Develop the Relationship Icons is a function of the view of the document.

Figure 42:
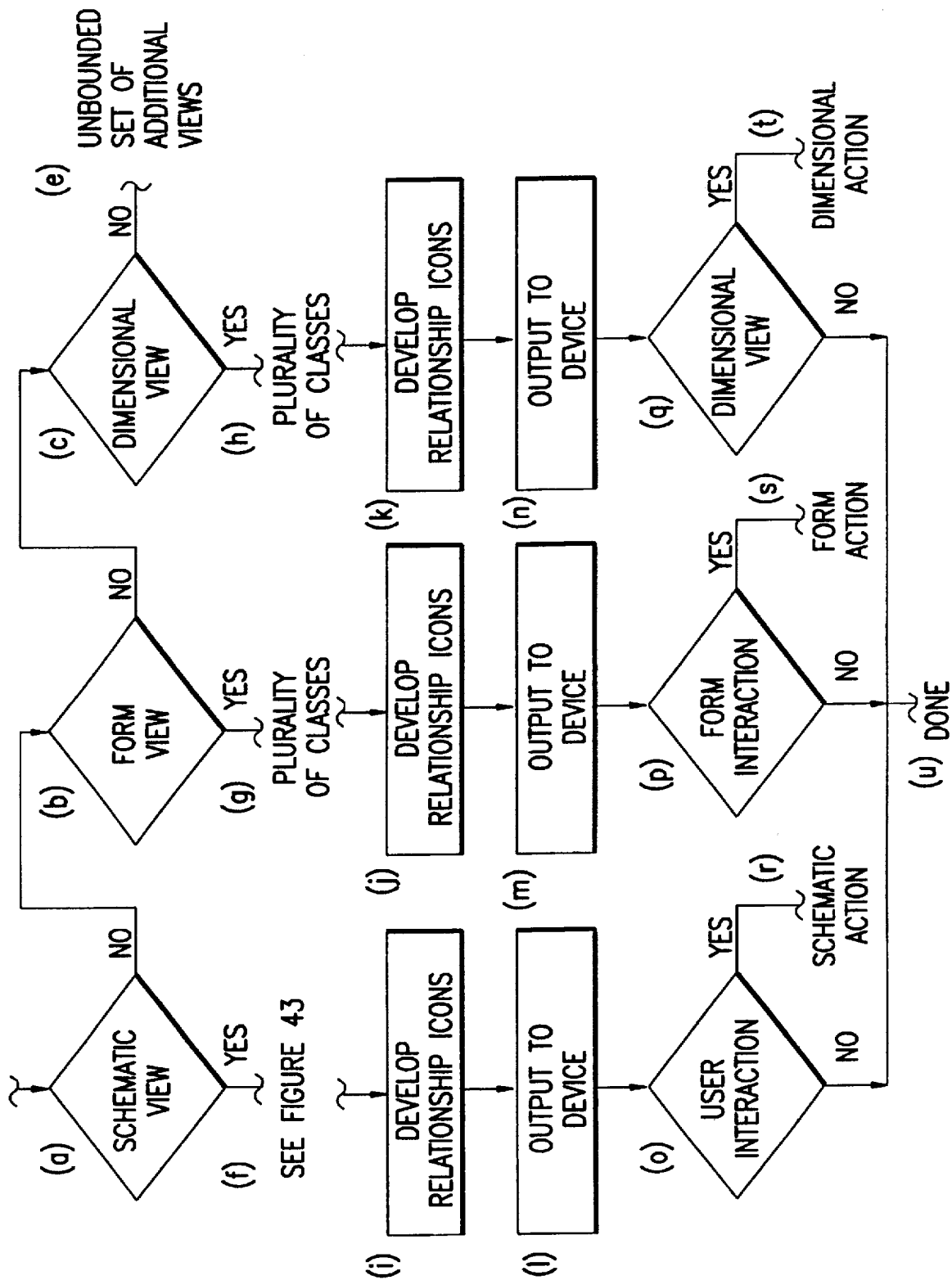
FIG. 42 is a Flow Diagram of Programmed Means For Deriving A Plurality of Views of the Knowledge Representation.

FIG. 42 illustrates a flow diagram of programmed means for deriving a plurality of views in the Knowledge Representation wherein Steps (42a) through (42e) constitute testing to determine which view is required. FIG. 42 is an expansion of FIG. 40 wherein Step (40b) is expanded to include three of the specific views identified in FIG. 37 and an indication of the unbounded extension that is possible to said views.

Figure 43:
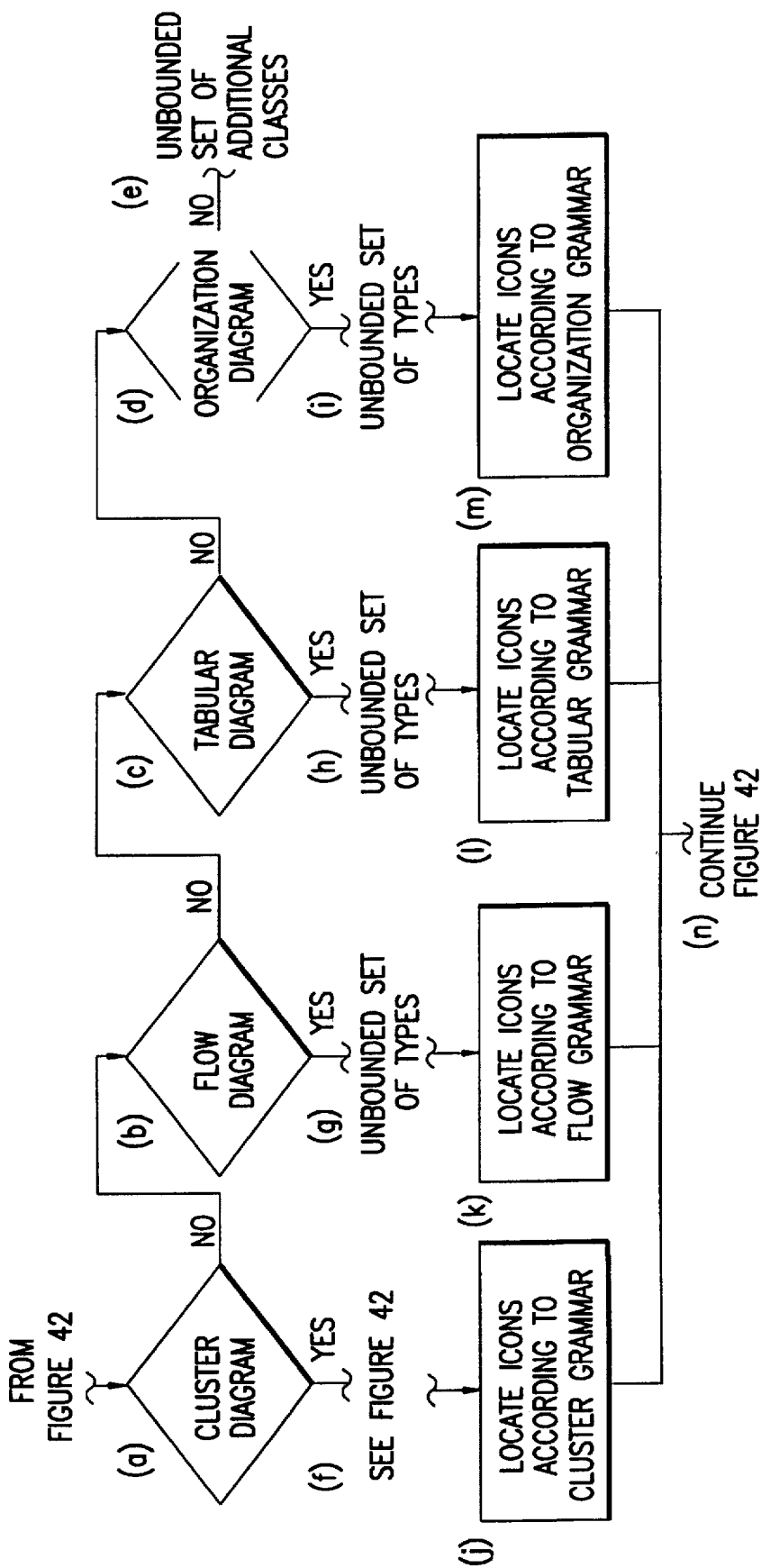
FIG. 43 is a Flow Diagram of Programmed Means For Deriving a Plurality of Schematic Classes of the Knowledge Representation.

Step (42d) the Schematic View is a view comprised of classes of schematic illustrations. FIG. 43 contains an illustration of the program flow for implementing the plurality of classes for the schematic view.

Step (42a) the Tree View, in some senses, is not a distinct view, in that a tree view is essentially a schematic view of the tree class of a type that shows either a taxonomical or the hierarchical relationships. However, for the purposes of this discussion and the preferred embodiment, Tree View is considered to be a separate view in that it is used only for the fundamental relationships of taxonomy and hierarchy, and thus enables user interaction with the Knowledge Representation. Because Tree view is particularly useful to the operation of the system and is used extensively in any user interaction with the Knowledge Representation, many optimizations to the basic flow outlined in FIG. 40 have been accomplished within Tree View. For example Step (42f) Getting the Tree has combined Steps (40g) and (40h) into a single operation wherein the children lists in the concept records of the Knowledge Representation database are used to assemble the tree description. The names of the concepts in the Knowledge Representation database constitute the icons expressed in the view.

Steps (42a) through (42e) illustrate some of the views that are given as examples in FIG. 37 Column (37a).

The flow for Step (42a) Schematic View indicates that Step (42i) Developing the Relationship Icons and Step (42j) Output to Device and Step (42l) Test for User Interaction are common to all classes of Schematic view. This is a way in which that commonality may be implemented, by having all class derivations return to the standard procedures as indicated in Steps (42i), (42j), and (42l).

These steps correspond to Steps (38j), (38k), and (38l) of FIG. 38. These steps must be implemented with respect to each view. Step (42f) refers to FIG. 44 which is an elaboration of the means whereby the classes of the schematic view are implemented and corresponds to Steps (40c) and (40i). In principle, an unbounded set of classes may be implemented for each view. Steps (43a) through (43d) illustrate some of the classes of the schematic diagram view that are given as examples in FIG. 37 Column (37b). Again, as indicated in Step (43e), the classes comprise an unbounded set which may be implemented to meet the system developer's objectives for the system. Steps (43j) through (43m) indicate that the location of the icons is according to the grammar of the view. This principle was discussed earlier. This illustrates that the plurality of types that may be developed for each class will all return for the location of the icons according to the standard grammar for that class. Each of Steps (43f) through (43i) indicate that an unbounded set of types may be implemented for each class.

Figure 44:
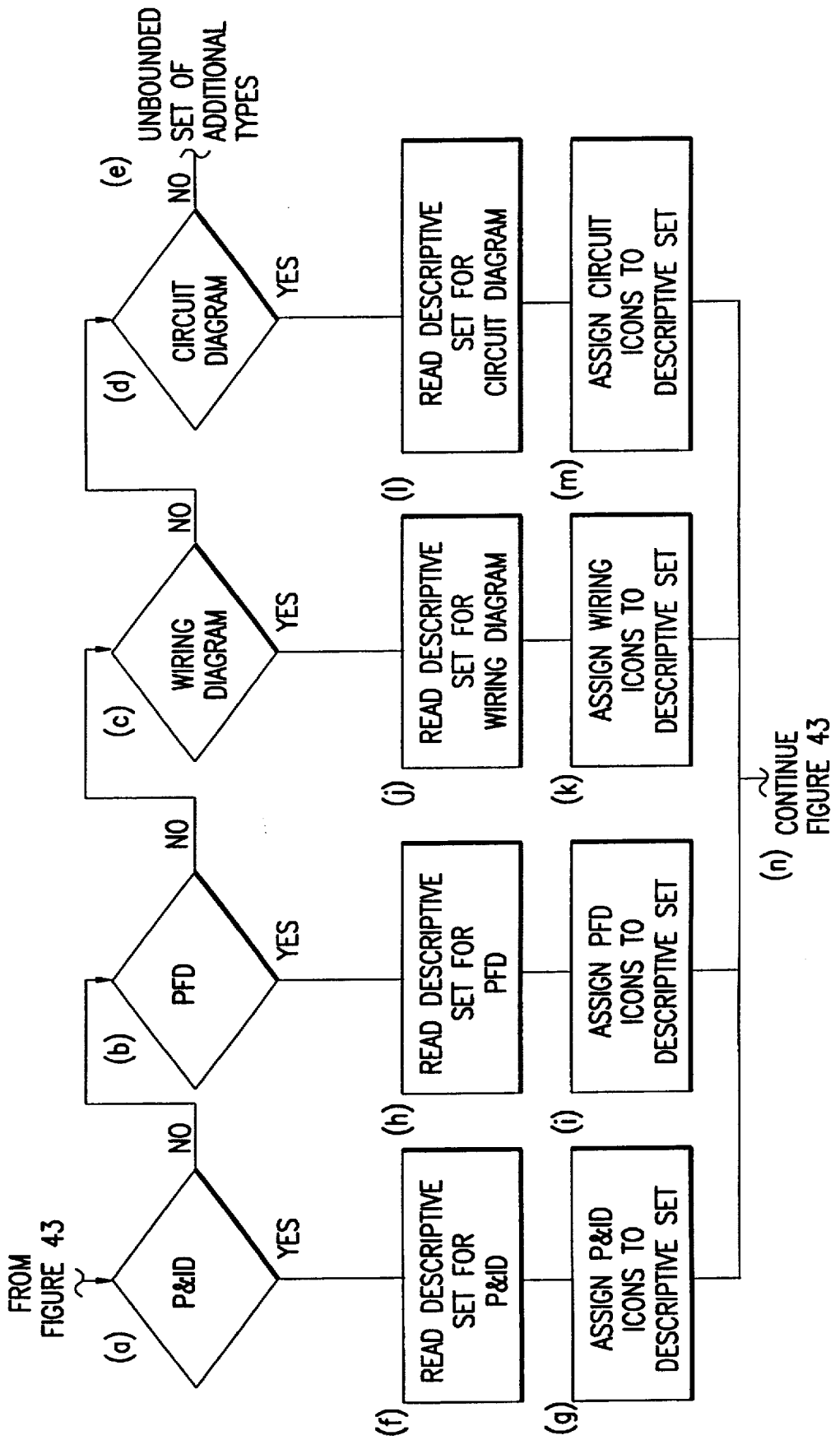
FIG. 44 is a Flow Diagram of Programmed Means For Deriving a Plurality of Types of Schematic Cluster Diagrams of the knowledge Representation.

Step (43f) refers to FIG. 44 which is a flow diagram of programmed means for deriving a plurality of schematic cluster diagram types of the Knowledge Representation and corresponds to Steps (40e), (40g), and (40h). Again Step (44e) indicates that an unbounded set of additional types may be developed for each class of drawings. The types of documents illustrated in Steps (44a) through (44d) correspond to those in the examples of FIG. 37, Column (37c), for the schematic cluster diagram. The figure emphasizes that in Steps (44f) and (44g), we have the correspondence of development of Steps (40g) and (40h) for the specific type of document being developed. Similarly, Step (44h) and (44i) for the Process Flow Diagrams (PFD), Steps (44j) and (44k) for the Wiring diagram, and Steps (44l) and (44m) for the Circuit diagram correspond to Steps (40g) and (40h).

(42g) Read Descriptive Set for Type

Figure 45:
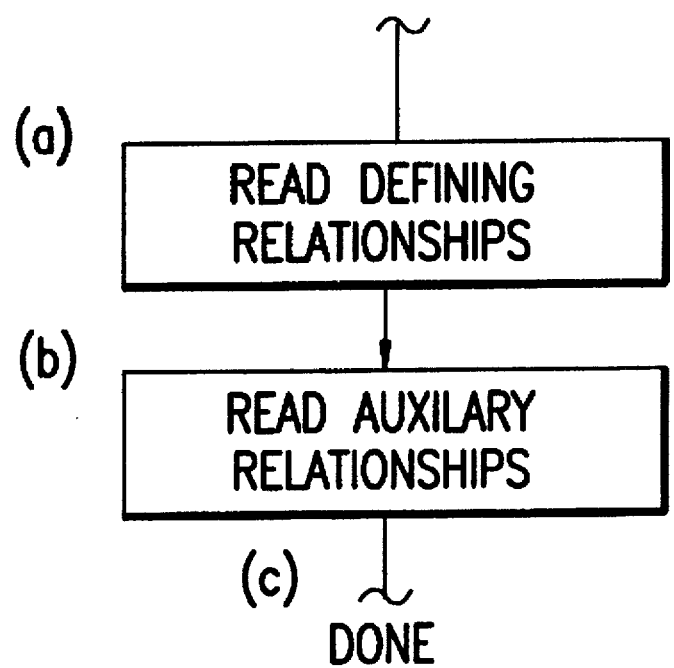
FIG. 45 is a Flow Diagram of Programmed Means For Reading Descriptive Sets.

FIG. 45 illustrates a flow diagram for reading descriptive sets. This is an expansion of Step (40g) and illustrates that reading the descriptive set is comprised of two main processes: reading the defining relationships, and reading the auxiliary relationships. Defining relationships are the relationships which the document is designed to illustrate. The defining relationships will form a network of concepts essential to the document. There are a variety of auxiliary relationships which are expressed for each of said concepts. These auxiliary relationships are relationships of the concepts in the network of the defining relationships to concepts not comprising said network. Such auxiliary relationships are typically read to only one or two levels removed from the concept in the network of the defining relationship.

Step (45a) reads the defining relationships for the type of document being developed. Step (45b) reads the auxiliary relationships for the type of document being developed. Upon completion of reading both the defining relationships and the auxiliary relationships, the process of reading a descriptive set is complete. In each case the reading makes use of the network operations of the primary Knowledge Representation in order to read a description of particular concepts into the descriptive database.

The principle of reading is that documents are fundamentally based on the display of relationships in a set of related concepts. One of the reasons that a plurality of documents has been developed to embody knowledge is that the human mind and the available means of knowledge conveyance are inadequate to the representation of many relationships between the concepts. Because of this, each document has a small characteristic set of relationships that the document is developed to explicate. The relationships explicated in the document are herein called the defining relationships of that document type.

In order to facilitate clarity, most documents are based on a single defining relationship. More complex documents may be based on a plurality of defining relationships. In our experience, there are very few types of documents in which more than a single defining relationship is expressed.

FIG. 46 provides examples of defining and auxiliary relationships for various types of documents. The examples of FIG. 46 are based on a selection of the documents identified as examples in FIG. 37. Column (46a) identifies the type, Column (46b) identifies the defining relationships characteristic of the corresponding type, Column (46c) identifies the depth to which the defining relationships are read, Column (46d) identifies the auxiliary relationships characteristic of the corresponding type, and Column (46e) identifies the depth to which the auxiliary relationships are read.

The idea of depth as identified in Columns (46c) and (46e) is that of chaining through the relationships. For example, if concept A refers to concept B in a relationship, you would read concept A, identify the relationship, and read concept B. Reading concept B would constitute one step. If concept B, in turn, has a relationship with concept C, and concept C is read, that constitutes two steps. If concept C has a relationship with concept D, and concept D is read, that constitutes three steps, and so forth. In each case, the relationship must have characterizations of the same attribute class.

Figure 47:
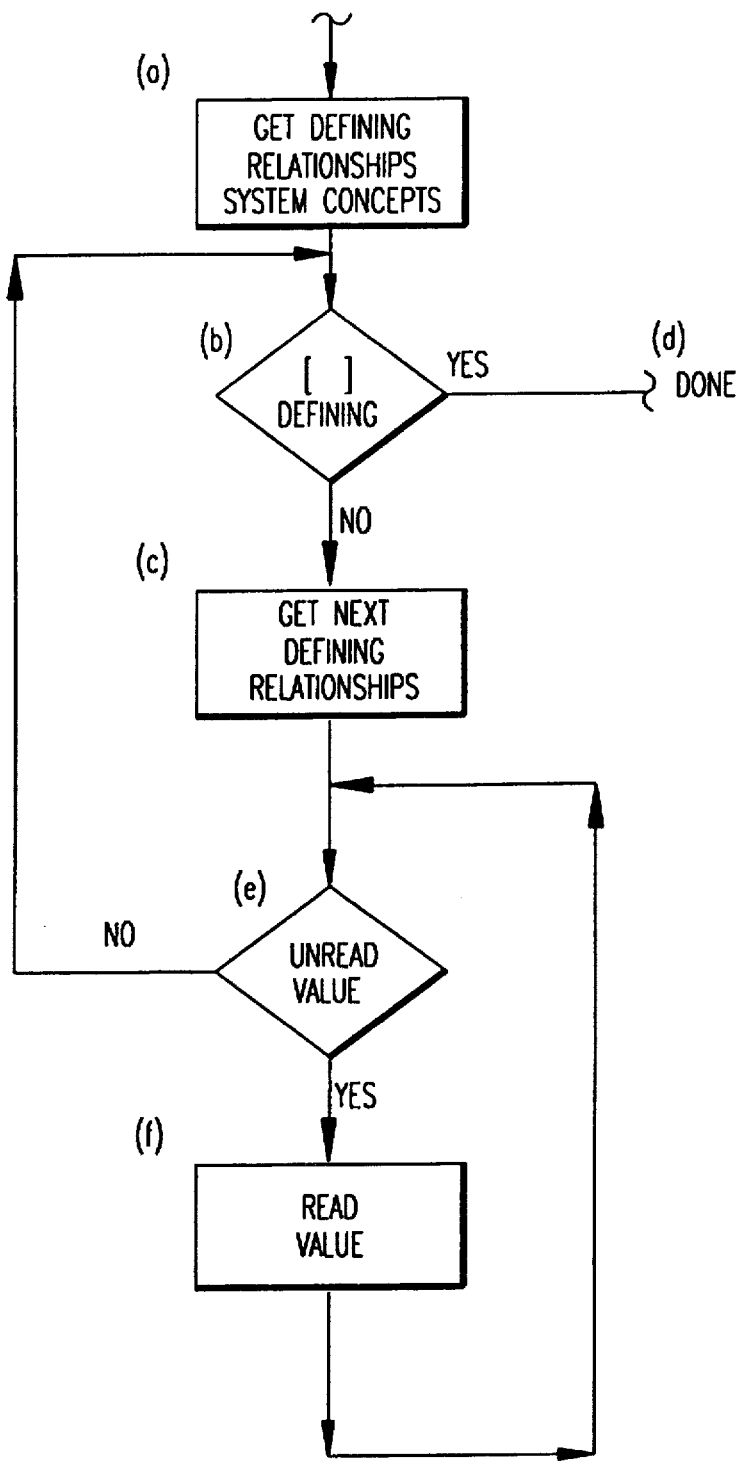
FIG. 47 is a Flow Diagram of Programmed Means For Reading Defining Relationships.
Figure 48:
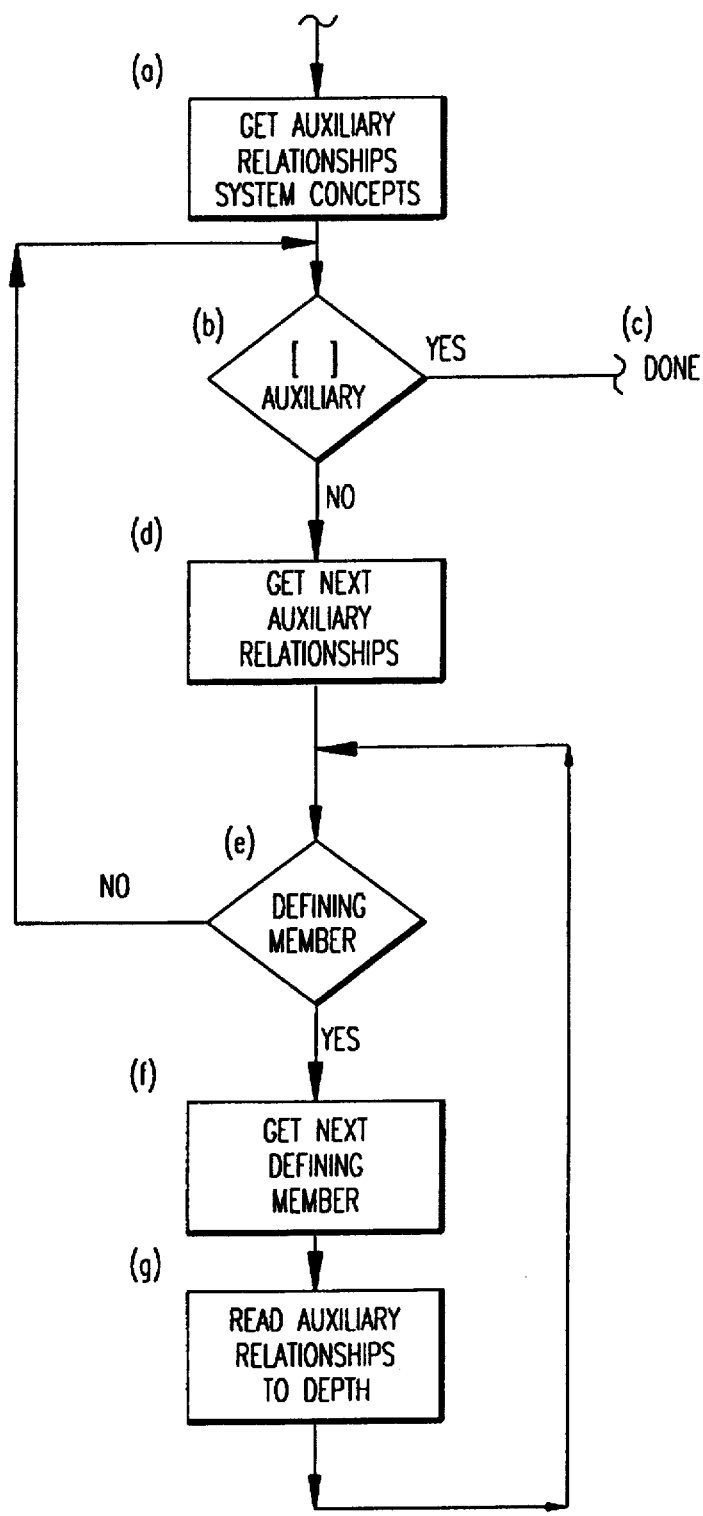
FIG. 48 is a Flow Diagram of Programmed Means For Reading Auxiliary Relationships.

Noted in FIG. 46, that most defining relationships are characterized by a single attribute class. This however, is not necessary, in that a plurality of classes may constitute the set of defining relationships. FIG. 47 and FIG. 48 illustrate a specific implementation suitable for Steps (45a) and (45b), respectively. FIG. 47 illustrates a flow diagram for reading defining relationships. Step (47a) gets the defining relationships in terms of the reference numbers of the system concepts identifying the attribute classes that will characterize the relationships. This means for example, that if the defining relationship in a wiring diagram is a wire connection, then under the connections class of attributes, there should be a concept of wire as a system concept. The reference number of wire would be the defining relationship system concept. Attribute class concepts, such as wires, are not used as characterizations of relationship. They are, however, the class concept of a plurality of user concepts. These user concepts are in fact used in the characterization of relationship.

Step (47b) checks to see if the set of defining relationship system concepts is nil. If it is, then Step (47d) the process of reading the defining relationships is complete. If Step (47b) is not nil, then Step (47c) we get the next defining relationship system concept (or attribute class system concept) and identify all user concepts constituting said attribute class.

Step (47e) checks the Descriptive database to determine if there are any relationships characterized by one of the user concepts for the attribute class that we are currently testing for which there is a relationship with a concept which is not a member of the descriptive database. If there is a concept referred to in a relationship characterized as one of the defining relationship, then we need to read the value, by reading the concept indicated in that value, into the descriptive database, at which point we recycle and continue with Step (47e) until all values for the descriptive relationships have a corresponding concept in the descriptive database.

Upon completion of Step (47e), we return to Step (47b) to determine if there any additional defining relationships defined for this type of document. If there are no more relationships in the list of references for the attribute classes characterizing the defining relationships, then the process is complete.

Note that Step (47f) may instantiate controls to assure that the defining relationships are only read to a specified depth. Note further that if additional values are read in Step (47f) then the relationships maintained by the concept read in Step (47f) should also be read for each of the defining relationships.

FIG. 48 illustrates a flow diagram for the programmed means for reading the auxiliary relationships. Step (48a) gets the auxiliary relationship system concepts in much the same manner as was explained in Step (a) of FIG. 47.

Step (48b) checks to see if the list of auxiliary relationships is nil. If it is, then Step (48c) the process of reading the auxiliary relationships is completed. If it is not nil, then Step (48d) gets the next relationship, which is an attribute class concept and gets all of the user concepts of that class which will characterize the auxiliary relationships.

Step (48e) checks the descriptive database to determine if there is a defining member which has an auxiliary relationship or relationship characterized by one of the attributes of the auxiliary relationship, which is connected to a concept which is not yet present in the descriptive database. If so Step (48f) gets that defining member and Step (48g) reads the auxiliary relationships for that defining member to the depths specified for the auxiliary relationship. This process is repeated until all defining members have had all auxiliary relationships read to the specified depth, at which point the process resumes with Step (48b).

Step (48b) then checks to see if there are any additional auxiliary relationships, and if so performs Steps (48d)–(48g) as appropriate for said additional auxiliary relationships. The cycle terminates when the list of auxiliary relationships has been exhausted, at which point Step (48c) the process is complete.

(42h) Assign Type Icons to Descriptive Set

Step (40h) assigns an icon to descriptive set based on the type of document being developed. The means for assigning the icon expanded and illustrated in FIG. 49.

Figure 49:
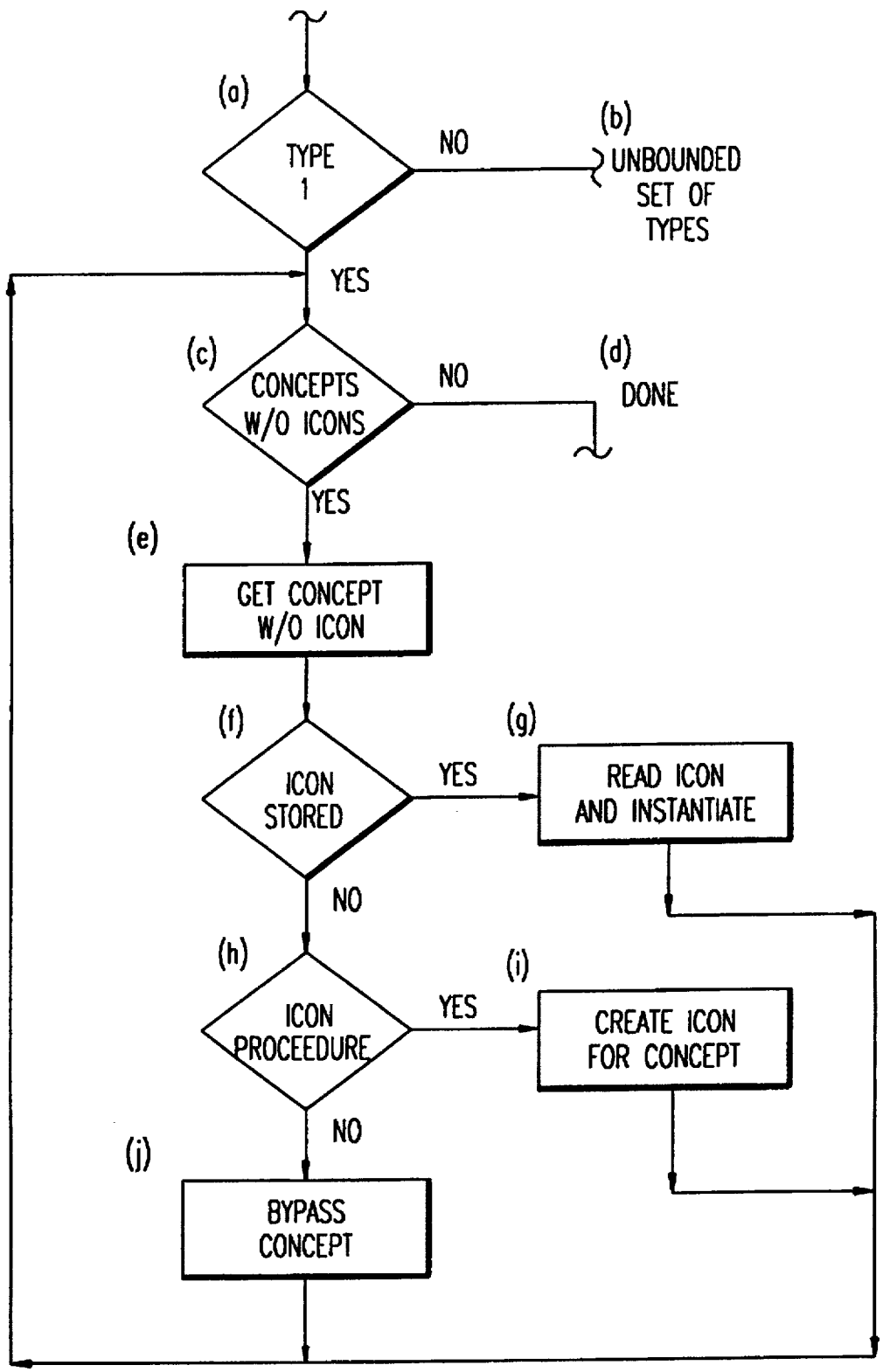
FIG. 49 is a Flow Diagram of Programmed Means For Assigning Icons to a Descriptive Set.

FIG. 49 illustrates a flow diagram for assigning icons to a descriptive set. Such procedures must be implemented for each type of document supported by the system. There are two primary methods whereby an icon may be associated with the concept: stored icons, and programmed procedures. Most implementations of the programmed procedures for assigning icons to a descriptive database will have a combination of stored icons and programmed procedures.

An icon may be explicitly defined and stored as a concept in the Knowledge Representation. This storing icons typically requires the declaration of additional specialized database domains within the relationship list to accommodate the data types required for icon definition.

A second method whereby an icon may be defined is by programmed procedures for developing the icons. Many types of views have characteristic icons whereby they represent the concepts displayed within the document. Such characteristics may be embodied in programmed procedures whereby the icon may be developed.

In FIG. 49, Step (49a) is to identify the type of document which is being developed for the class. Step (49b) indicates that a plurality of types may be defined for each class. Step (49c) identifies a concept in the descriptive database without an icon. If there are no concepts in the descriptive database without associated icons, then Step (49d) the procedure is completed. If there are concepts without icons associated, then Step (49e) would get the concept reference number with which no icon has yet been associated.

Step (49f) tests to see if an icon has been stored for the concept without an icon. If an icon has been stored, it will be indicated as the value in a relationship. System concepts should be implemented for each type of document to characterize the relationship of the concept with its icon. This system concept identifying the characterizing of the relationship with the stored icon will identify the icon. If in Step (49f), an icon is identified as being stored, then Step (49g) reads the icon and initializes the values of the icon with the values of the concept.

Step (49h) test to see if the icon is defined as a procedure. This test is generally comprised of an examination of the types of relationships maintained by the icon to determine if the types of relationships fit any of the predetermined patterns, whereby concepts suitable for procedural development of an icon may be identified. If an icon procedure is available for the concept, then Step (49i) will create the icon for the concept according to the programmed means of said procedure. If no icon procedure is available for the concept, then Step (49j) will bypass the concept. Bypassing the concept means that the concept will not appear in the document. Since no appropriate vocabulary is available for the concept to be expressed in the document, it simply will not appear. In general, the bypassing includes reforming the relationships of the concept so that temporary relationships are established in the descriptive database which makes it appear as if concepts related to each other via the bypassed concept were directly related to each other.

The outcome of Steps (49g), (49i), and (49j) is that the concepts without an icon will now have an icon in the Descriptive database, or will be bypassed. Each of these steps returns to Step (49c) to determine if any additional concepts are present in the descriptive database for which no icon is yet present.

Notes on Implementation

Three types of documents are included which are particularly useful in concept editing and in establishing the fundamental relationships and user relationships of the Knowledge Representation Database. They are called "TREEVIEW", "FORMVIEW", and "DRAFTVIEW". Note that these views are not views in the formal sense of 'view' as defined herein.

Tree View displays the fundamental relationships between the concepts in the Knowledge Representation. Together with the user interaction with the Knowledge Representation through the tree view, the Tree View enables a user to create new concepts in the Knowledge Representation database and establish and edit fundamental relationships between the concepts in the Knowledge Representation database. Tree view provides a basic tool whereby the user may manipulate the fundamental relationships of the Knowledge Representation.

Form View provides the essential tool whereby the user may interact with the user relationships of the concepts in the Knowledge Representation database.

Draft View enables a user to create and define a graphics icon for concepts in the Knowledge Representation database.

The icon editor represents the embodiment of the relationship editor so that it can be immediately accessed to edit the class of values typical of graphical icons. No derivation of the descriptive set is required, no assignment of icon is required as the icon is what comprises the relationship, and no location or connection of the relationships based on the view grammar is required as these are irrelevant to discrete icons.

It may be desirable to treat additional classes of editors as if they were views in order to facilitate the user interaction with values of the data types supported by the system. This is strictly a system designer's choice, and could be implemented through other routes of editing.

These three views, or their equivalent, are required for successful operation of any embodiment of the invention in that all embodiments must provide: means for manipulating fundamental relationships; means for manipulating user relationships; and means for defining icons, if graphical representations of the Knowledge Representation are desired.

(1e) MODULE FOR USER INTERACTION WITH THE KNOWLEDGE REPRESENTATION THROUGH THE VIEWS

Figure 50:
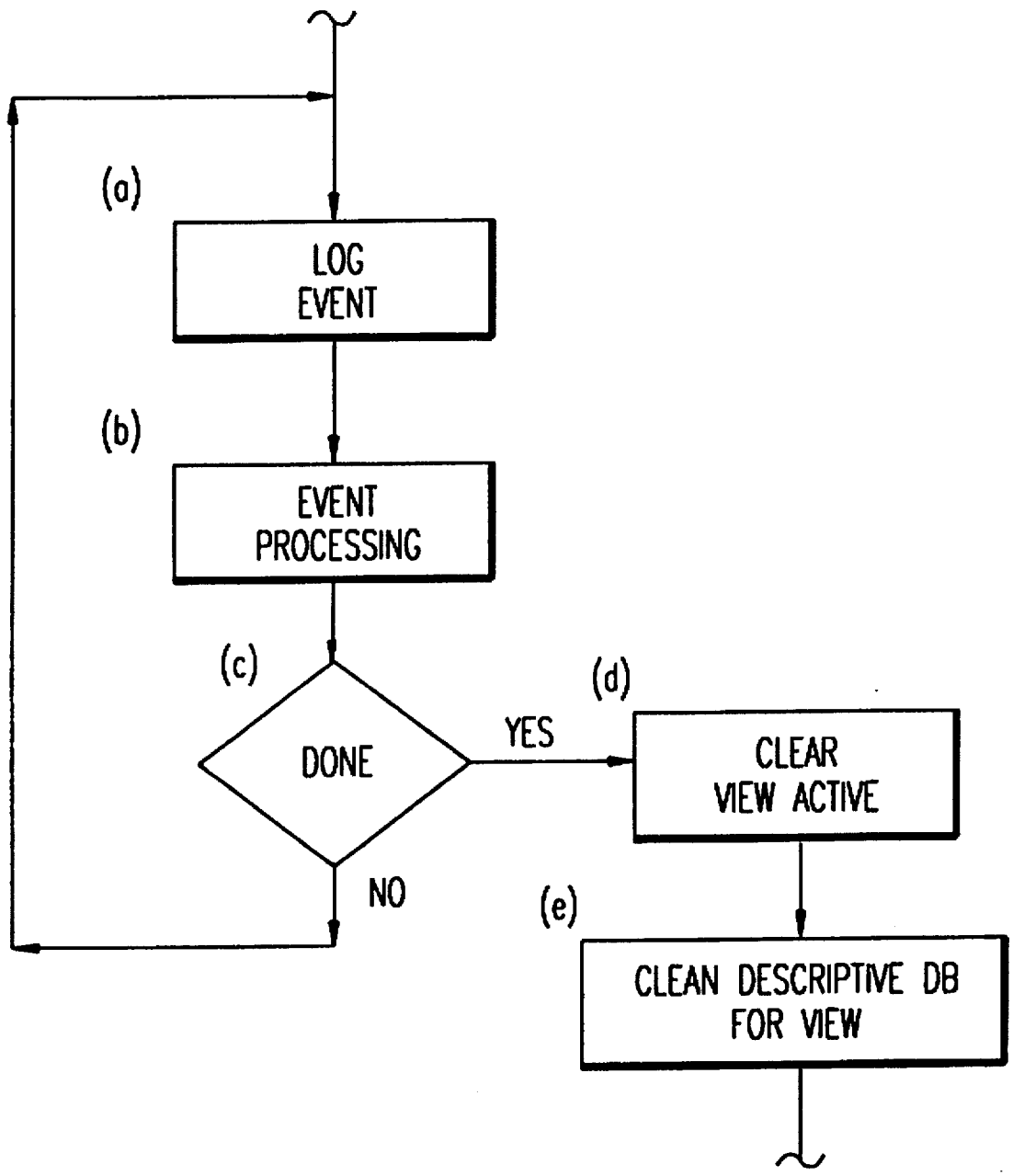
FIG. 50 is a Flow Diagram of Programmed Means For User Interaction with the Knowledge Representation Through the View Documents.

The (1e) Module for User Interaction with the Knowledge Representation through the views is comprised of a plurality of programmed procedures to accommodate the types of interaction appropriate to each view. In practice, the programmed procedures for interaction are implemented in conjunction with a specific view. Such view actions often contain variants based on the specific classes and types of documents comprising the view. However, in general, the majority of the functions for the program which enables user interaction will be common to all classes of documents comprising the view. The plurality of programmed procedures for (3b) Record operations and (3e) Network operations and the (3i) Concept and Relationship editor, are employed and coordinated by the programmed procedures for user interaction. The structure of the means for enabling user interaction with the Knowledge Representation through the view documents is illustrated in FIG. 50. The illustrated are typical of event driven means, in common practice within the state of the art.

FIG. 50 illustrates a flow diagram for user interaction with the Knowledge Representation through the view documents. Step (50a) indicates an event logger. An event logger consists of programmed means for scanning the input devices to the computer to detect a user event, together with the means for storing said detected event in a register from which said logged event can be used to select the appropriate action.

Step (50b) indicates a plurality of programmed means for acting on the event. The events which will be acted upon must be specifically identified and enabled by the system designer, and correlated with programmed means defining the action which the system is to perform in response to the event. It is with respect to the types of actions and the means for determining which action can occur in response to a user event, that the invention makes novel contributions which are subsequently disclosed.

Some of the user events will signal that the user is done with the current view document. Such signalling can be indicated by asserting a flag indicating 'done' in an appropriate register. Step (50c) tests the register to see if the 'done' flag has been asserted. If not, then the program returns to the means of the (50a) event logging. If 'done' has been asserted, then Steps (50d) and (50e) provide means for cleaning up the data associated with the view, resetting relevant registers, and proceeding to the next operation in the program. Step (50d) provides the means for clearing the view active. The view active is the means for specifying the initial concept around which the view document is to be derived. The function meaning of active was discussed in connection with the means for deriving a plurality of view documents. Essentially, the active is an assertion to a register of the type of document to be derived, the concept with respect to which to document is to be derived, the database of said concept, and the current attribute of said concept.

Step (50e) provides the means for clearing all view related registers and databases in order to reset them in preparation for the derivation of the next view.

The nature of the triggering events to be (50b) processed are totally at the discretion of the system designer. The triggering event may be a user action with a function key, a mouse button, a mouse motion, a keyboard entry, vocal input through a speech recognition system, etc. Both the specific event, and the programmed response thereto are implemented at the discretion of the system designer. While both the events and the programmed response are essentially arbitrary, there are reasonable events and responses to enable. The preferred embodiment in the appendix includes suggested events and responses that would be suitable for any implementation of the invention.

The actions based on the events of Step (50b) comprise a plurality of programmed procedures for actions in response to the specified user event. Many of these actions will employ standard programming techniques to enable view manipulation (e.g. scrolling, panning, zooming, etc.) and editing (e.g. changing values, etc.) Because of the nature of the invention, several unique abilities are enabled which can be called upon by a user specified triggering event.

The invention includes two novel features in this respect which are (1) determining which of programmed responses are appropriate by evaluation of the contextual meaning of the icons comprising the view document; and (2) interacting with the networks of the Knowledge Representation. The means for deriving a plurality of views identified the assignment of an icon to each of the concepts and relationships represented in the view document as one of the essential defining characteristics of the invention. Because each concept is represented in a network of relationship to other concepts, it is possible to consider the icon as representing not only the concept, but a plurality of the implied relationships and associations of that icon and because the plurality of meanings are associated with the icon in the descriptive database, the invention enables a variety of novel interpretations of each icon. These implied meanings of the icon are used as the basis for developing context-sensitive interaction with the Knowledge Representation. This is accomplished by means of decision trees designed for each view wherein the substance of the decision trees is the evaluation of the implied context. Such decision trees are not possible in the current state of the art in that the entities comprising documents are not icons explicitly connected to Knowledge Representations.

FIG. 51 provides a summary of the icon symbology implicit in the descriptive database. The icon can symbolize any of a number of concepts in the Knowledge Representation database because of the association of the icon with a plurality of record reference numbers. The implications of the icon association with concepts in the Knowledge Representation database are the basis for the novel actions made possible by the invention. The association referred to is stored in the descriptive database, disclosed previously, wherein the icon is associated with references to a plurality of records in the Knowledge Representation database, and with the location of said icon within the document display space. The icon may be interpreted as representing any of the items associated with the icon in the Descriptive database. These items are associated by the domains declarations of the Descriptive database and of the icon structures in the Descriptive database.

There are at least nine items which are explicitly associated with the icon in the Descriptive database. These nine are enumerated in Column (51a). Each of these associations can be interpreted as the item symbolized by the icon. Column (51b) summarizes what each of these items associated with the icon are that the icon can be interpreted as symbolizing. Notice that, of the nine items associated with the icon, six of them are concept record reference numbers. Two of the items are entities, comprising either the icon per se, or a value. The final one is a definition of a location or region in the display occupied by the icon. Based on this, it is clear that the icon, generically, can symbolize three possible types of items: (1) a concept record reference number; (2) a region or location in the document display space; and (3) entities comprising the icon or items displayed in the document display space.

FIG. 52 provides a summary of the symbol interpretation for each of the three types of items which the icon can symbolize (i.e. location, entities, or concept record reference numbers). Three icon interpretations are summarized in Column (52a). Each of these icon associations can be interpreted in a variety of ways. The ways in which the associations can be interpreted are summarized in Column (52b). Column (52c) indicates a subsequent Figure number illustrating a flow diagram of programmed means embodying the corresponding interpretation.

There is only one item for which the icon symbolizes location, that being the location of the icon; there are two items for which the icon symbolizes the entities; and there are six items for which the icon symbolizes a concept record reference number. Each of the two possible symbolized entities can be interpreted in at least the four ways shown in FIG. 52. Similarly, each of the six concept record reference numbers which the icon can possibly symbolize can be interpreted in at least the thirteen ways summarized in FIG. 52. In general, there will be approximately one hundred possible interpretations for an icon. In specific usage, this range of possibility is greatly reduced.

The richness of possible interpretation associated with each icon provides for behaviors within the system that are without precedent. Such behaviors are based on the evaluation of the context of the event and of the icon to determine which interpretation of the icon should prevail. When appropriately implemented, such context evaluation provides the sense to the user that the computer is anticipating what the user is thinking about, or reading their mind. This is possible because of the richness of possible meaning, which is explicitly enabled by the associations within the Descriptive database.

Every event handler in the event processing Step (50b) must determine the interpretation of the event. This is done by programmed means embodying a decision tree similar to that illustrated in FIG. 53.

Figure 53:
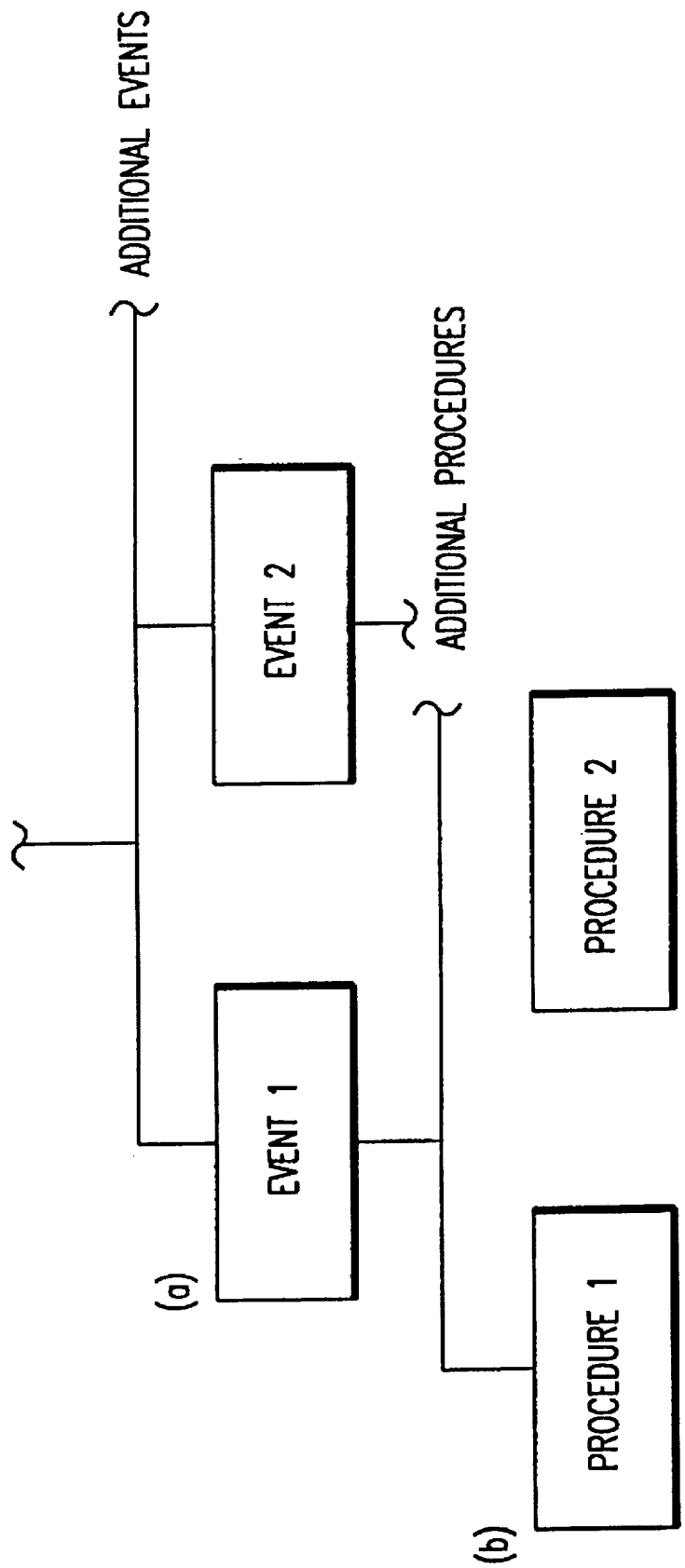
FIG. 53 is a Standard Decision tree for Event Processing.

FIG. 53 illustrates a standard decision tree for event processing. This is the type of decision tree embodied in all standard event-based programs and is presented to contrast with the means of this invention. In Step (53a), a plurality of events are defined which the system will respond to. These events are explicitly identified by the system developer, and each of the branches of this decision tree are a test to see whether the logged event of Step (53a) is one of the plurality of events known to the event processor. Given the detection of a known event in Step (53a), then Step (53b) decides which of a plurality of possible procedures to invoke in response to the event. In many cases, the plurality of procedures in Step (53b) is reduced to a single procedure. However, in general, there are a plurality of procedures, and the specific procedure that is invoked is a function of the command history and previous system flags that have been set. The specific procedure is then determined based on the command history and system flags that are present.

Figure 54:
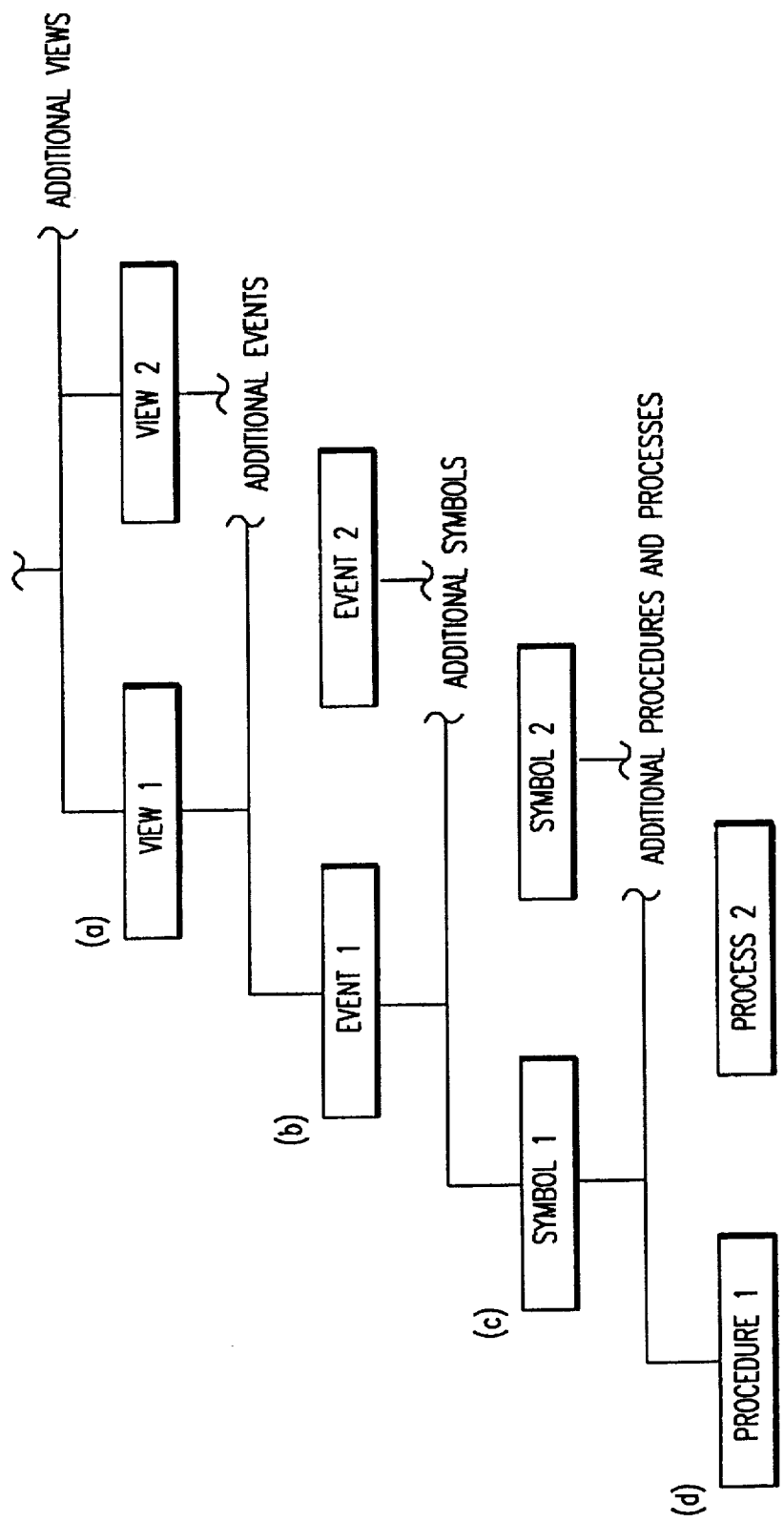
FIG. 54 is a Recommended Decision Tree for Icon Symbol Interpretation.

The means of event processing for this invention are illustrated in FIG. 54 which shows the recommended decision tree for icon symbol interpretation.

Step (54a) is to segregate the interpretation by view. Each view is designed to show particular relationships and a subset of concepts linked by those relationships. Each view document is showing a small subset of the concepts and relationships present in the Knowledge Representation database. The icons which symbolize those concepts and relationships will have meanings that are intuitively clear to the user. Each view document will be interpreted by the user as having specific implicit meanings. The symbols will be interpreted in relation to these implicit meanings. The system designer will need to enable specific events and interpretations based on the users likely perception of the meaning of the icon, given the context of the view document. Therefore, the view is a primary determinant of the meaning of the icons in the view.

Step (54b) indicates that, given the view, every view event processor will have a set of interpretable events. The same considerations as were discussed for Step (53a), apply to Step (54b). The events of Step (54b) must be specifically identified and enabled by the system programmer. For each interpretable event, the icon will correspond to one of the possible symbols. In general, the possible associations symbolized by the icon will be significantly reduced based on knowledge of the view and the event. In most cases, knowing the view and knowing the event will indicate the icon as symbolizing a particular association. Step (54d) indicates that an appropriate procedure or process will be invoked which embodies the interpretation appropriate to the association symbolized by the icon. Step (54d) indicates that the response may consist either of a procedure, which corresponds to Step (53b), or may consist of a process. The need for processes in Step (54b) is a distinguishing feature of this invention in that the process may be comprised of a recursive call to another view or may consist of a call to one of the entity class editors defined for the data types of the icons and values of the system. A process which is a recursive call to another view will obviously have an event processing decision tree similar to that of FIG. 54.

A process that corresponds to one of the editors will have its own decision tree for event processing which will be similar to that illustrated in FIG. 53. In this sense, the means of the invention can be seen as a preliminary step to, or a superset of, the standard means for event interpretation as embodied in FIG. 53.

In general the processes will in turn provide additional decision trees for determining the significance of the event. This stacking of the decision trees is a distinguishing characteristic of this invention.

FIGS. 55 through 70 embody portions of typical procedures which embody the means for interpreting the icon symbol. The programmed steps illustrated in the figures are the essence of the plurality of procedures embodying an interpretation of as association symbolized by the icon. The figures are not intended to exhibit the complete specific behavior of a given procedure. Rather, they are the generalization of the essence of the procedure. A wide variety of specific embodiments of the illustrated procedures will be developed by the system designer to accommodate the various meanings of the icons in the plurality of views. In the plurality of procedures comprising Step (54d) there will be many embodiments of the same procedure, wherein the specifics of the embodiment are a function the event which triggers the interpretation, and the association symbolized by the icon.

Figure 55:
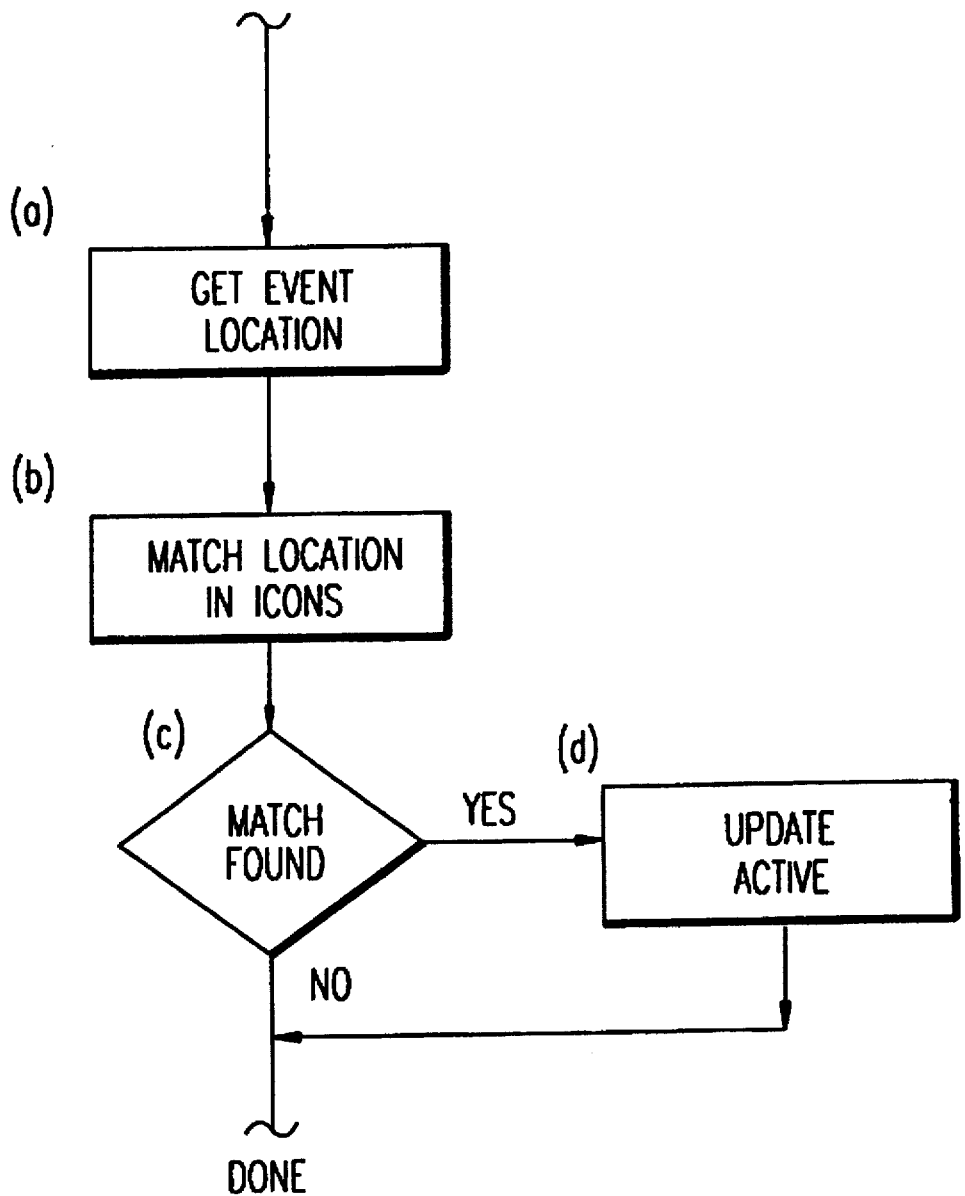
FIG. 55 is a Flow diagram of Programmed Means for Updating Active Based on User Event Location.

FIG. 55 illustrates a typical flow diagram for updating the active reference based on the user event location. This is possibly the most frequent use of the icon location in the processes for interpretation. The identification of the active distinguishes all of the information associated with the icon based solely on the location of the event within the display space. Step (55a) gets the event location out of the event log. The event location is typically expressed in terms of screen coordinates, either as cursor location or as mouse location. In either case, this location can be matched to the region occupied by the icon. Step (55b) matches the event location to the location occupied by the icon to determine which icon the event occurred within. Step (55c) determines if a match was found. If no match was found, then the event occurred outside of an icon, in which no update occurs. If a match was found in Step (55c), then Step (55d) updates the active based on the reference number of the active which the icon represents. Updating the active is the process of replacing the reference number of the active concept in the active register. The active register is a means for recording which concept reference number is currently active in the view.

Figure 56:
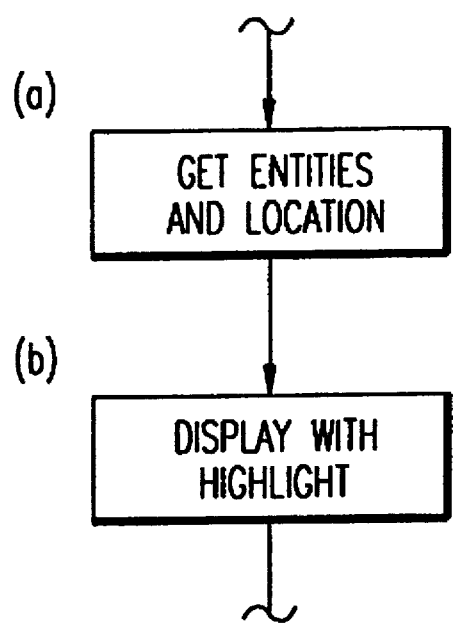
FIG. 56 is a Flow Diagram of Programmed Means For Highlighting Entities.

FIG. 56 illustrates a flow diagram for highlighting entities. This is one of the most frequent uses of the interpretation of the icon as symbolizing associated entities. Step (56a) gets the entities and the location for the active concept. Step (56b) passes the entity list and the location to the output display driver, together with the flag for highlighting. The output then refreshes the screen with the entities comprising the symbol highlighted.

Figure 57:
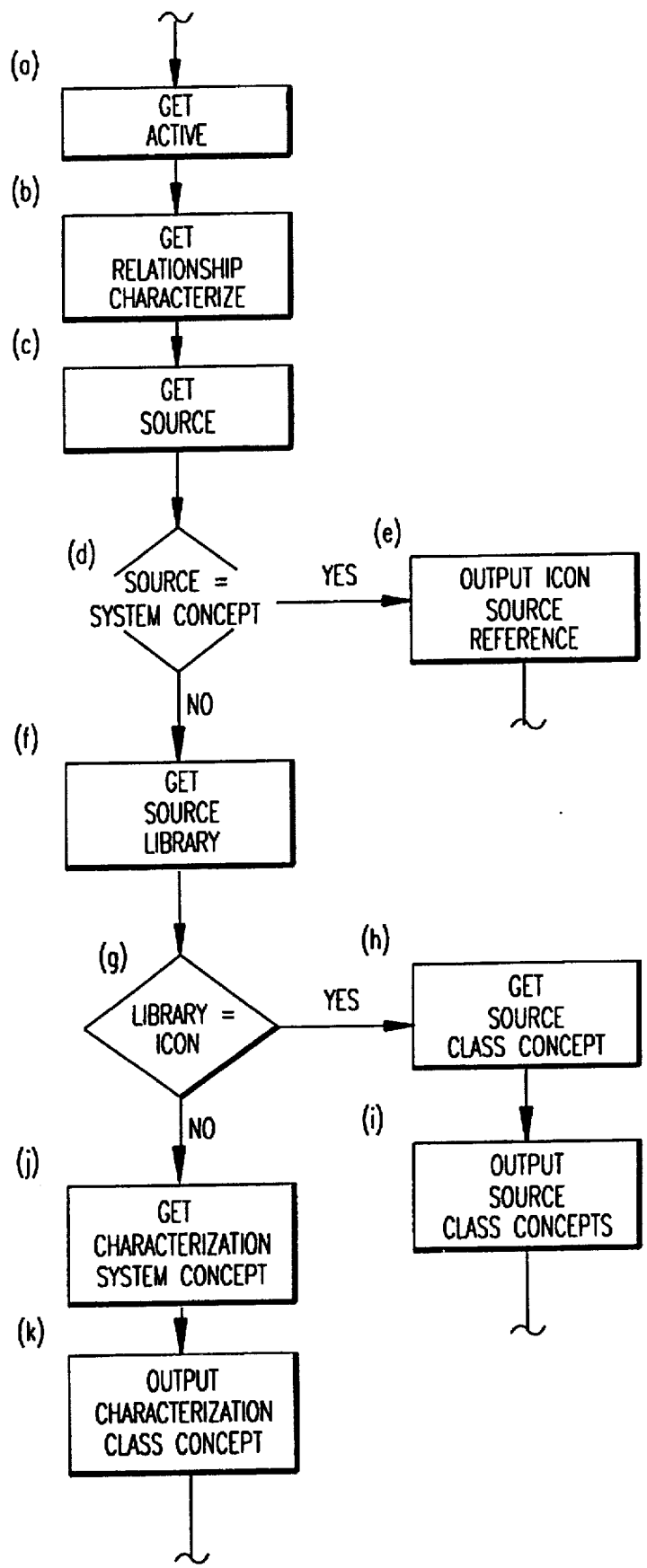
FIG. 57 is a Flow Diagram of Programmed Means For Interpreting Icon as System Concept Associated with Icon Entities.

FIG. 57 illustrates a flow diagram of programmed means for interpreting icons as system concepts associated with icon entities. The outcomes of this process are indicated in Steps (57e), (57h), and (57j.) The outcomes illustrated are the generalization of the three possible interpretations for the system concepts associated with icon entities. In specific embodiments, it is often possible to know a priori that only one of the three possible interpretations apply. As such, the process can be simplified to embody the specific relevant interpretation. Step (57a) is to get active reference number, Step (57b) is to get the relationship characterization reference number, and Step (57c) is to get the icon source reference number. These three reference numbers will be used as the basis for determining the system concepts associated with the icon entities. Step (57d) test to see if the source reference number is equal to a known system concept. If the source is a system concept, it indicates that the icon was derived by a programmed procedure. The system concept that is associated with those entities is therefore the procedure whereby the icon was developed for the illustrated concept. As such, the output Step (57e) will be the source reference number. If the icon source is not a system concept, then Step (57f) gets the source library. The source library reference number will indicate whether the entities comprising the icon are stored entities.

Step (57g) tests to see if the library equals the icon library. If the library of the source is the icon library, that means that the icon entities were a stored value and the system concept relevant to the icon is the library class concept associated with the library and the concept. Step (57h) gets the class system concept for the source, and Step (57i) outputs the icon class system concept. The programmed procedure for determining the icon class system concepts is outlined in FIG. 69, discussed subsequently. If the library is not the icon library, then the system concepts relevant to the characterization of the entities must be the characterization system concepts, which are the system concepts for the relationship characterization contained in Step (57b). Step (57j) the procedure for getting the characterization system concepts is elaborated in FIG. 69, discussed subsequently. Step (57k) shows that the output will be the characterization system concepts.

Figure 58:
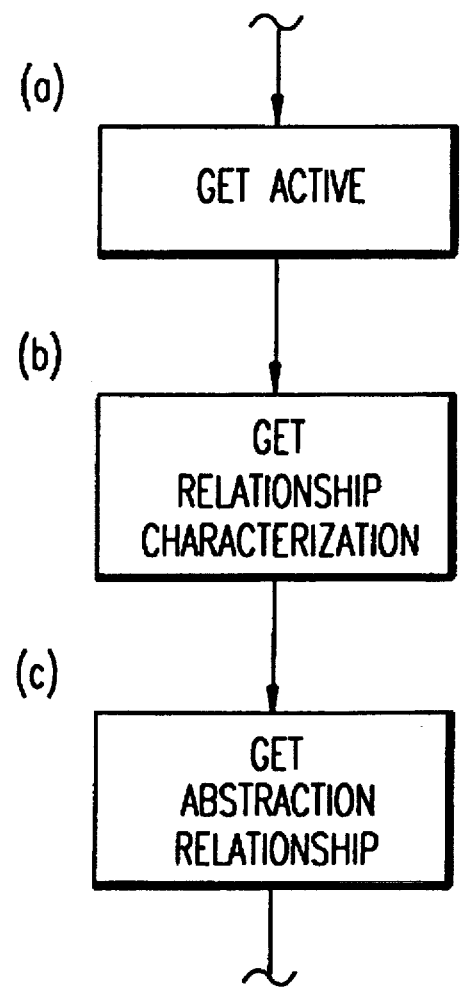
FIG. 58 is a Flow Diagram of Programmed Means For Interpreting Icon as Abstraction Associated with Icon Entities.

FIG. 58 illustrates a flow diagram for interpreting an icon as the abstraction associated with the icon entities. The abstraction associated with the icon entities is the abstraction associated with the Pattern Recognition, Storage, and Utilization as discussed in connection with FIG. 1. The implementation of the abstractions is an optional enhancement to the system which the system designer will, in general, choose to implement because of its power. The point of this interpretation is to identify which abstractions may be relevant to the relationships of the active concept symbolized by the icon.

Step (58a) is to get the active record reference number, Step (58b) is to get the relationship characterization, and Step (58c) is to get the abstraction relationship which applies to the active and the relationship characterization.

Figure 59:
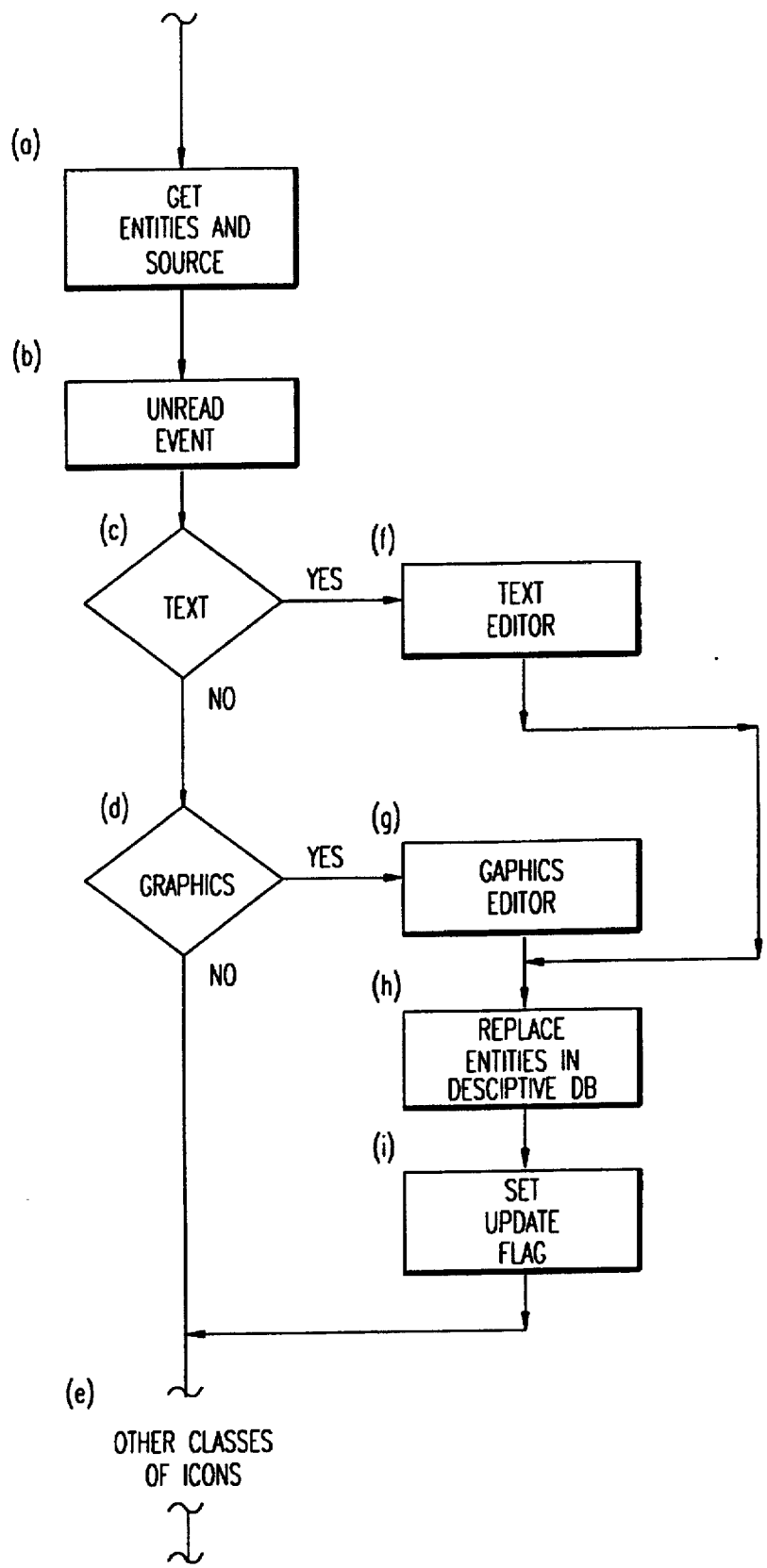
FIG. 59 is a Flow Diagram of Programmed Means For Interpreting Icon as Entity Editing Procedure.

FIG. 59 illustrates a flow diagram of programmed means for interpreting an icon as an entity editing procedure. This interpretation will result in calling the appropriate editor to edit the entities comprising the icon. The steps illustrated in FIG. 59 show a generalization for determining which of the possible editors apply to the entities comprising the icon. In general, the class of editor can be determined promptly by examination of the data type of the entities, and therefore a full sequence of test illustrated in Steps (59c), (59d), and (59e) will not be required. However, the elimination of the steps in a specific case will readily occur to the system designer once the generalization as illustrated in FIG. 59 is clearly understood.

Step (59a) gets the entities and the source of the entities. Step (59b) typically unreads the event that triggered the interpretation. This is done so that the event may be used within the editor as the first event for the editing process. This is not always required, in that it depends on the system designer's choice as to the triggering event for the editing sequence. For example, if a function key, such as <F2> is used to invoke the editor, there is no point in unreading <F2>, as its entire symbolic significance was the invocation of the editor. If, however, the keyboard is enabled for invoking the editor, then the user might strike the letter <A>, intending to insert an 'A' in the icon at the current position. In such case, the character 'A' and the position should be unread or fed forward to the editor, so the 'A' will in fact be inserted at the desired position. The editor will control the modification of the entity list comprising the icon.

Step (59c) is a test to determine if the icon is comprised of a data type suitable for editing in the text editor. If so, the Step (59f) passes the entity list, source, and the unread event to the text editor. Step (59d) checks to see if the entity data type is suitable for processing in the graphics editor. If so, the graphics editor is invoked, and the entity list, source, and the event pass forward to Step (59g) the graphics editor. The testing may proceed to Step (59e) which provides for a plurality of additional editors as required to accommodate the entity classes comprising the icons supported by the system. Said plurality of editors will be designed and implemented by the system designer in accordance with the principles disclosed for the Knowledge Representation, and each type of icon will have an associated editor. In all cases, the results of the editor will be passed to Step (59h) which will replace the entities in the descriptive database. They may also replace the entities in the source record in the Knowledge Representation database.

Step (59i) indicates that a flag should be set to indicate that entities have been updated. This flag may be used to remind the user at the completion of activity within a view document that the entities within the view document have been modified and, possibly, should be saved to the primary knowledge representation. This is only applicable if Step (59h) replaces the entities in the descriptive database, without updating the Knowledge Representation database.

Figure 60:
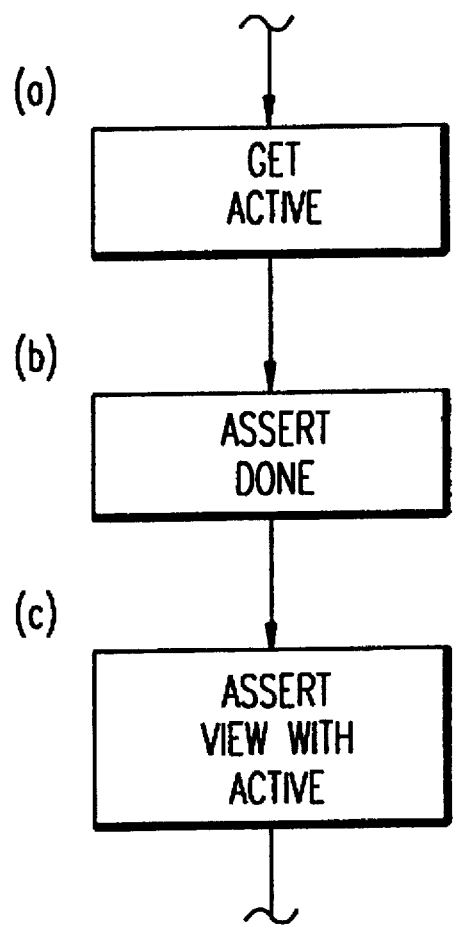
FIG. 60 is a Flow Diagram of Programmed Means For Interpreting Icon as Procedure for Transferring View Derivation to Active.

FIG. 60 illustrates a flow diagram for interpreting an icon as procedure for transferring view derivation to the active. Many view documents are developed relative to a specific concept. Shifting the concept that the document is developed relative to will, in general, change the document, even though the view, the view class, and the document type remain constant, the specific embodiment of the document will be altered based on the concept that is the basis for the derivation.

Step (60a) is to get the active concept. Step (60b) is assert 'done.' 'Done' is asserted to a register which will be used in Step (50c) as a flag to proceed with Step (50d) the clearing the view active and Step (50e) cleaning the descriptive database for the document. Step (60c) asserts the current view type with the current active into the active register. This assertion will provide a redundant assertion of the active. This is required so that when Step (50d) occurs and we clear a view active, one of the redundant pair will be removed, leaving the current redundant pair to serve as the basis for the view regeneration.

Figure 61:
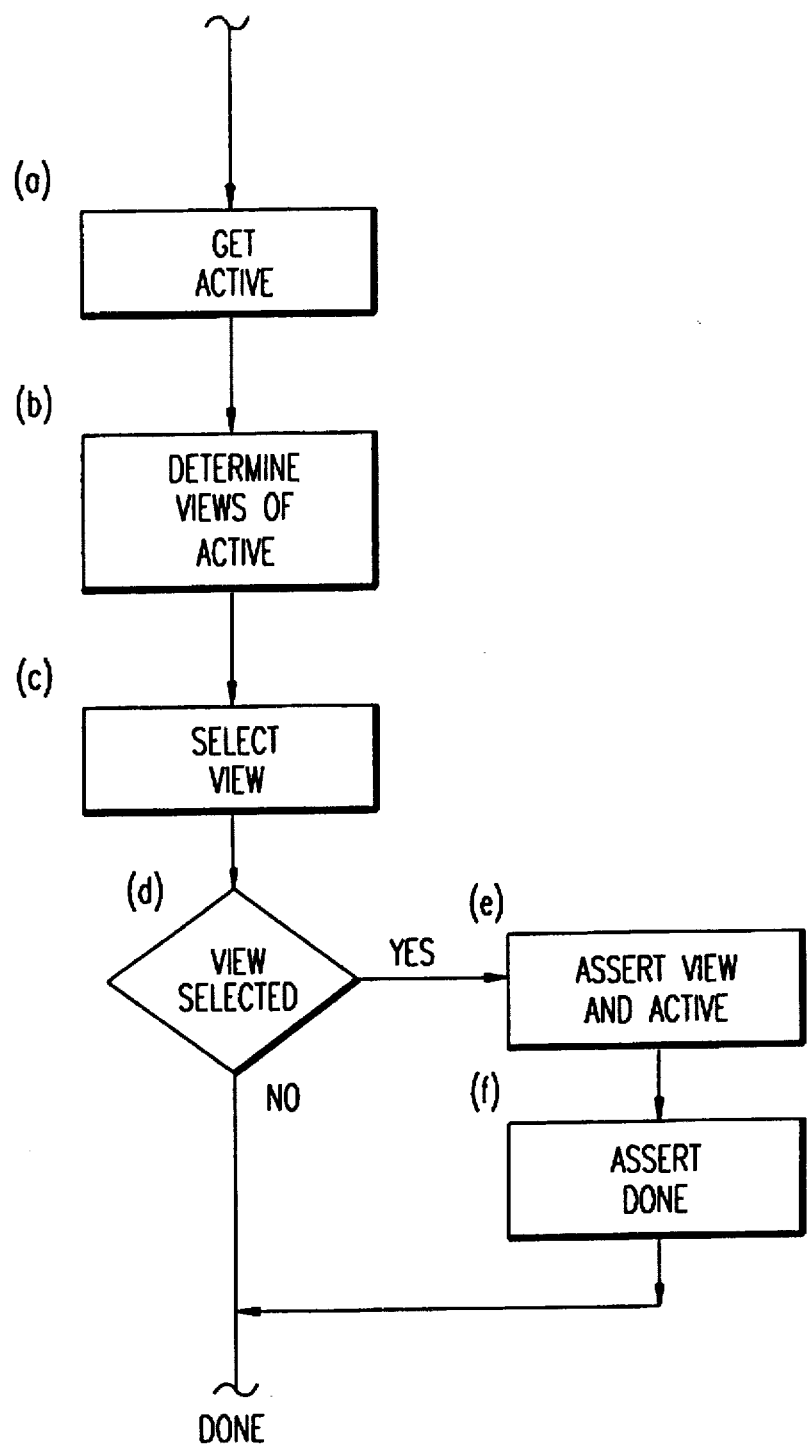
FIG. 61 is a Flow Diagram of Programmed Means For Changing View of Active.

FIG. 61 illustrates a flow diagram of programmed means for changing a view of the current active. This is similar to the procedure illustrated in FIG. 60, except that a different view document is being requested for the active. Step (61a) gets the active concept. Step (61b) determines choice of views available from the context of the active. Step (61c) provides for the selection of a new view for the active concept. Step (61d) tests to see whether a new view was in fact selected. In it was then, Step (61e) update the view and the active and Step (61f) assert 'done.' The result of this will be that the next view and active will be the new requested view of the active node. Step (61c), in general, will consist of a menu of views appropriate to the active. In many cases, the triggering event will be such as to indicate transfer to a specific view that is a logical view to transfer to, based on the user profile, and the current view.

Figure 62:
FIG. 62 is a Flow Diagram of Programmed Means For Interpreting Icon as Procedure for Identifying Library System Concept of Active.

FIG. 62 illustrates a flow diagram for interpreting the icon as a procedure for identifying library system concepts of the active. It consists of a single step, which is to (62a) get the library of the active.

Figure 63:
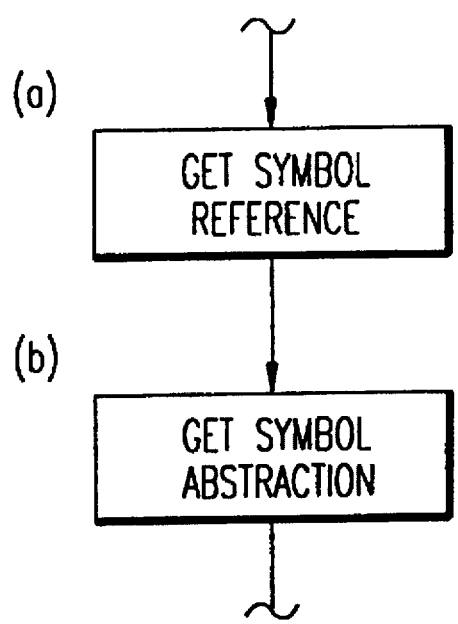
FIG. 63 is a Flow Diagram of Programmed Means For Interpreting Icon as Abstraction Associated with Active.

FIG. 63 illustrates a flow diagram for interpreting the icon as an abstraction associated with the icon. Step (63a) is to get the reference number of the symbol, and Step (63b) is to get the abstraction associated with that reference number. The point here is that every symbol potentially has an abstraction associated with it, which abstraction can be readily derived based on patterns of reference in the descriptive database, and within the relationship storing the abstraction.

Figure 64:
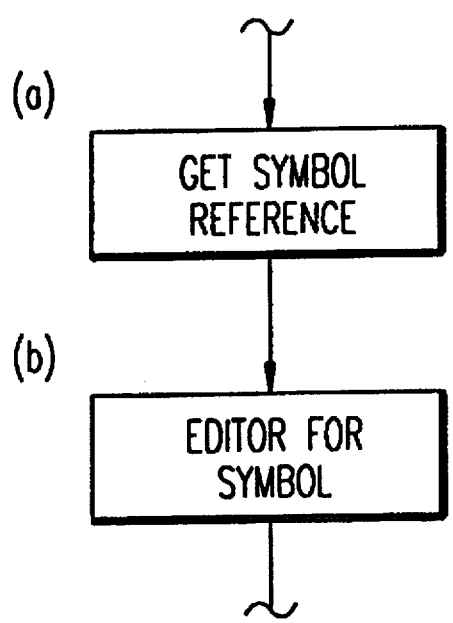
FIG. 64 is a Flow Diagram of Programmed Means For Interpreting Icon as Procedure for Concept and Relationship Editing.

FIG. 64 illustrates a flow diagram for interpreting the icon as a procedure for concept and relationship editing. The essence of this procedure is the concept and relationship editor of the Knowledge Representation database. Step (64a) is to get the symbol reference number, and Step (64b) is to call the concept and relationship editor of the Knowledge Representation database for the symbol reference. A general call to the concept and relationship editor will result in a menu of relevant editing operations which may be performed with respect to the referenced concept. The call to the editor of Step (64b) in specific procedures may bypass this menu function and directly call the desired editing process.

Figure 65:
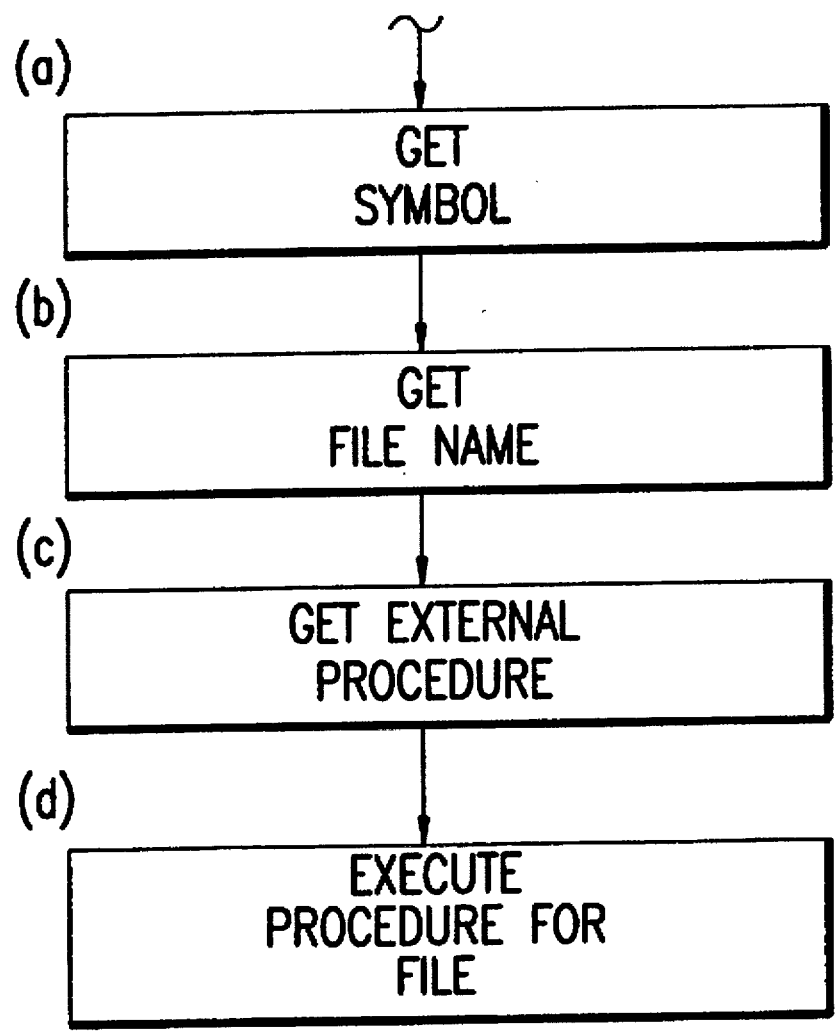
FIG. 65 is a Flow Diagram of Programmed Means For Interpreting Icon as External Procedure.

FIG. 65 illustrates a flow diagram for interpreting an icon as an external procedure. External procedures are considered to be programs outside of the invention. Such external procedures can readily be represented within the Knowledge Representation database, and transfer to such external procedures may occur through the process illustrated in FIG. 65. Step (65a) is to get the symbol reference number. Step (65b) is to get the filename associated with symbol reference number. The filename will be stored as an attribute within the relationships applicable to the concept of the symbol. Step (65c) gets the external procedure, which will be stored as a value of a relationship within the symbol applicable to the symbol. Step (65d) is to execute the procedure for the file as appropriate to the external procedure. The essence is that both the filename and the procedure can be stored as relationships for the symbolized concept. This enables significant flexibility for the Knowledge Representation to include knowledge of other computer programs, systems, and files.

Figure 66:
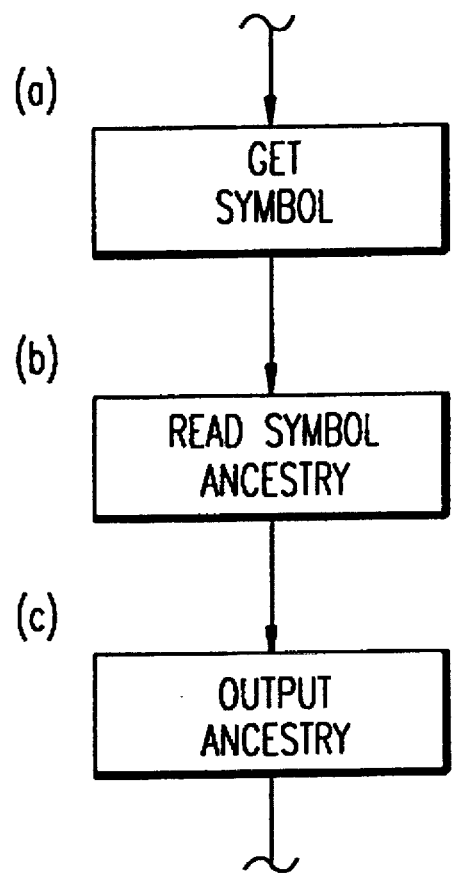
FIG. 66 is a Flow Diagram of Programmed Means For Interpreting Icon as Ancestry Context.

FIG. 66 illustrates a flow diagram of programmed means for interpreting an icon as the ancestry context. The ancestry context is the series of parents in the 'parent' fundamental relationships applicable to the concept. Step (66a) gets the symbol reference number, Step (66b) reads the symbol ancestry, and Step (66c) outputs the ancestry. The output is typically used to report information about the ancestry context. For example, in the preferred embodiment, the ancestry context is concatenated and displayed in the top line to indicate the context of the currently active item in the view document.

Step (66b) is a call to the corresponding function of the Knowledge Representation database. Essentially, Step (66b) consists of reading the parents of the symbol, reading the parents of the parents, and so forth until the root record is read. The resulting collection of record reference numbers are then consolidated in a sequential list indicating the ancestry of the current concept.

Figure 67:
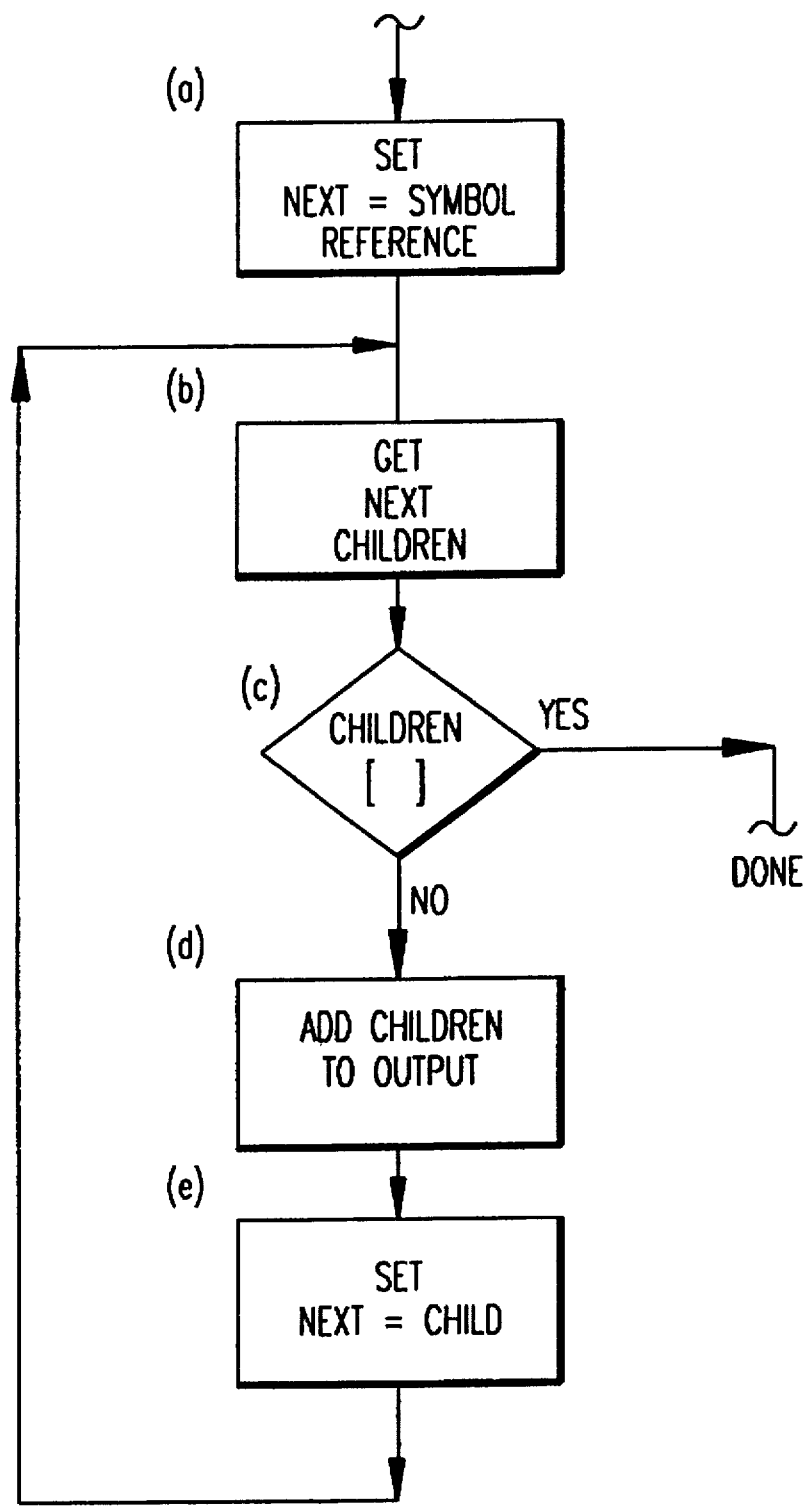
FIG. 67 is a Flow Diagram of Programmed Means For Interpreting Icon as Descendants Context.

FIG. 67 illustrates a flow diagram for interpreting an icon as the descendants context. This is similar to interpreting the symbol as the ancestry context, with the exception that the fundamental relationship that is used as the basis for establishing the descendants is the children rather than the parents. The illustrated procedure is for a chain of single children. This procedure can be readily elaborated to the case of multiple children, just as FIG. 66 can readily be elaborated for the case of multiple ancestry.

Step (67a) sets the next equal to the symbol reference number. Step (67b) gets the children of the next. Step (67c) checks to see if the children list is nil. If it is, it means that there are no descendants, and thus the process is done. If it is not nil, then Step (67d) adds the children record reference numbers to the output list. Step (67e) set next equal to the child, at which point the process returns to Step (67b) to get the subsequent children. The consolidation of children record reference numbers in the output list means that when Step (67c) does indicate that the process is done, the output will be contained in the output format. Output may either be a list, or some type of database assertions.

Figure 68:
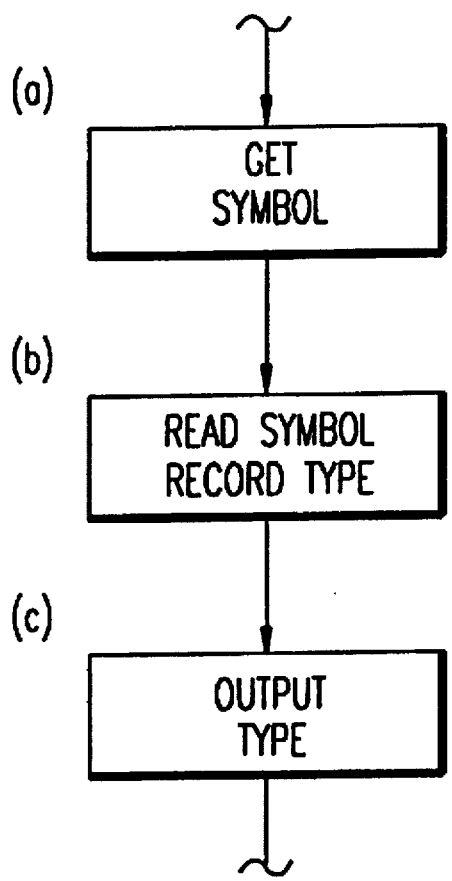
FIG. 68 is a Flow Diagram of Programmed Means For Interpreting Icon as Type Context.

FIG. 68 illustrates a flow diagram for interpreting an icon as the type context. The type context is established by the fundamental relationship of type between a project and a component. It is applicable only to symbols which are project concepts. Equivalent interstrata relationships will establish an equivalent context for other propagations.

Step (68a) is to get the symbol. Step (68b) reads the symbol record's type. Step (68c) outputs that type. Step (68b) reading the symbol type is accomplished by means of the Output operations of the Knowledge Representation database.

Figure 69:
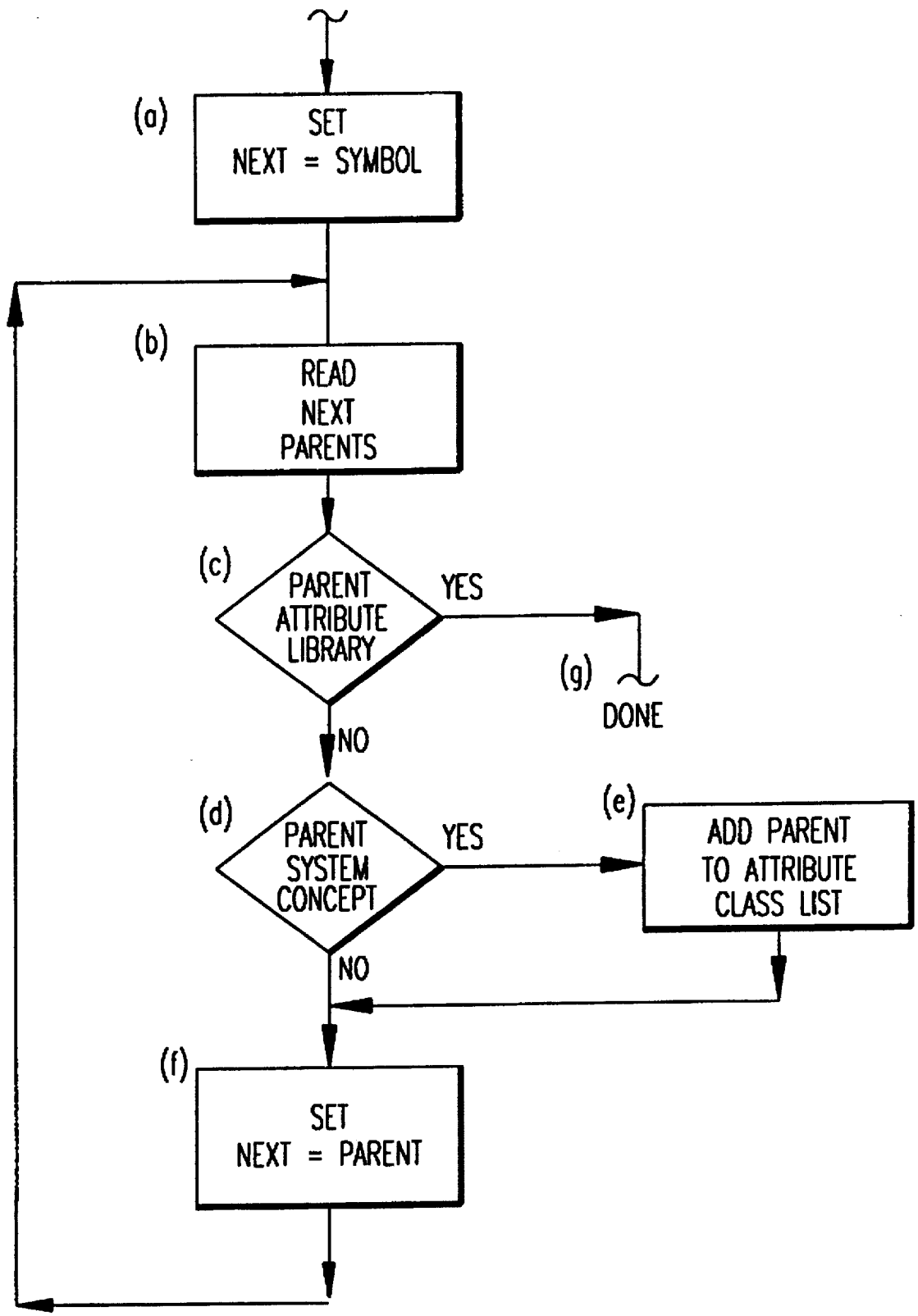
FIG. 69 is a Flow Diagram of Programmed Means For Identifying Attribute Class Concepts for Active Attribute User Concept.

FIG. 69 illustrates a flow diagram for identifying the attribute class concepts for active attribute user concepts. This provides the interpretation of the symbol as the attribute class context of the symbol. Step (69a) is to set next equal to the symbol reference number. Step (69b) is to read the parents of next. Step (69c) then checks to see if the parents include the attribute library system concept. If so, then the reading process Step (69g) is done. Step (69d) checks to see if the parent is a system concept. The attribute class concepts will be descendants of the attribute library concept. Therefore, if the parent symbol is not the attribute library (as determined in Step (69c)) but it is a system concept (as determined in Step (69d)) then it is a attribute class concept.

Attribute class concepts are to be saved in Step (69e) by adding the parents to the attribute class list. Step (69f) then continues by setting next equal to the parent, which then returns to Step (69b) to read the next parents.

Figure 70:
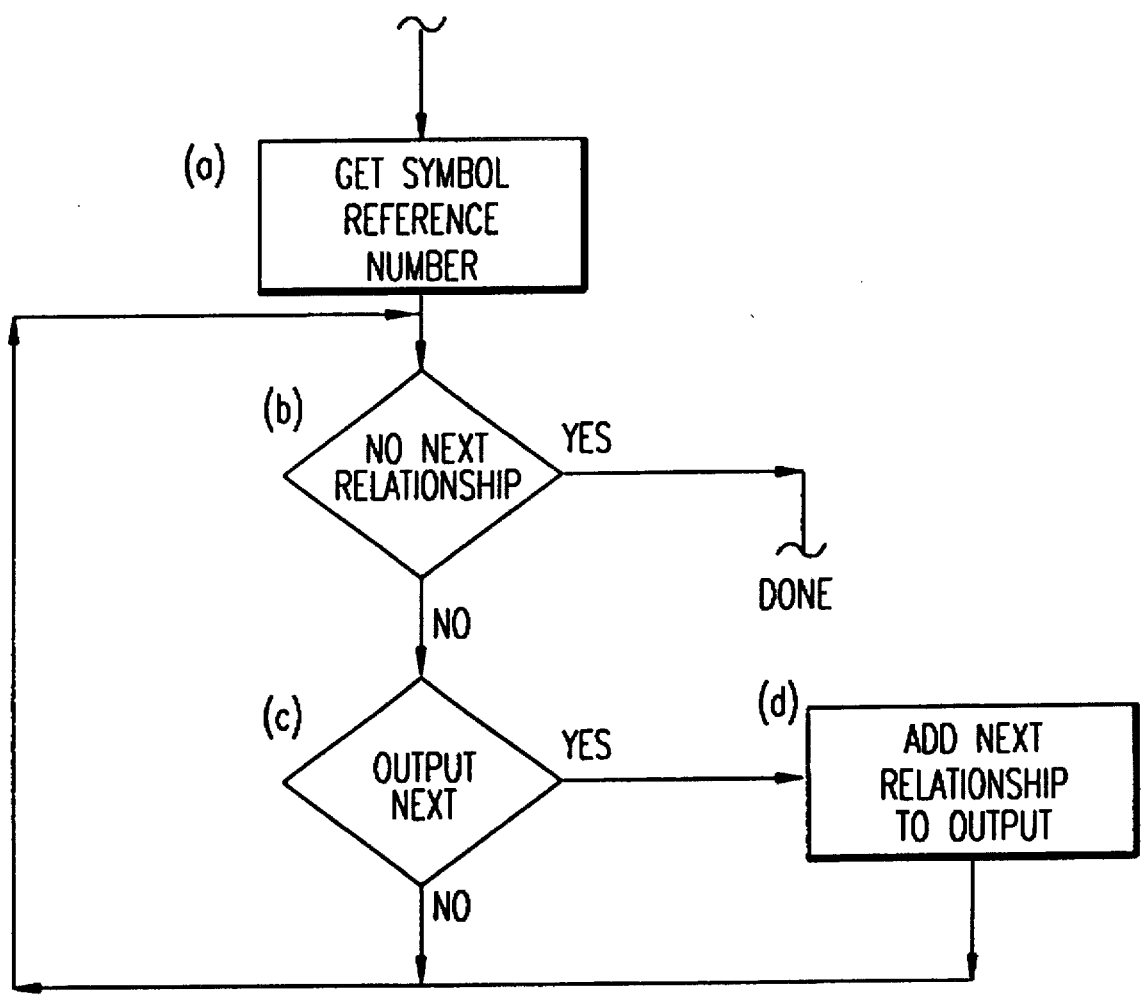
FIG. 70 is a Flow Diagram of Programmed Means For Interpreting Icon as User Connection Context.

FIG. 70 illustrates a flow diagram for interpreting the icon as the user connection context. This is similar to the processes used to determine the other contexts wherein we are determining the relationships maintained by the concept. Step (70a) is to get the symbol reference number. Step (70b) is to look at the descriptive database to determine if there are any user relationships present in the descriptive database for the symbol. If there are no next relationships, then the process is completed. If there is a next relationship, then Step (70c) checks to see if the next relationship should be output as one of the user relationships. Step (70c) may include constraining which of the user relationships to output. For example the user relationships to be output may be restricted to those which indicated wire connections. Such restrictions are implemented by the system designer, and the test of Step (70c) is a test to determine if the user relationship is to be part of the user context to be reported in the output. If it is, the Step (70d) adds that next relationship to the output and the process cycles back to Step (70b) to determine if there are any additional relationships in the descriptive database.

The invention having been thus described, it will be apparent that the same may be varied in many ways without departing from the spirit of the invention. Any and all such modifications are intended to be covered by the following claims.

What is claimed is:

1. A method for representing information in a computer system, comprising the steps of:

creating in said computer system a knowledge representation database made up of individual records, wherein each record is associated with a unique reference number (URN) by which each record is identified;

creating at least one system concept record which defines the nature of a relationship between two records in said database;

identifying records in said database as subjects of the relationship defined by said system concept record;

identifying records in said database which define objects of the relationship defined by said system concept record;

creating relationship data structures each comprising the URN of said system concept record together with the URN of at least one of said identified object records;

storing said relationship data structures in corresponding identified subject records;

designating said system concept record of said knowledge representation database as a System Concept by including the name and associated URN of said system concept record in a System Concept index to said knowledge representation database provided in said computer system; and deriving comprehensible information through evaluation of said relationship data structures stored in said records of said knowledge representation database and recognition of System Concepts through consultation of said System Concept index.

2. A method for representing information in a computer system according to claim 1, wherein said identified subject records are Attribute records designating attribute property concepts, and said identified object records are Component records.

3. A method for representing information in a computer system according to claim 2, further comprising the step of storing within said relationship data structures the URN of the Attribute record in which said relationship data structures are stored.

4. A method for representing information in a computer system according to claim 1, wherein said identified subject records are Component records, and said identified object records are Component records.

5. A method for representing information in a computer system according to claim 4, further comprising the step of storing within said relationship data structures the URN of an Attribute record which pertains to the Component record in which said relationship data structure is stored.

6. A method for representing information in a computer system according to claim 1, wherein said identified subject records are Project records and said identified object records are Component records.

7. A method for representing information in a computer system according to claim 6, further comprising the step of storing within said relationship data structures the URN of an Attribute record which pertains to the Project record in which said relationship data structure is stored.

8. A method for representing information in a computer system according to claim 1, further comprising the step of storing within said relationship data structures the URN of an Attribute record which pertains to the concept designated by the record in which said relationship data structure is stored.

9. A method for representing information in a computer system according to claim 1, further comprising the step of inferring a concept record which pertains to the concept designated by said record in which said relationship data structure is stored, and storing in said relationship data structure the URN of the inferred Concept record.

10. A method for representing information in a computer system according to claim 1, further comprising the steps of adding and removing URNs from existing relationship data structures to obtain modified relationship data structures and storing said modified relationship data structures in place of said existing relationship data structures.

11. A method for representing information in a computer system according to claim 6, further comprising the step of identifying object Component records from relationship data structures stored in specific Attribute records.

12. A method for representing information in a computer system according to claim 6, further comprising the step of identifying object Component records from relationship data structures stored in other Component records.

13. A method for representing information in a computer system according to claim 6, further comprising the step of identifying object Component records from relationship data structures stored in other records.

14. A method for representing information in a computer system according to claim 1, wherein the steps of identifying records in said database which define objects of the relationship defined by said system concept record, creating relationship data structures, and storing said relationship data structures in corresponding identified subject records comprise the steps of:

selecting a record pertinent to the identified subject record;

reading the relationship data structure stored in said selected record;

selecting at least one object record the URN of which is stored in said relationship data structure read from said selected record;

creating a relationship data structure including said URN of said object record selected from said stored relationship data structure; and storing said created relationship data structure in said identified subject record.

15. A method for representing information in a computer system according to claim 14, wherein said selected record pertinent to the identified subject record is an Attribute record.

16. A method for representing information in a computer system according to claim 14, wherein said selected record pertinent to the identified subject record is a Component record.

17. A method for representing information in a computer system according to claim 15, wherein said at least one object record the URN of which is stored in said relationship data structure read from said selected Attribute record is a Component record.

18. A method for representing information in a computer system according to claim 16, wherein said at least one object record the URN of which is stored in said relationship data structure read from said selected Component record is another Component record.

* * * * *